(12) United States Patent
Perkowski et al.

(10) Patent No.: US 7,848,948 B2
(45) Date of Patent: *Dec. 7, 2010

(54) INTERNET-BASED PRODUCT BRAND MARKETING COMMUNICATION NETWORK CONFIGURED TO ALLOW MEMBERS OF A PRODUCT BRAND MANAGEMENT TEAM TO COMMUNICATE DIRECTLY WITH CONSUMERS BROWSING HTML-ENCODED PAGES AT AN ELECTRONIC COMMERCE (EC) ENABLED WEB-SITE ALONG THE FABRIC OF THE WORLD WIDE WEB (WWW), USING PROGRAMABLE MULTI-MODE VIRTUAL KIOSKS (MMVKS) DRIVEN BY SERVER-SIDE COMPONENTS AND MANAGED BY PRODUCT BRAND MANAGEMENT TEAM MEMBERS

(75) Inventors: Thomas J. Perkowski, Darien, CT (US); Vaibhava Muchhal, Stamford, CT (US); Katherine Kennedy, New York, NY (US); Fernando Ulloa, Jr., Norwalk, CT (US); Kathleen O'Hara, Norwalk, CT (US)

(73) Assignee: IPF, Inc., Darien, CT (US)

( * ) Notice: Subject to any disclaimer, the term of this patent is extended or adjusted under 35 U.S.C. 154(b) by 1048 days.

This patent is subject to a terminal disclaimer.

(21) Appl. No.: 10/812,341
(22) Filed: Mar. 29, 2004

(65) Prior Publication Data

US 2005/0004838 A1 Jan. 6, 2005

Related U.S. Application Data

(63) Continuation-in-part of application No. 10/693,856, filed on Oct. 24, 2003, now abandoned, which is a
(Continued)

(51) Int. Cl.
*G06Q 30/00* (2006.01)

(52) U.S. Cl. ............................... 705/14.4; 705/14.73
(58) Field of Classification Search .................. 705/14
See application file for complete search history.

(56) References Cited

U.S. PATENT DOCUMENTS 4,654,482 A 3/1987 DeAngelis
(Continued)

FOREIGN PATENT DOCUMENTS

EP 744 856 A2 11/1996
EP 822 535 A3 2/1998

(Continued)

OTHER PUBLICATIONS

U.S. Appl. No. 08/691,263, filed Jan. 1, 2000, Swift et al.
Product brochure for the Open AdStream System (OAS) by Real Media, 1995, pp. 1-9.

(Continued)

*Primary Examiner*—Jeffrey D Carlson
(74) *Attorney, Agent, or Firm*—Thomas J. Perkowski, Esq. P.C.

(57) ABSTRACT

An Internet-based product brand marketing communication network allowing members of a consumer product brand management team to communicate directly with consumers present at HTML-encoded pages of an electronic commerce (EC) enabled Web-site along fabric of the World Wide Web (WWW), using programmable Multi-Mode Virtual Kiosks (MMVKs) driven by server-side components and managed by product brand management team members and/or authorized parties. When a consumer's Web browser encounters an MMVK tag along the WWW, the MMVK is generated and automatically plays through its display modes, inviting and allowing the consumer to review and interact with advertising spots, promotional spots, and brand information resources displayed within the GUI of the MMVK, along the fabric of the WWW where the MMVK has been installed. Web-based subsystems are provided for programming these display modes.

23 Claims, 42 Drawing Sheets

Related U.S. Applications Data continuation-in-part of application No. 10/602,990, filed on Jun. 24, 2003, now abandoned, which is a continuation-in-part of application No. 09/716,848, filed on Nov. 17, 2000, now abandoned, which is a continuation-in-part of application No. 09/695,744, filed on Oct. 24, 2000, which is a continuation-in-part of application No. 09/641,908, filed on Aug. 18, 2000, now abandoned, which is a continuation-in-part of application No. 09/599,690, filed on Jun. 22, 2000, now abandoned, which is a continuation-in-part of application No. 09/483,105, filed on Jan. 14, 2000, now abandoned, and a continuation-in-part of application No. 09/465,859, filed on Dec. 17, 1999, now abandoned, which is a continuation-in-part of application No. 09/447,121, filed on Nov. 22, 1999, now Pat. No. 6,625,581, and a continuation-in-part of application No. 09/441,973, filed on Nov. 17, 1999, now Pat. No. 6,961,712, which is a continuation-in-part of application No. 09/284,917, filed as application No. PCT/US97/19227 on Oct. 27, 1997, now abandoned, and a continuation-in-part of application No. 08/936,375, filed on Sep. 24, 1997, now abandoned, and a continuation-in-part of application No. 08/871,815, filed on Jun. 9, 1997, now Pat. No. 7,143,055, and a continuation-in-part of application No. 08/854,877, filed on May 12, 1997, now Pat. No. 5,950,173, and a continuation-in-part of application No. 08/826,120, filed on Mar. 27, 1997, now abandoned, and a continuation-in-part of application No. 08/752,136, filed on Nov. 19, 1996, now Pat. No. 6,064,979, and a continuation-in-part of application No. 08/736,798, filed on Oct. 25, 1996, now Pat. No. 5,918,214.

U.S. PATENT DOCUMENTS

| Patent No. | Date | Inventor |
|---|---|---|
| 4,775,935 A | 10/1988 | Yourick |
| 4,841,132 A | 6/1989 | Kajitani et al. |
| 5,029,104 A | 7/1991 | Dodson |
| 5,264,822 A | 11/1993 | Vogelman et al. |
| 5,288,976 A | 2/1994 | Citron et al. |
| 5,307,456 A | 4/1994 | MacKay |
| 5,319,542 A | 6/1994 | King, Jr. et al. |
| 5,333,237 A | 7/1994 | Stefanopoulos |
| 5,355,472 A | 10/1994 | Lewis |
| 5,398,336 A | 3/1995 | Tantry et al. |
| 5,448,046 A | 9/1995 | Swartz |
| 5,524,195 A | 6/1996 | Clanton et al. |
| 5,528,490 A | 6/1996 | Hill |
| 5,532,735 A | 7/1996 | Blahut et al. |
| 5,572,643 A | 11/1996 | Judson |
| 5,583,560 A | 12/1996 | Florin |
| 5,592,378 A | 1/1997 | Cameron et al. |
| 5,594,509 A | 1/1997 | Florin et al. |
| 5,612,527 A | 3/1997 | Ovadia |
| 5,635,694 A | 6/1997 | Tuhro |
| 5,640,193 A | 6/1997 | Wellner |
| 5,694,546 A | 12/1997 | Reisman |
| 5,715,444 A | 2/1998 | Danish et al. |
| 5,721,827 A | 2/1998 | Logan et al. |
| 5,724,521 A | 3/1998 | Dedrick |
| 5,737,619 A | 4/1998 | Judson |
| 5,737,739 A | 4/1998 | Shirley et al. |
| 5,740,549 A | 4/1998 | Reilly et al. |
| 5,742,768 A | 4/1998 | Gennaro et al. |
| 5,761,071 A | 6/1998 | Bernstein et al. |
| 5,804,803 A | 9/1998 | Cragun et al. |
| 5,838,906 A | 11/1998 | Doyle et al. |
| 5,841,978 A | 11/1998 | Rhoads |
| 5,854,897 A | 12/1998 | Radziewicz et al. |
| 5,864,823 A | 1/1999 | Levitan |
| 5,869,819 A | 2/1999 | Knowles et al. |
| 5,890,175 A | 3/1999 | Wong et al. |
| 5,895,454 A | 4/1999 | Harrington |
| 5,897,622 A | 4/1999 | Blinn et al. |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,913,040 A | 6/1999 | Rakavy et al. |
| 5,913,210 A | 6/1999 | Call |
| 5,918,213 A | 6/1999 | Bernard et al. |
| 5,918,214 A | 6/1999 | Perkowski |
| 5,930,767 A | 7/1999 | Reber et al. |
| 5,933,811 A | 8/1999 | Angles et al. |
| 5,933,829 A | 8/1999 | Durst et al. |
| 5,937,390 A | 8/1999 | Hyodo |
| 5,937,392 A | 8/1999 | Alberts |
| 5,938,726 A | 8/1999 | Reber et al. |
| 5,940,074 A | 8/1999 | Britt et al. |
| 5,940,595 A | 8/1999 | Reber et al. |
| 5,946,646 A | 8/1999 | Schena et al. |
| 5,948,061 A | 9/1999 | Merriman et al. |
| 5,950,173 A | 9/1999 | Perkowski |
| 5,957,695 A | 9/1999 | Redford et al. |
| 5,959,623 A | 9/1999 | van Hoff et al. |
| 5,960,411 A | 9/1999 | Hartman et al. |
| 5,963,916 A | 10/1999 | Kaplan |
| 5,964,836 A | 10/1999 | Rowe et al. |
| 5,966,696 A | 10/1999 | Giraud |
| 5,971,277 A | 10/1999 | Cragun et al. |
| 5,978,773 A | 11/1999 | Hudetz et al. |
| 5,979,757 A | 11/1999 | Tracy et al. |
| 5,986,651 A | 11/1999 | Reber et al. |
| 5,992,752 A | 11/1999 | Wilz, Sr. et al. |
| 5,995,105 A | 11/1999 | Reber et al. |
| 5,996,007 A | 11/1999 | Klug et al. |
| 5,999,912 A | 12/1999 | Wodarz et al. |
| 5,999,914 A | 12/1999 | Blinn et al. |
| 6,009,407 A | 12/1999 | Garg |
| 6,009,410 A | 12/1999 | LeMole et al. |
| 6,011,537 A | 1/2000 | Slotznick |
| 6,012,083 A | 1/2000 | Savitzky et al. |
| 6,012,102 A | 1/2000 | Shachar |
| 6,027,024 A | 2/2000 | Knowles |
| 6,032,195 A | 2/2000 | Reber et al. |
| 6,035,332 A | 3/2000 | Ingrassia, Jr. et al. |
| 6,038,545 A | 3/2000 | Mandeberg et al. |
| 6,044,218 A | 3/2000 | Faustini |
| 6,045,048 A | 4/2000 | Wilz, Sr. et al. |
| 6,061,659 A | 5/2000 | Murray |
| 6,064,979 A | 5/2000 | Perkowski |
| 6,065,024 A | 5/2000 | Renshaw |
| 6,078,848 A | 6/2000 | Bernstein |
| 6,081,827 A | 6/2000 | Reber et al. |
| 6,091,411 A | 7/2000 | Straub |
| 6,094,673 A | 7/2000 | Dilip et al. |
| 6,108,656 A | 8/2000 | Durst et al. |
| 6,119,165 A | 9/2000 | Li et al. |
| 6,125,388 A | 9/2000 | Reisman |
| 6,134,548 A | 10/2000 | Gottsman et al. |
| 6,138,151 A | 10/2000 | Reber et al. |
| 6,141,666 A | 10/2000 | Tobin |
| 6,152,369 A | 11/2000 | Wilz et al. |
| 6,154,738 A | 11/2000 | Call |
| 6,157,946 A | 12/2000 | Itakura et al. |
| 6,199,048 B1 | 3/2001 | Hudetz et al. |
| 6,213,394 B1 | 4/2001 | Schumacher et al. |
| 6,247,044 B1 | 6/2001 | Gosling et al. |
| 6,314,451 B1 | 11/2001 | Landsman et al. |
| 6,314,457 B1 | 11/2001 | Schena et al. |
| 6,317,761 B1 | 11/2001 | Landsman |
| 6,430,554 B1 | 8/2002 | Rothschild |
| 6,434,563 B1 | 8/2002 | Pasquali et al. |
| 6,448,979 B1 | 9/2002 | Schena et al. |
| 6,490,567 B1 | 12/2002 | Gregory |

| | | | |
|---|---|---|---|
| 6,532,481 | B1 | 3/2003 | Fassett, Jr. |
| 6,542,933 | B1 * | 4/2003 | Durst et al. ................. 709/229 |
| 6,591,247 | B2 * | 7/2003 | Stern ............................ 705/14 |
| 6,865,593 | B1 | 3/2005 | Reshef et al. |
| 6,925,495 | B2 | 8/2005 | Hegde et al. |
| 6,959,286 | B2 | 10/2005 | Perkowski |
| 2002/0129089 | A1 | 9/2002 | Hegde et al. |
| 2002/0161672 | A1 | 10/2002 | Banks et al. |

FOREIGN PATENT DOCUMENTS

| | | |
|---|---|---|
| EP | 0 837 406 A2 | 4/1998 |
| EP | 0 856 812 A2 | 5/1998 |
| EP | 0 856 812 A3 | 5/1999 |
| WO | WO 00/28455 | 5/1900 |
| WO | WO 95/15533 | 6/1995 |
| WO | WO 96/30864 | 10/1996 |
| WO | WO 97/01137 | 1/1997 |
| WO | WO 97/07656 | 3/1997 |
| WO | WO 97/21183 | 6/1997 |
| WO | WO 97/37319 | 10/1997 |
| WO | WO 98/03923 | 1/1998 |
| WO | WO 98/06055 | 2/1998 |
| WO | WO 98/09243 | 3/1998 |
| WO | WO 98/19259 | 5/1998 |
| WO | WO 98/20411 | 5/1998 |
| WO | WO 98/20434 | 5/1998 |
| WO | WO 98/20440 | 5/1998 |
| WO | WO 98/21679 | 5/1998 |
| WO | WO 98/21713 | 5/1998 |
| WO | WO 98/24036 | 6/1998 |
| WO | WO 98/24049 | 6/1998 |
| WO | WO 98/25198 | 6/1998 |
| WO | WO 98/29822 | 7/1998 |
| WO | WO 98/34458 | 8/1998 |
| WO | WO 98/35297 | 8/1998 |
| WO | WO 98/38589 | 9/1998 |
| WO | WO 98/38761 | 9/1998 |
| WO | WO 98/51035 | 11/1998 |
| WO | WO 98/51036 | 11/1998 |
| WO | WO 98/51077 | 11/1998 |
| WO | WO 98/57295 | 12/1998 |
| WO | WO 98/58320 | 12/1998 |
| WO | WO 99/00756 | 1/1999 |
| WO | WO 99/33013 | 7/1999 |
| WO | WO 99/33014 | 7/1999 |
| WO | WO 00/16205 | 3/2000 |
| WO | WO 00/16211 | 3/2000 |
| WO | WO 00/43862 | 7/2000 |
| WO | WO 00/45302 | 8/2000 |
| WO | WO 00/50844 | 8/2000 |
| WO | WO 00/63780 | 10/2000 |
| WO | WO 00/65509 | 11/2000 |
| WO | WO 00/70525 | 11/2000 |
| WO | WO 01/01586 A3 | 1/2001 |
| WO | WO 01/15019 A2 | 3/2001 |
| WO | WO 01/15021 A2 | 3/2001 |
| WO | WO 01/15035 A2 | 3/2001 |
| WO | WO 01/39001 A1 | 5/2001 |

OTHER PUBLICATIONS

Product brochure entitled "The Catalog" (1996) by QuickResponse Services Corporation, www.qrs.com, pp. 1-2.

Operating manual for the QRS Keystone for Vendors (1996) by QRS Corporation, www.qrs.com, pp. 1-126.

Operating manual for the QRS Keystone for Retailers (1996) by QRS Corporation, www.qrs.com, pp. 1-115.

Web-based product brochure for the Synclink Item Catalog by Vialink, Inc., http://www.vialink.com/products/products-catalog.html, 1 page.

Excerpts from the web-based publication entitled "Introduction to JDBC™" by JavaSoft, circa 1999, http://java.sun.com/docs/books/dbc/intro.html, pp. 1-4.

Scientific article entitled "Animating the Ad" by Mark Gimein, The Industry Standard, Feb. 22-Mar. 1, 1999, pp. 1-6.

Web-based product brochure for "Home Network Enliven Services" by Enliven Services, http://www.enliven.com/products/prodinfo.htm, 1999, pp. 1-8.

Web-based product brochure for "Thinking Media ActiveAds" by Thinking Media, http://thethinkingmedia.com/activeads/index.html, 1999, 1 page.

Product brochure for "NCR Web Kiosk Solutions" by NCR Corporation, www.ncr.com, 1999, pp. 1-14.

Scientific publication entitled "In-House vs. Out-Sourced Ad Serving" by Real Media, Inc., Fort Washington PA, Dec. 22, 1998, pp. 1-4.

Scientific publication entitled "IDOCs™ Linking the Worlds of Print and Electronic Medias$^{SM}$" by NeoMedia Technologies, Inc., Sep. 11, 1998, pp. 1-8.

Press Release entitled ""Applied Intelligence Group Inc. Announces New Product Solution that Enhances its Core ViaLink Service"" by Investors Press Releases., http://www2.vialink.com/investors/press_releases/02_24_98.html, Feb. 24, 1998, pp. 1-2.

Web-based technical report entitled "Amended Annual Report (10KSB) for Applied Intelligence Group, Inc." http://www.edgar-online.com, Mar. 28, 1997, pp. 1-55.

Draft Technical Report entitled "The Retail Store of the Future: Crest of the Third Wave" by Robert J. Corey, Ph.D. and John R. Spears, Ed.D., Jan. 15, 1997, pp. 1-45.

Product Brochure for the PREMO WEBDOX by Premenos Corporation, Concord, CA, www.premenos.com, 1997, 1 page.

Operating manual entitled "WEBDOX General Information Manual" by Premenos Corp., Concord, CA, 1996-1997, pp. 1-20.

Scientific publication entitled "Smart Catalogs and Virtual Catalogs" by Keller, Computer Sci.Dept., Stanford University, 1995, pp. 1-11.

Scientific publication entitled "World-Wide Web: The Information Universe", 1996, by Tim Berners-Lee et al., CERN, 1211 Geneva 23, Switzerland, pp. 1-8.

Web article entitled "Macromedia Takes Stake in ePod" by Pamela Parker, Jul. 5, 2000, http://www.clickz.com/news/article/php/408081.

Web article entitled "New Ad Vehicle Fights the Banner Ad Clickthrough Dilemma" by Ann M. Mack, May 22, 2000, Brandweek, http://www.findarticles.com/p/articles/mi_m0BDW/is_21_41/ai_62661555.

Web article entitled "NBCi Signs 3-Tier Deal to Plug ePod Showcase" by Ann M. Mack, 2001, AdweekOnline, http://www.geoffclendenning.com/Adweek%20Online2.htm.

Web article entitled "e-Pod Bundles with DoubleClick", AdWeekOnline Interactive News, Jun. 15, 2000, http://www.geoffclendenning.com/Adweek%20Online.htm.

Web Article entitled "E-Commerce Report: E-Tailers Fine-Tune Affiliate Sales" by Bob Tedeschi, Nov. 6, 2000, New York Times on the Web, http://www.geoffclendenning.com/NYTimes_press.htm.

* cited by examiner

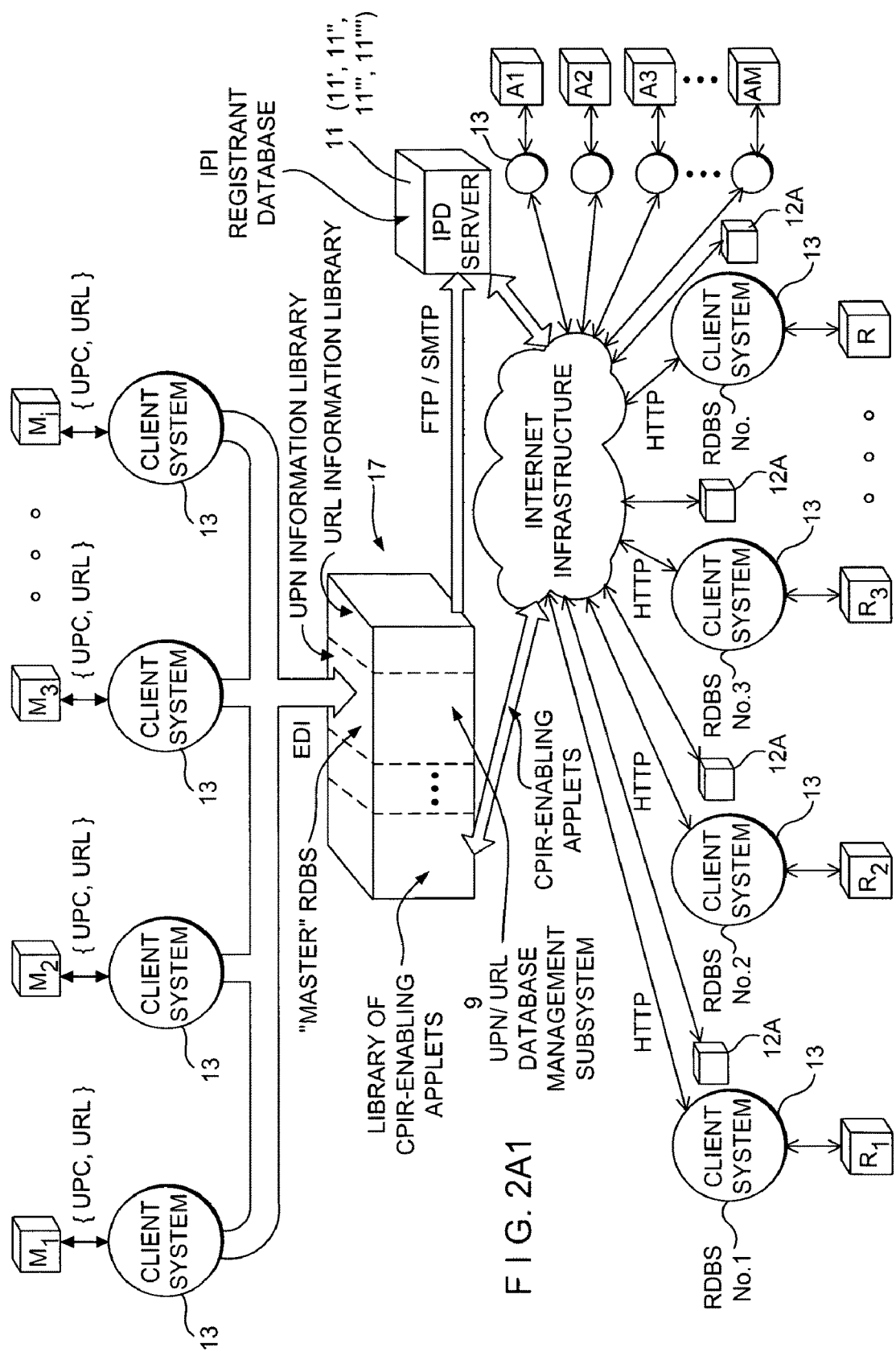
FIG. 2A1

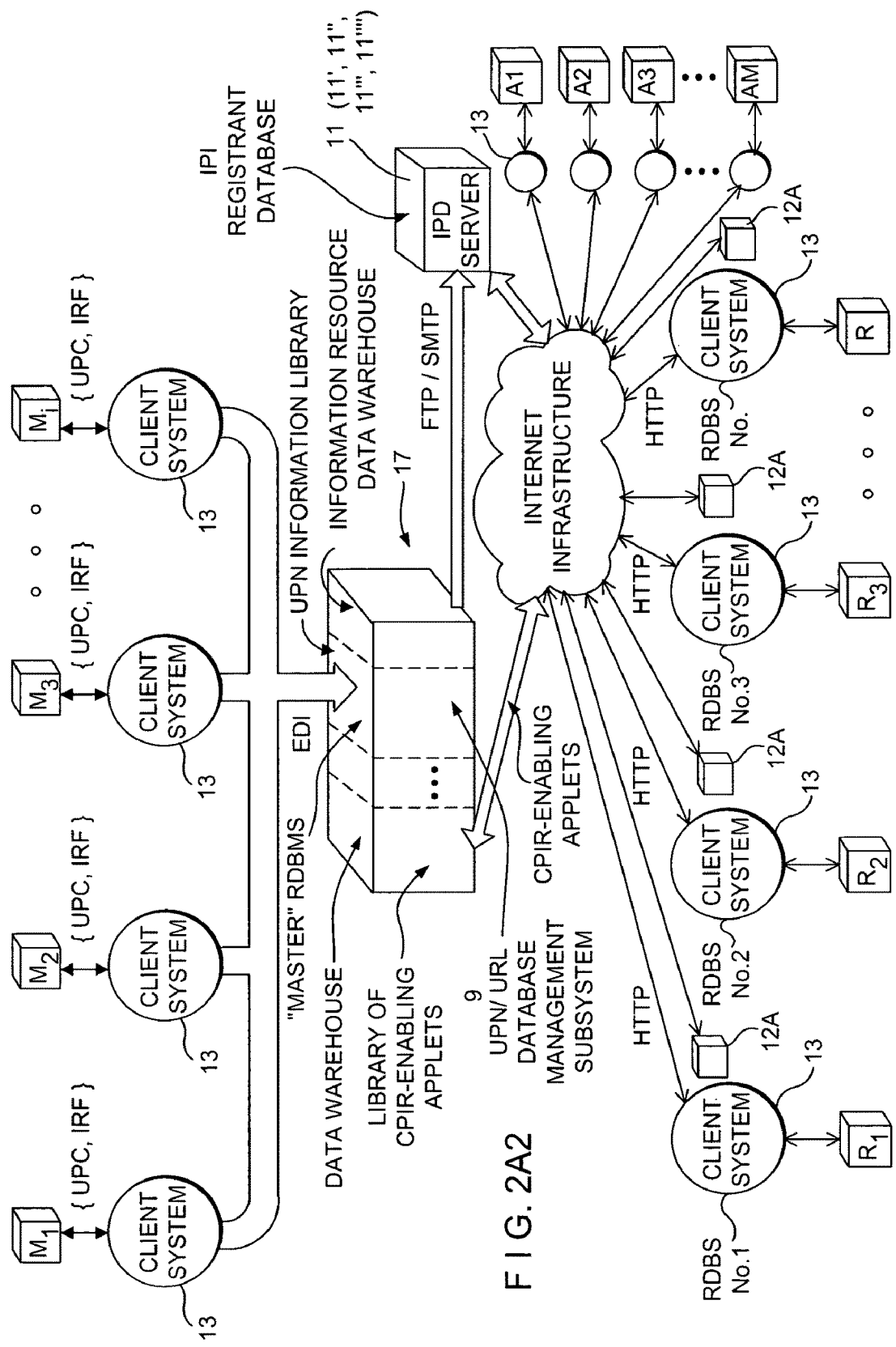
FIG. 2A2

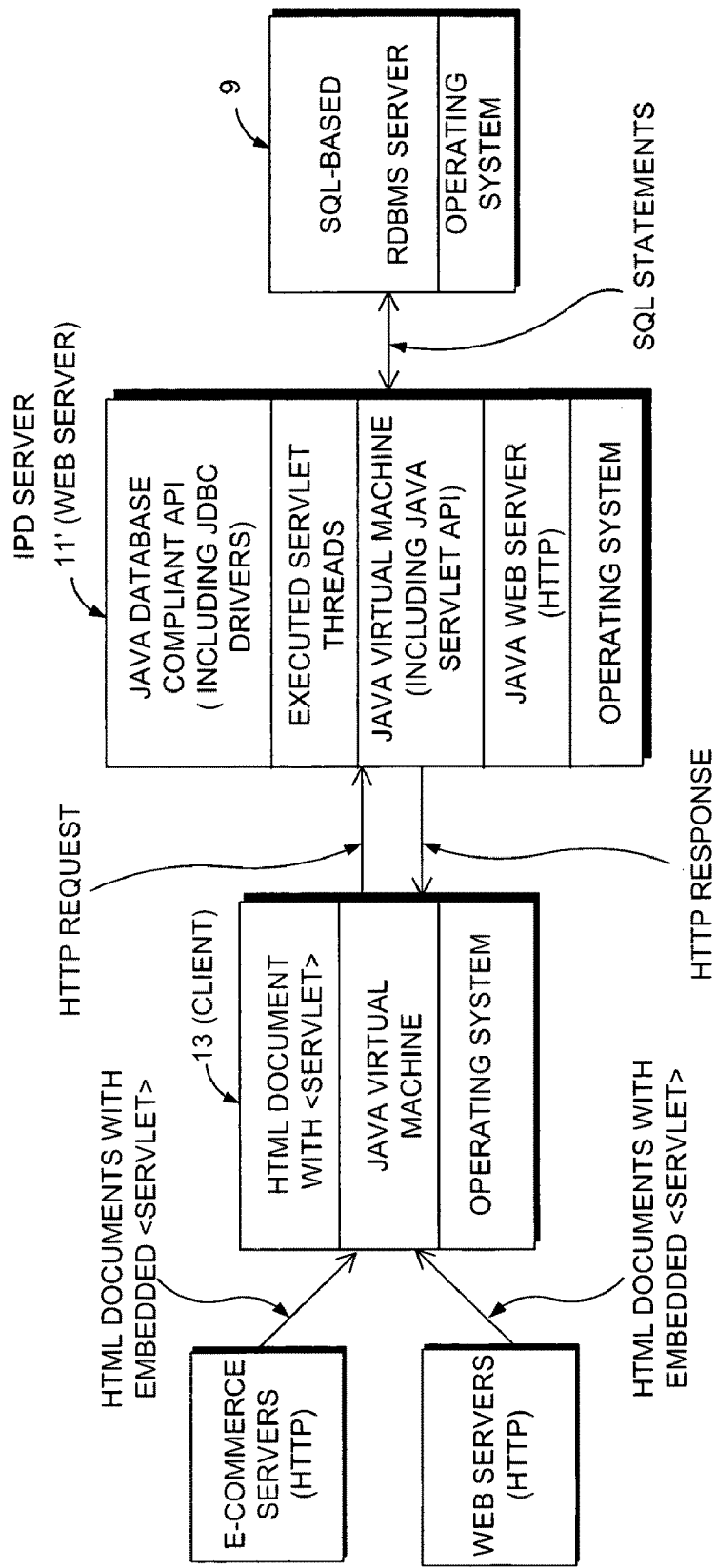
FIG. 2B1

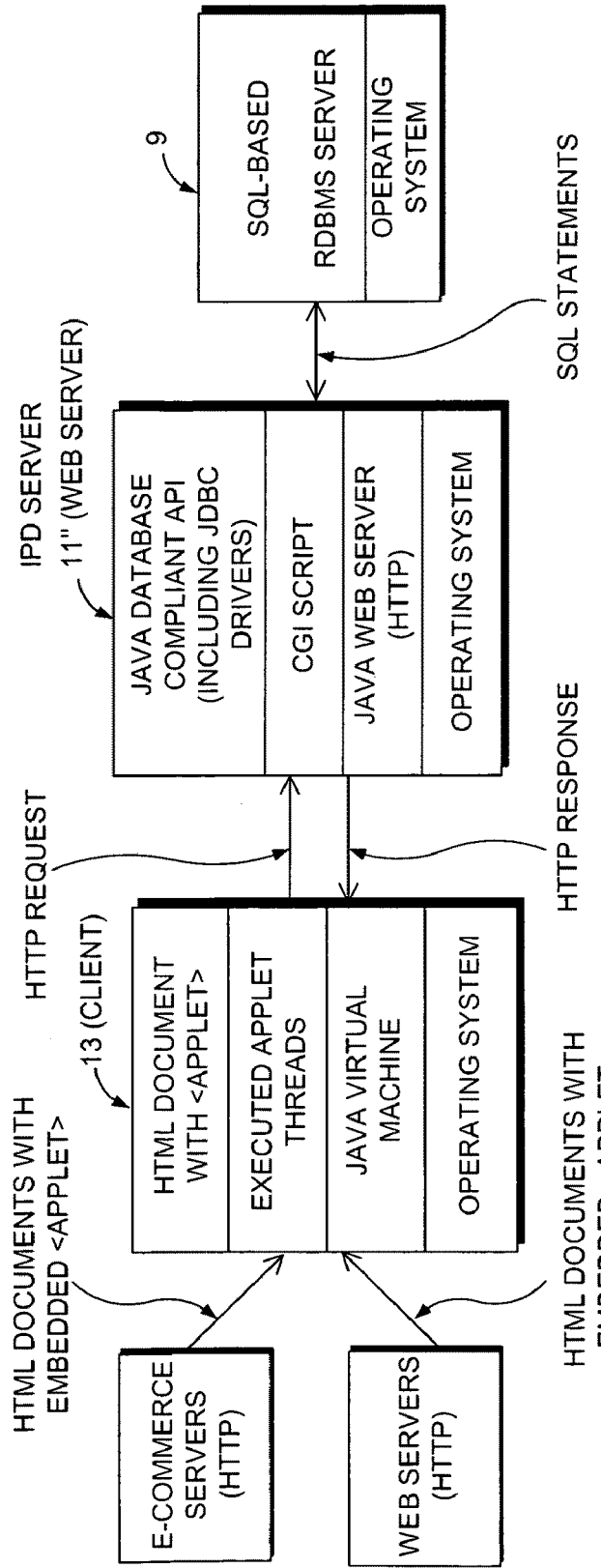
FIG. 2B2

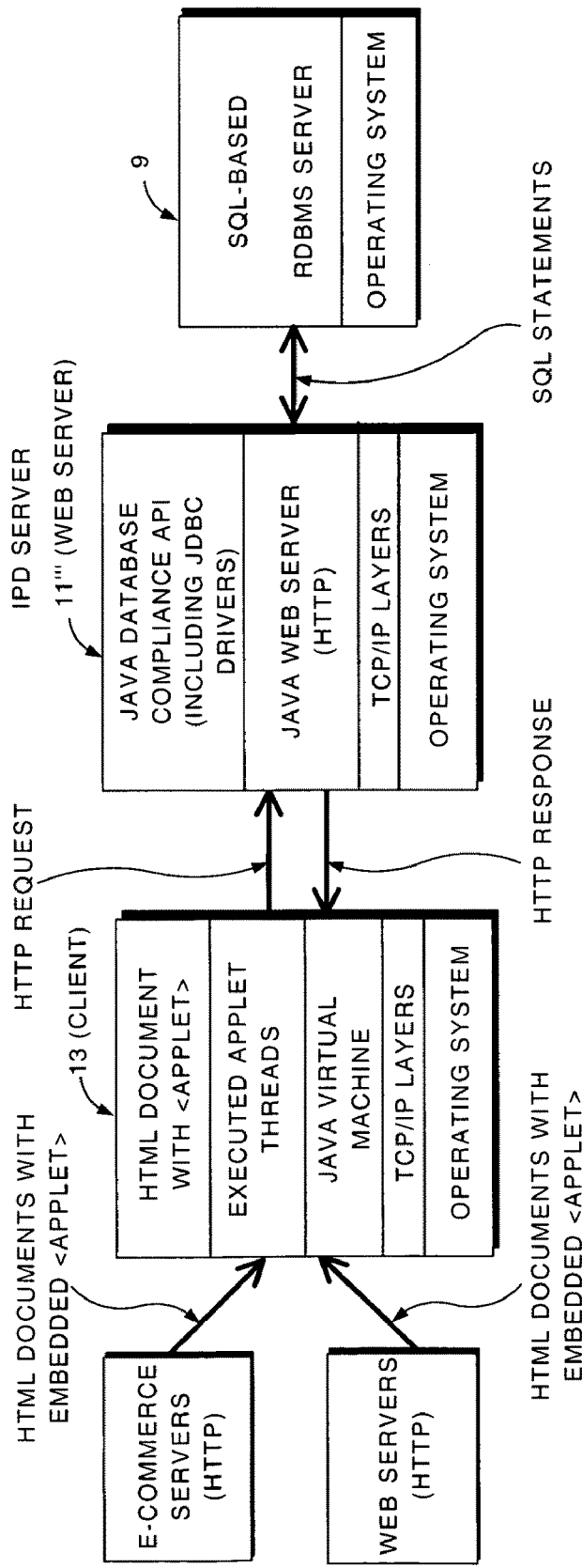
FIG. 2B3

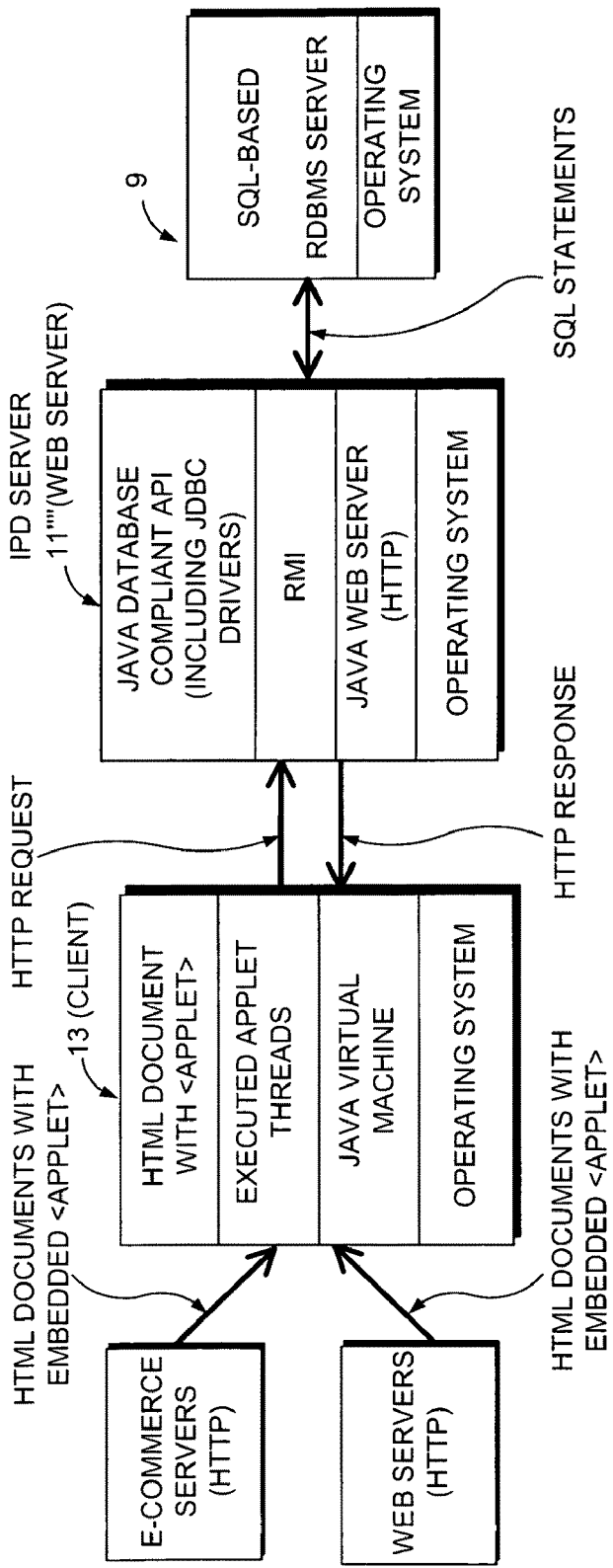
FIG. 2B4

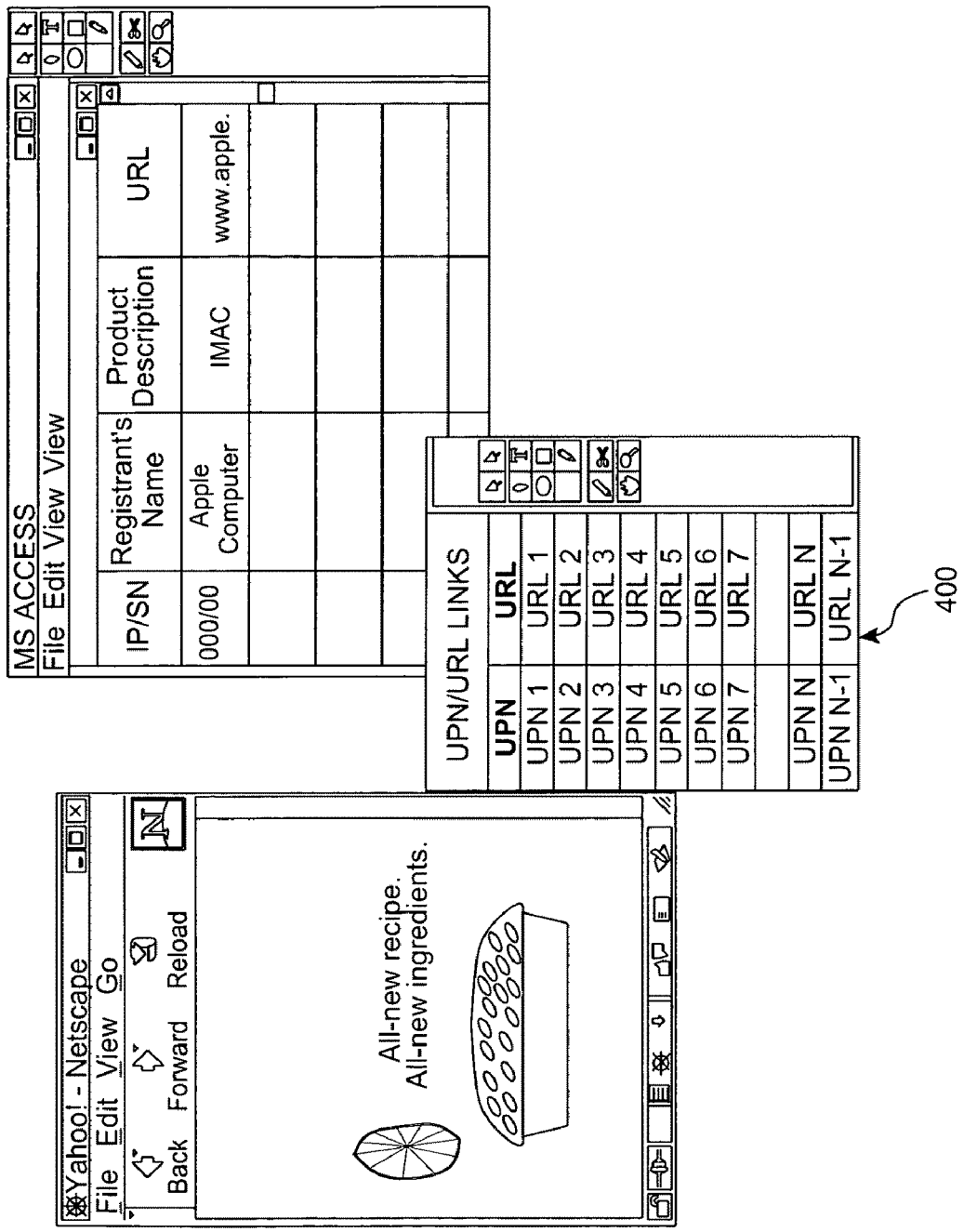
FIG. 2C1

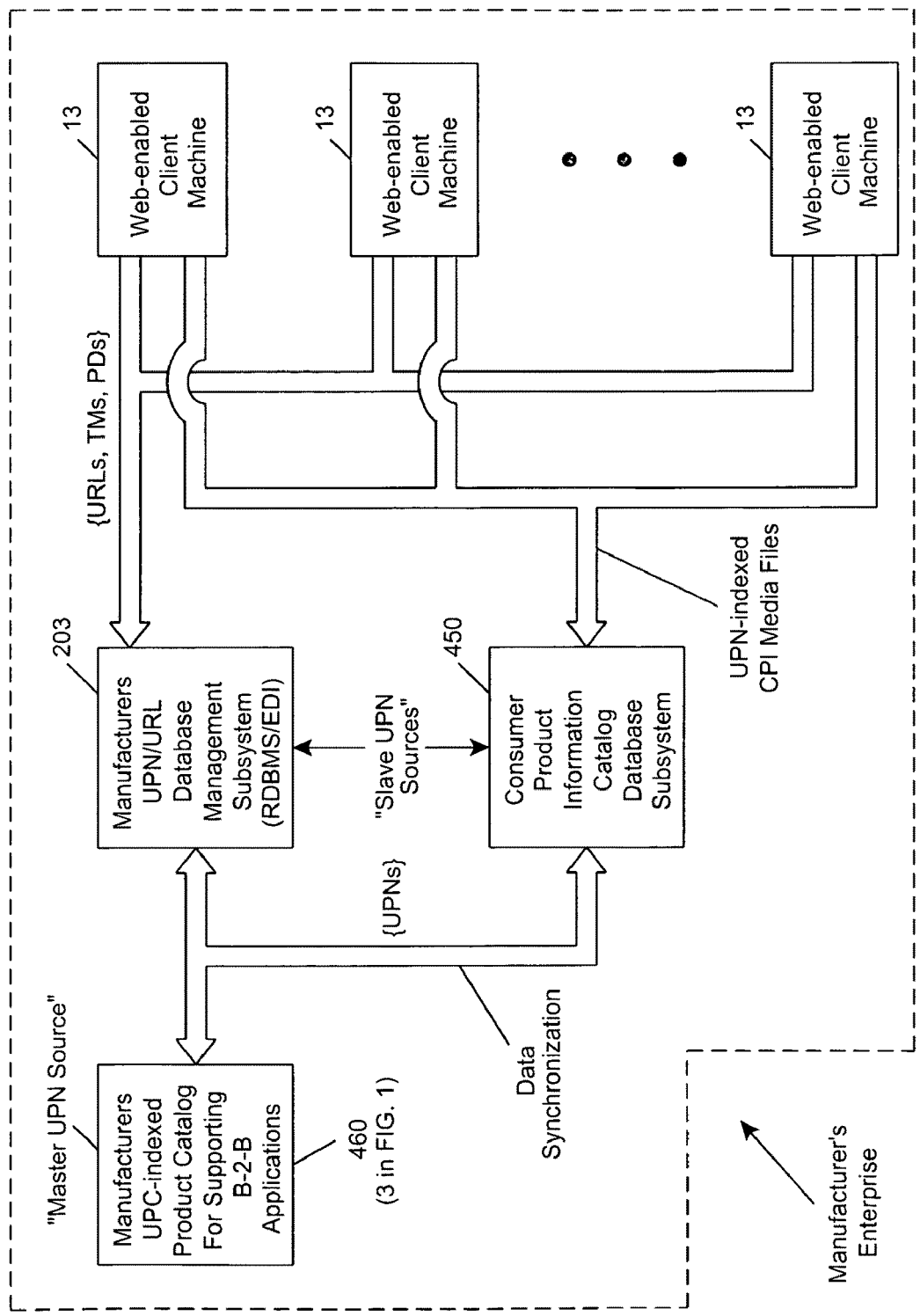
FIG. 2C2

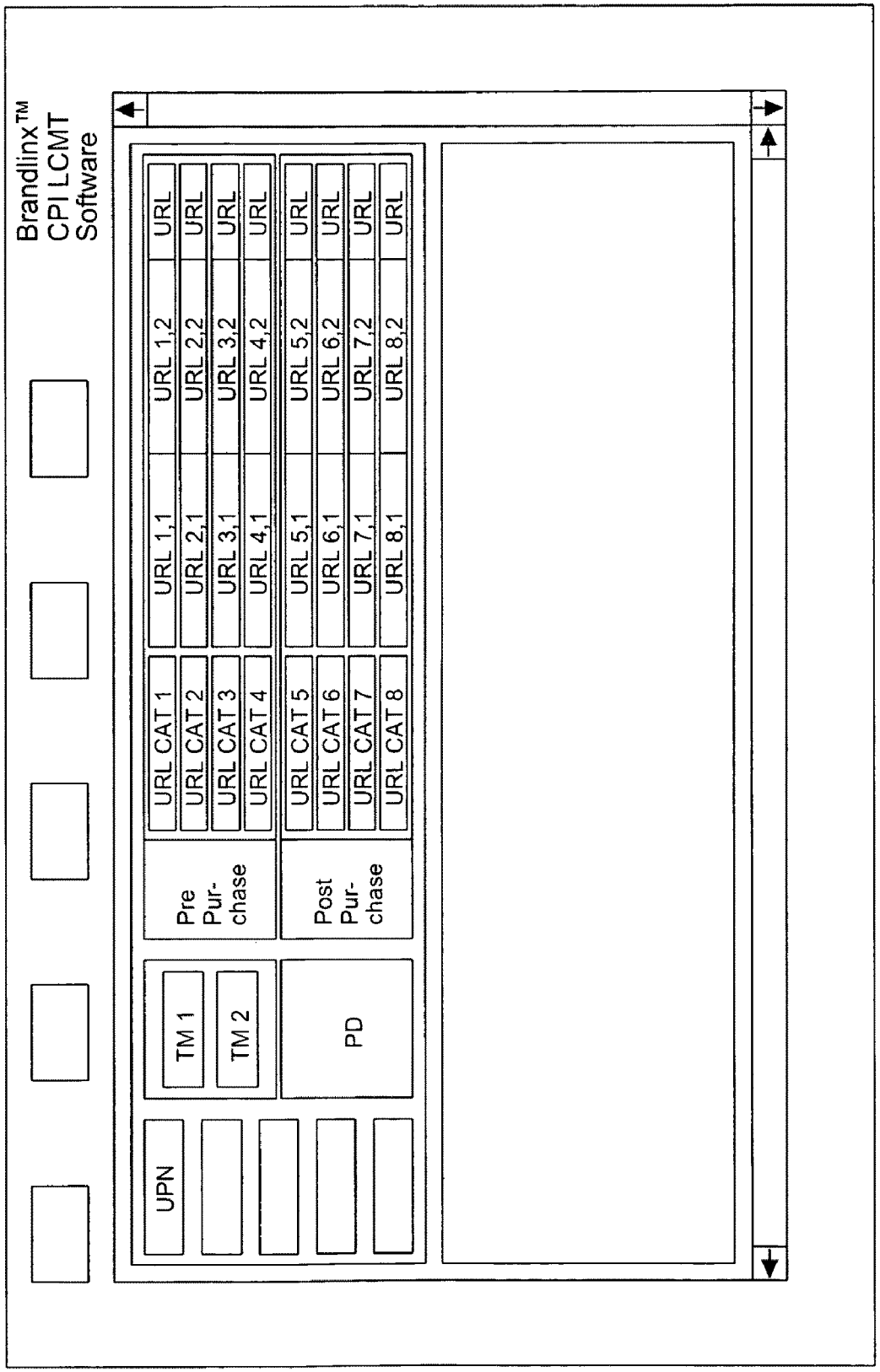
FIG. 2C3

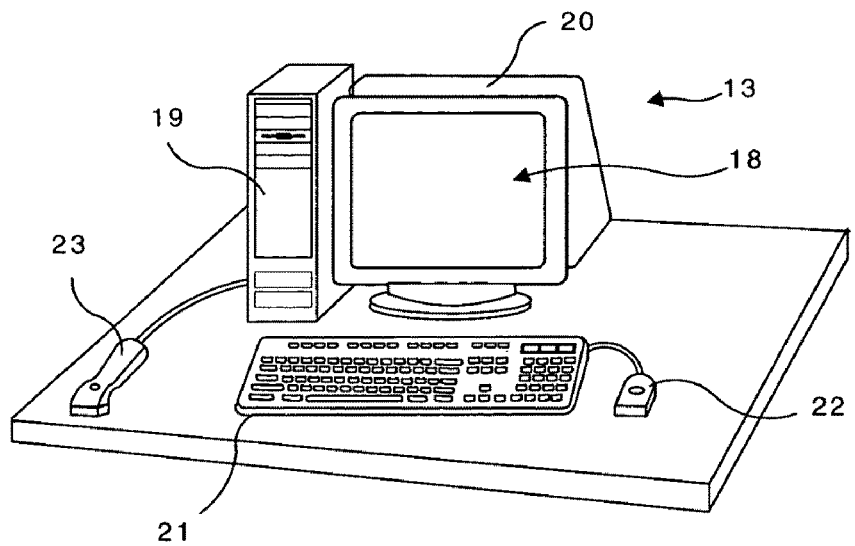
F I G. 3A1
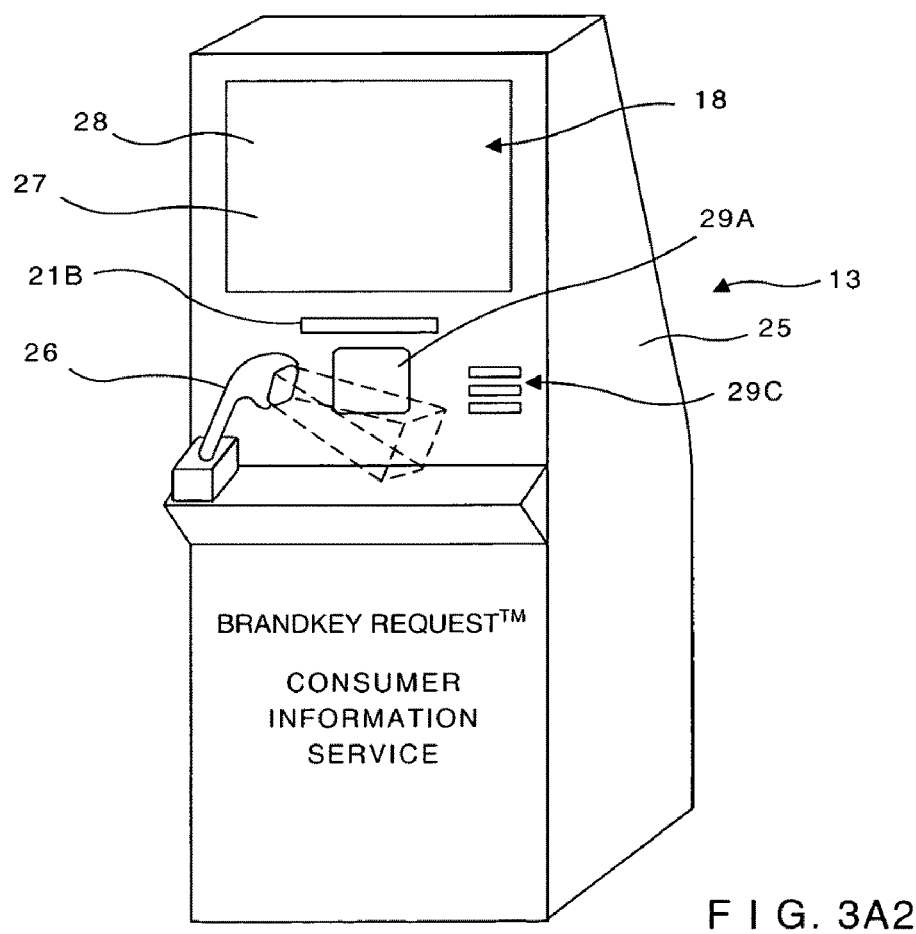
F I G. 3A2

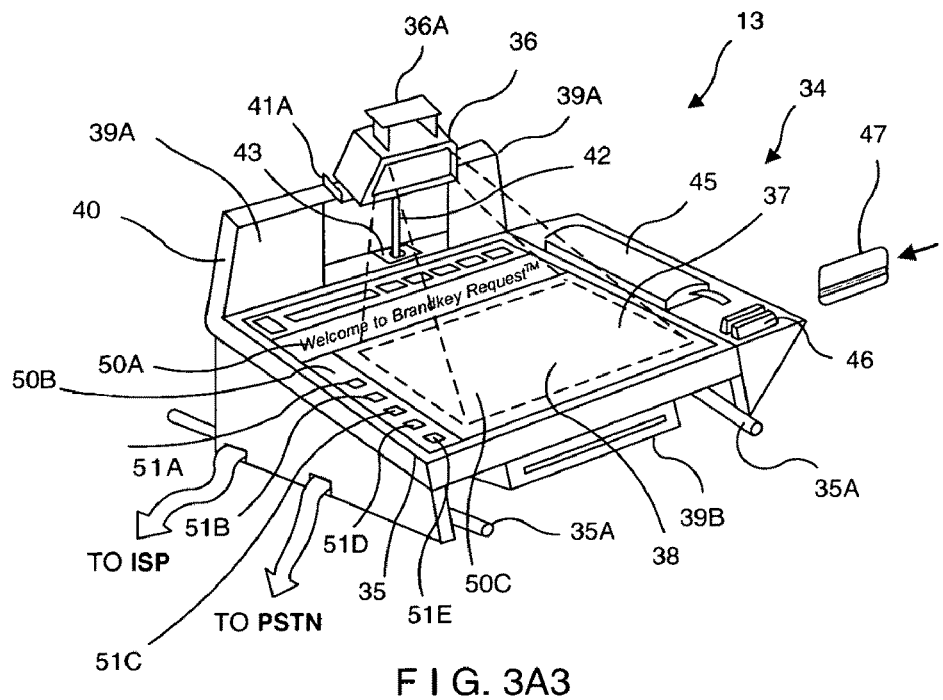
FIG. 3A3
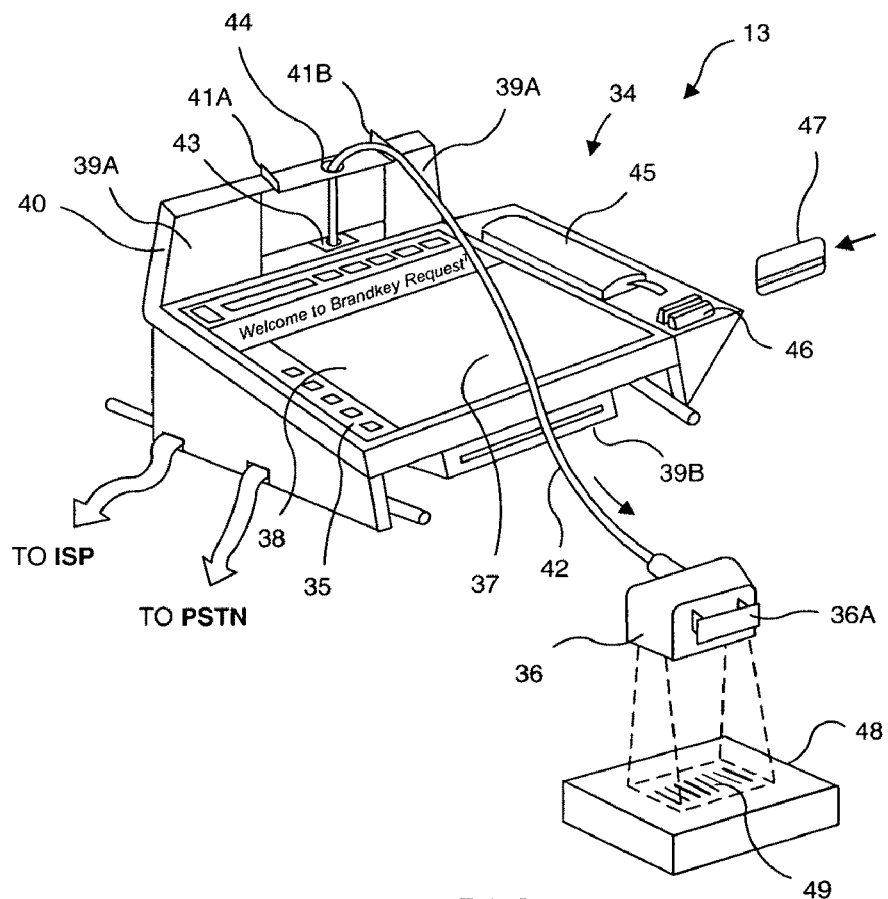
FIG. 3A4

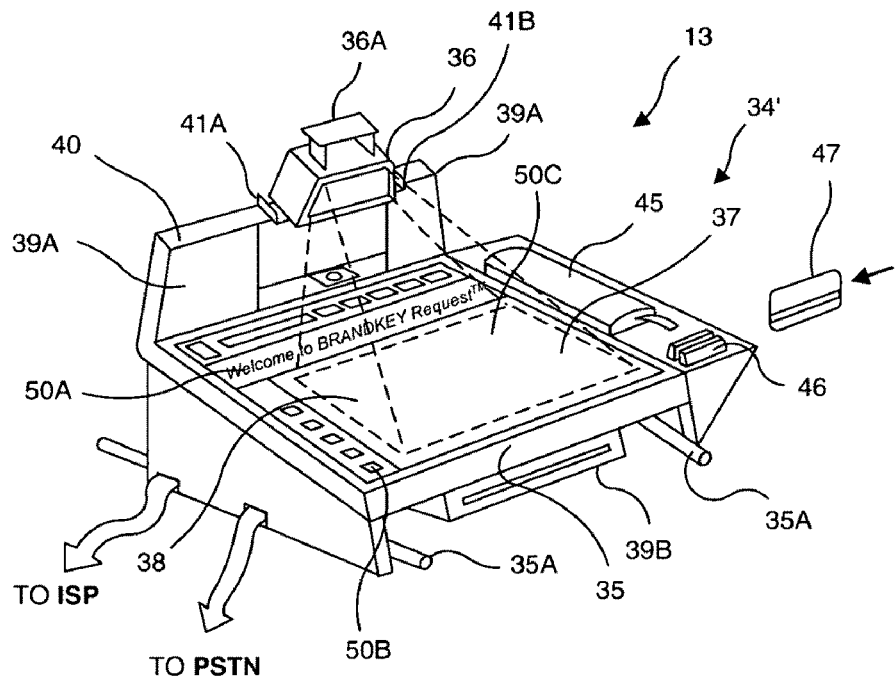
FIG. 3A5
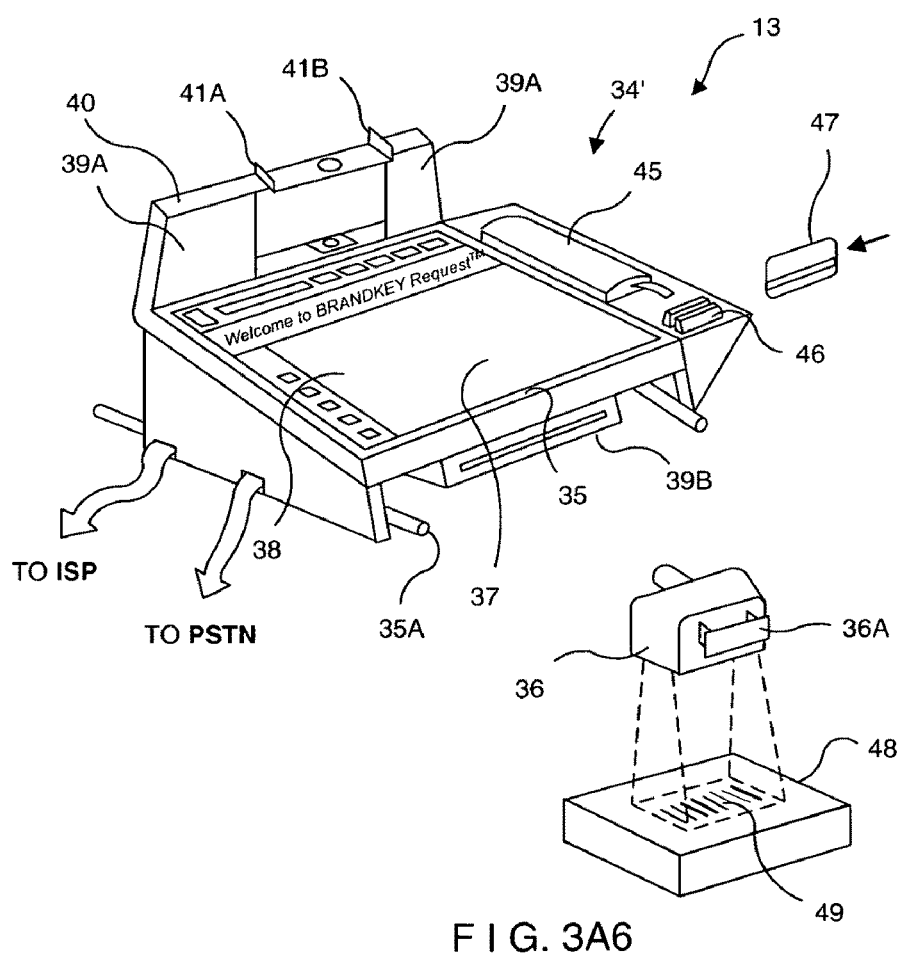
FIG. 3A6

| IP / SN | REGISTRANT'S NAME AND ADDRESS | PRODUCT DESCRIPTION | UNIFORM RESOURCE LOCATOR (URL) | TRADE/ SERVICE MARKS | e-mail ADDRESS | CPIR APPLETS | STATUS |
|---|---|---|---|---|---|---|---|
| 7/18908/ 17674/0 | APPLE COMPUTER, INC. CUPERTINO, CA. | POWER MAC 7600/120 COMPUTER | http:// www.power.com/pc | POWER MAC | | | |
| | | | | | | | |
| 0/373/100/6 | PROCTOR & GAMBLE | TOOTH PASTE | http:// www.tooth.com/pc | CREST | | | |
| 3/125547/ 68404/0 | WARNER WELCOME | ACID REDUCER | http:// www.zantac.com/pc | ZANTAC ZANTAC 75 | | | |
| | | | | | | | |
| 0/00005/ 17643/4 | KODAK, INC. | FILM PROCESSING | http:// www.kodak.com/pc | KODAK | | | |
| | | | | | | | |
| ... | ... | ... | ... | ... | ... | ... | ... |
| 0/27242/ 51057/9 | SONY, INC. | PERSONAL COMPUTER | http://www.sony.com/ pc | SONY | | | |

CONSUMER PRODUCT INFO. REQUEST, CPIR-ENABLING APPLET LIBRARY

FIG. 4A1

| URL$_j$ | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLANEOUS INFORMATION FIELD | PRODUCT ADVERTISEMENT INFORMATION FIELD |
|---|---|---|---|---|---|---|---|
| | | | | | | | |
| | | | | | | | |
| ... | ... | ... | ... | ... | ... | ... | ... |
| | | | | | | | |

FIG. 4A2

| IP/SN | REGISTRANT'S NAME AND ADDRESS | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| | | | | | |
| 0/30000/01020/4 | QUAKER, INC. | OATMEAL | QUAKER | | |
| 0/496/390/1 | COLA COLA, INC. | COCA SODA | COCA - COLA, COKE | | |
| 0/7599/24245/2 | WARNER BROS. | PAT METHANY AUDIO CD | GEFFEN | | |
| ... | ... | ... | ... | ... | ... |
| | | | | | |

| Consumer Product |
| --- |
| UPC Number |
| Company Name |
| Manufacturer ID Number |
| Manufacturer Product Number |
| Manufacturer Website URL |
| Product Description |
| Primary Trademark |
| Secondary Trademark |
| Package Type |
| UPC Symbol Type |
| Website Marking on Package |
| 800 Consumer Phone Number |

FIG. 4C2

| Info. Resources on WWW |
| --- |
| UPC Number |
| Manufacturer ID Number |
| Manufacturer Product Number |
| Company Name |
| URL For Product Description |
| URL For Product Manual |
| URL For Warranty Service |
| URL For WWW Advertisement |
| URL For WWW Advertisement |
| URL For WWW Advertisement |
| URL For Product Wholesaler |
| URL For Product Wholesaler |
| URL For Product Wholesaler |
| URL For Product Retailer No.1 |
| URL For Product Retailer No.2 |
| URL For Product Retailer No.3 |
| URL For Direct Product Purchase |
| URL For Complementary Product |
| URL For Complementary Product |
| URL For Complementary Product |
| URL For Company Annual Report |
| URL For Company Stock Purchase |

FIG. 4C3

| RETAILER |
|---|
| Company Name |
| Street Address |
| City |
| State |
| Postal Code |
| Country |
| Manufacturer ID Number |
| Contact Person |
| Phone Number |
| E-Mail |
| Domain Name |
| Website Creation Date |
| Website Existence |
| Manufacturer Website URL |
| Manufacturer No. 1 |
| Manufacturer No. 2 |
| Manufacturer No. 3 |
| Manufacturer No. 4 |
| Manufacturer No. 5 |
| Manufacturer No. 6 |
| Manufacturer No. 7 |
| Manufacturer No. 8 |
| Manufacturer No. 9 |
| Manufacturer No. 10 |
| ⋮ |
| Manufacturer No. N |

FIG. 4D

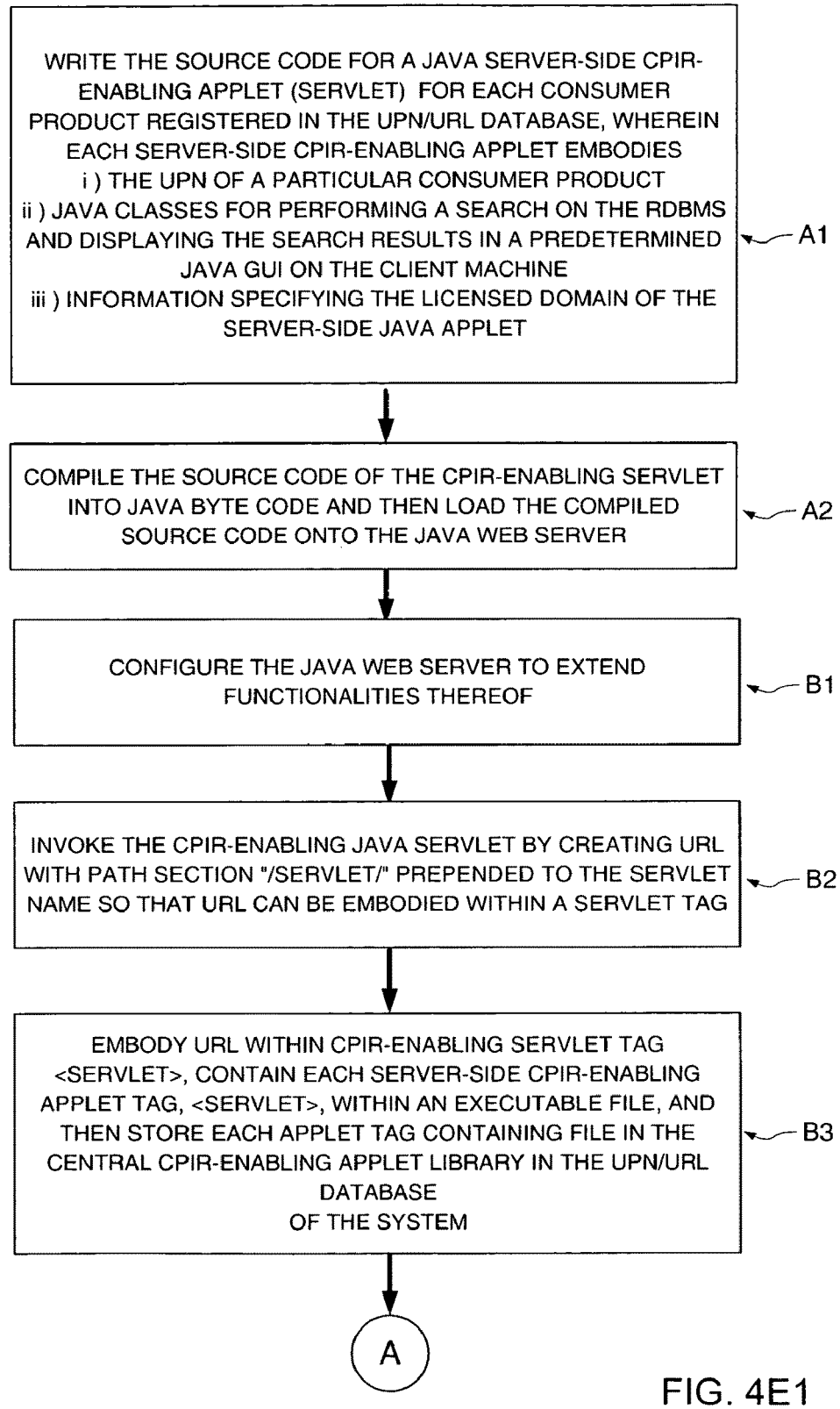
FIG. 4E1

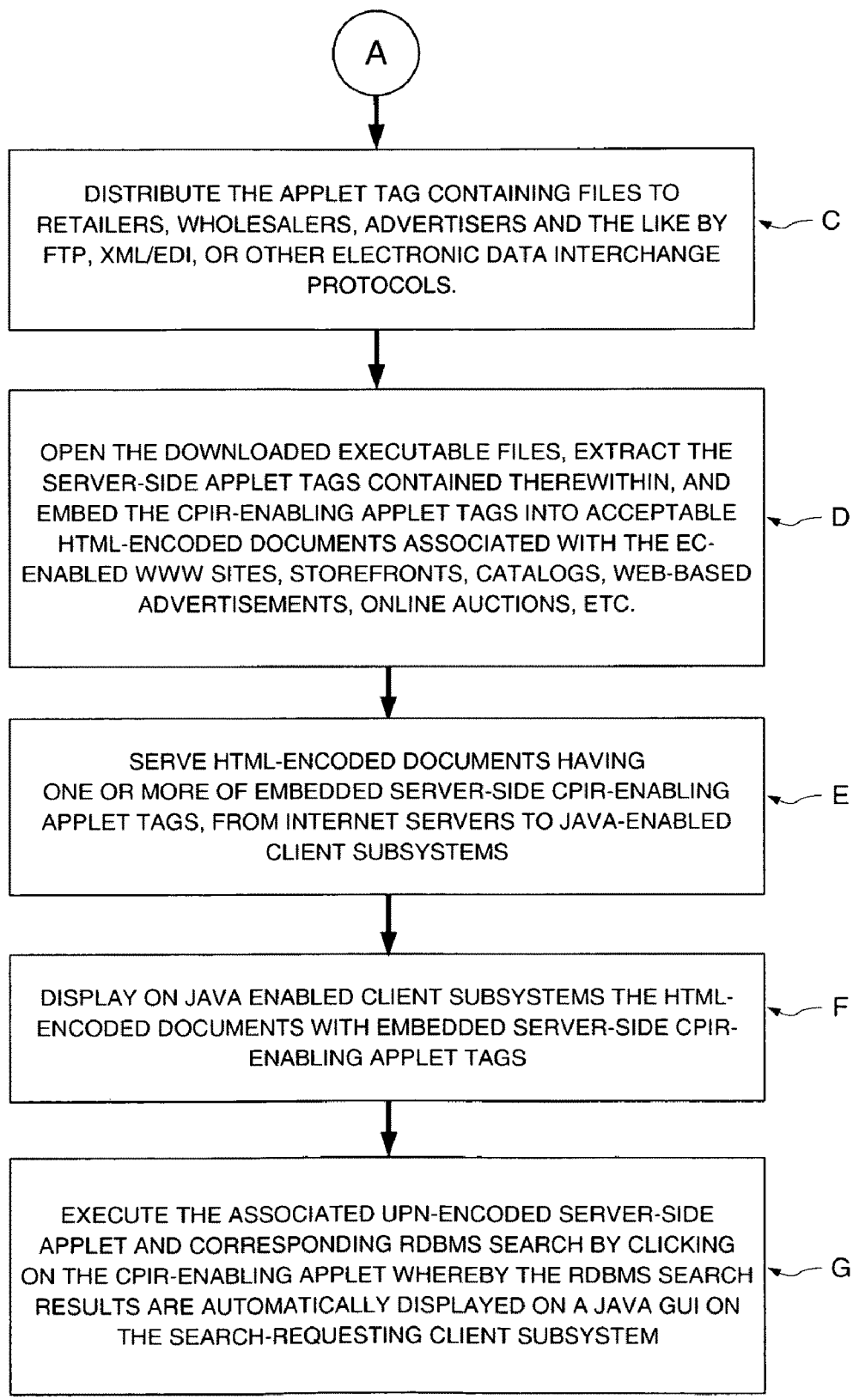
FIG. 4E2

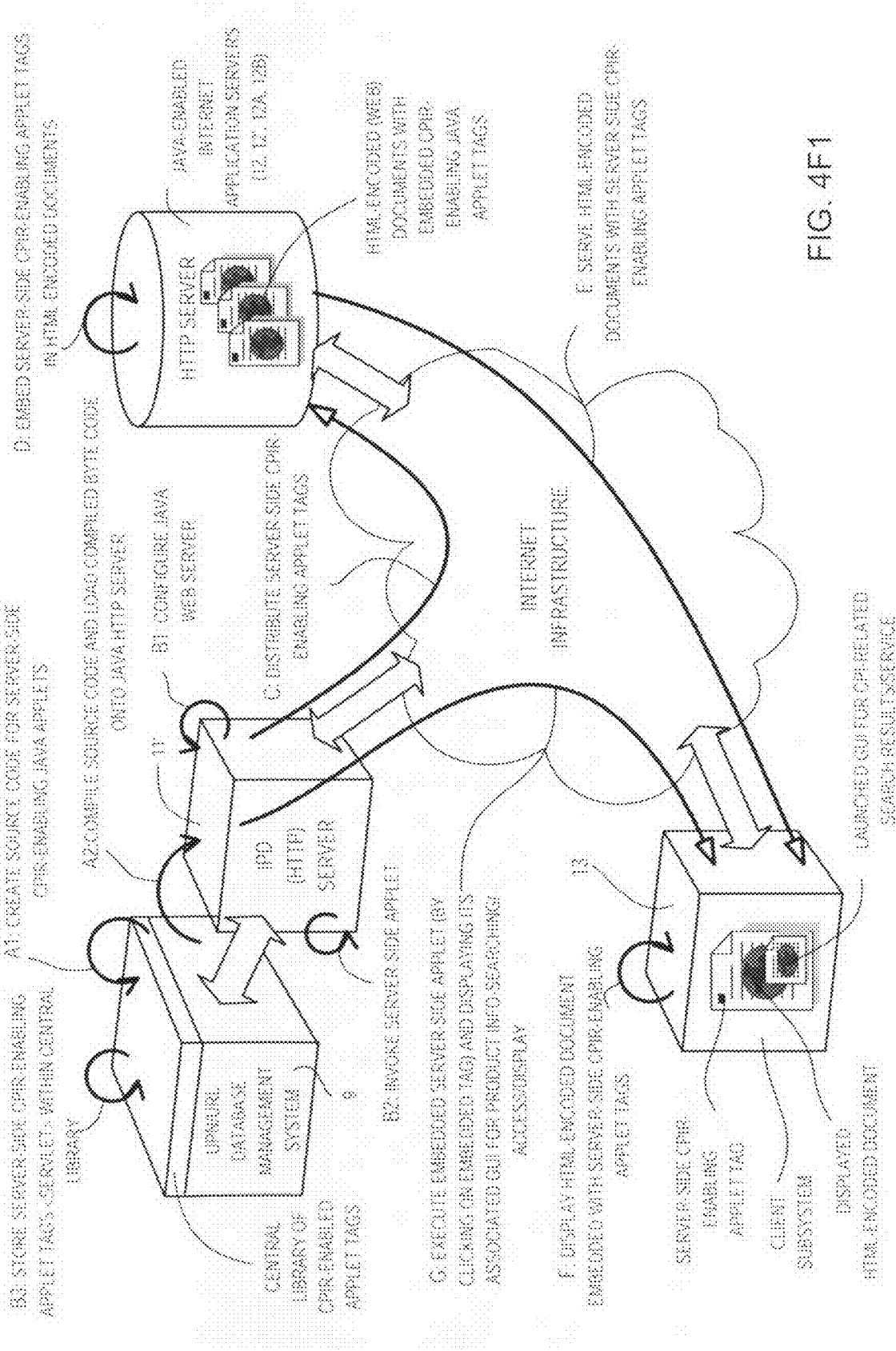
FIG. 4F1

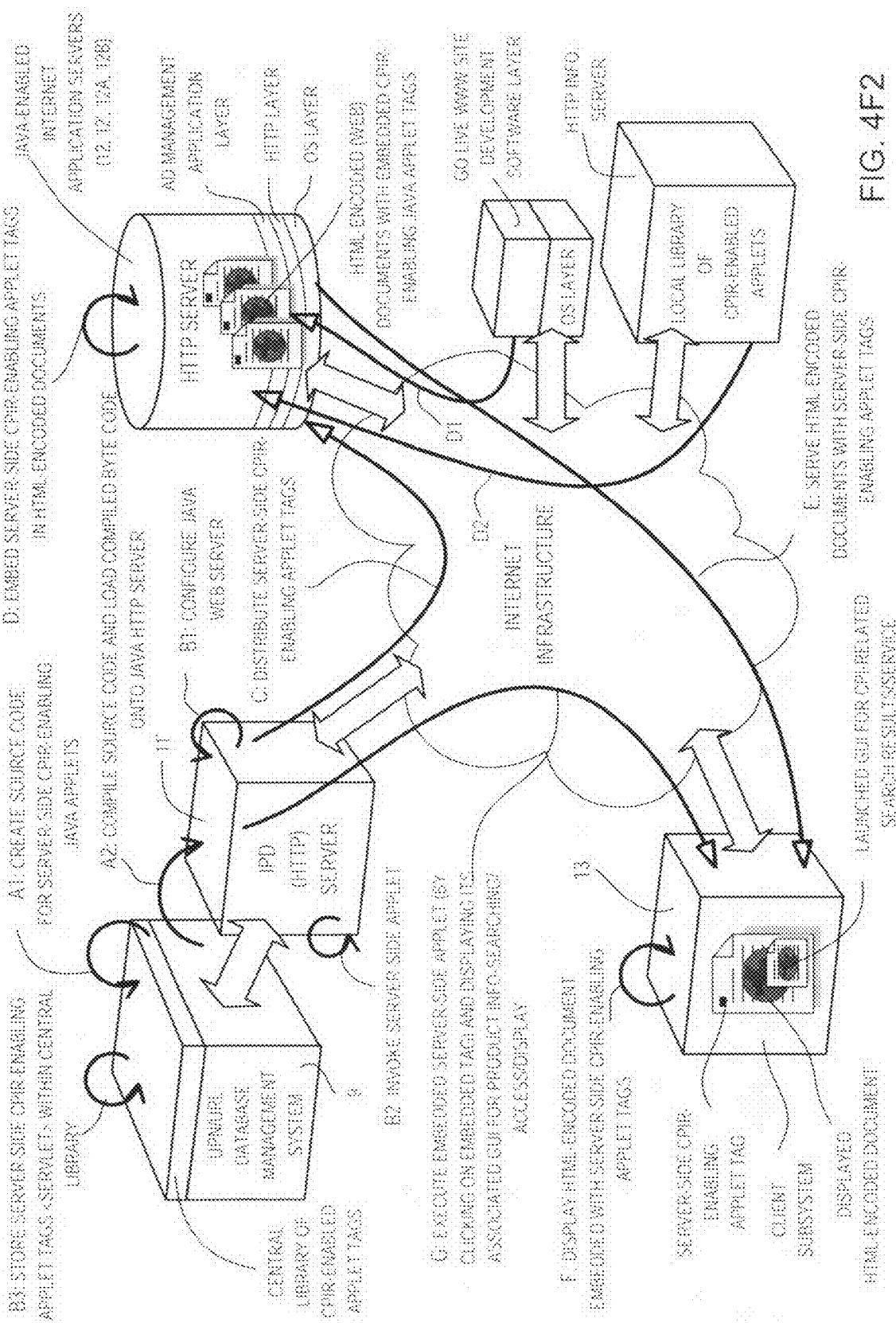
FIG. 4F2

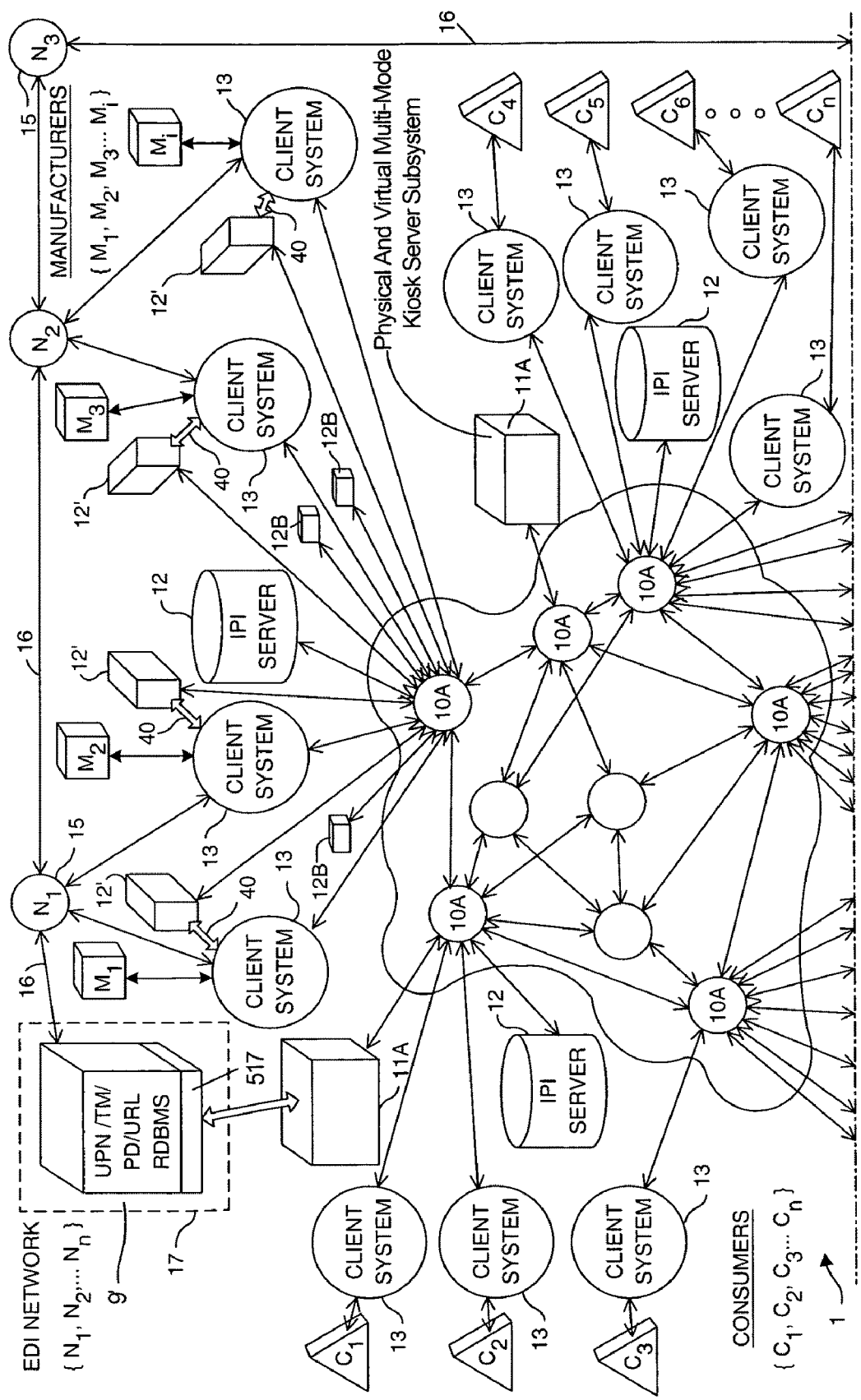
FIG. 6A1

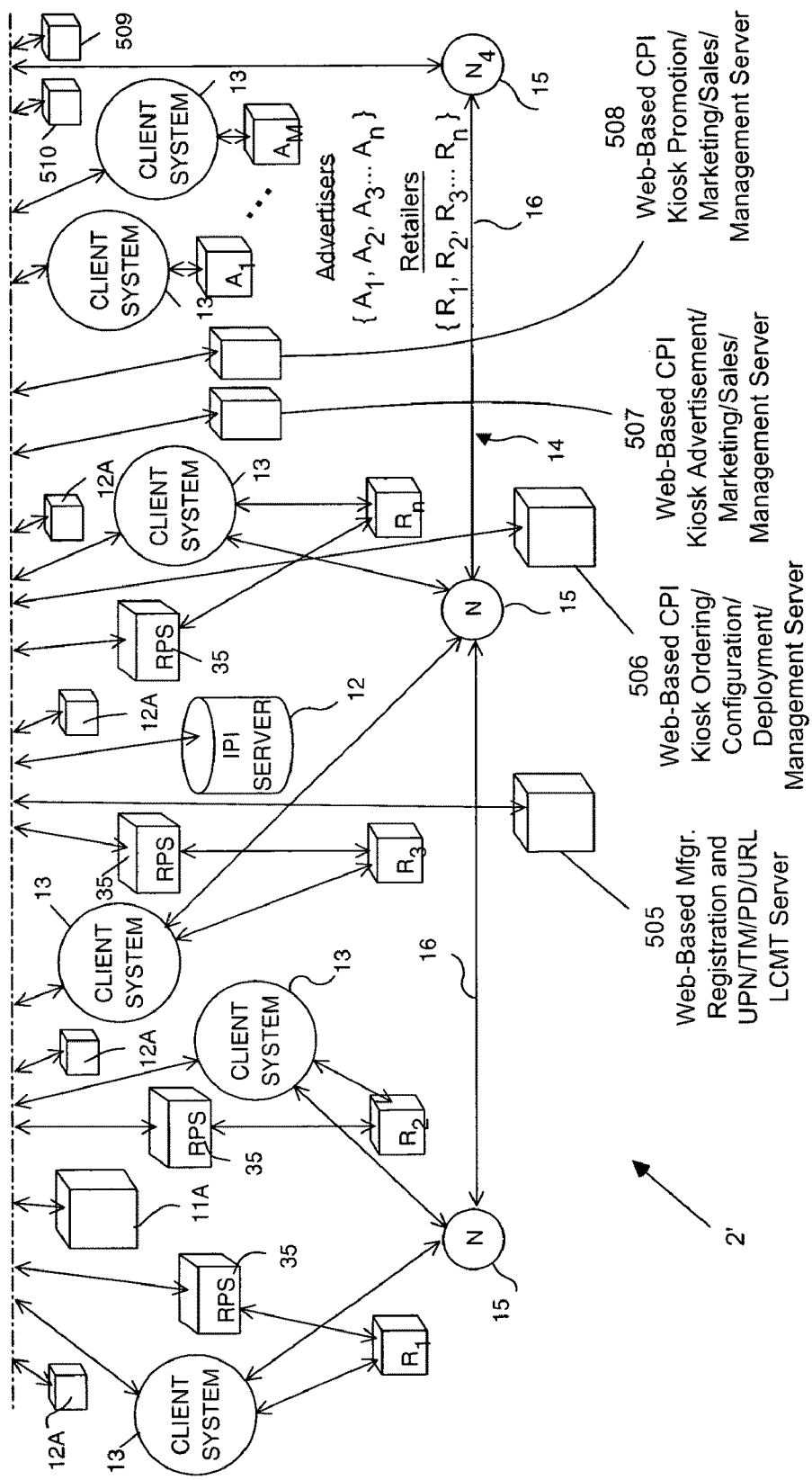
FIG. 6A2

Java Client's Distributed, Multitier Architecture

Java Client Architecture

INTERNET-BASED PRODUCT BRAND MARKETING COMMUNICATION NETWORK CONFIGURED TO ALLOW MEMBERS OF A PRODUCT BRAND MANAGEMENT TEAM TO COMMUNICATE DIRECTLY WITH CONSUMERS BROWSING HTML-ENCODED PAGES AT AN ELECTRONIC COMMERCE (EC) ENABLED WEB-SITE ALONG THE FABRIC OF THE WORLD WIDE WEB (WWW), USING PROGRAMABLE MULTI-MODE VIRTUAL KIOSKS (MMVKS) DRIVEN BY SERVER-SIDE COMPONENTS AND MANAGED BY PRODUCT BRAND MANAGEMENT TEAM MEMBERS

RELATED CASES

This Application is a Continuation-in-Part of application Ser. No. 10/693,856 filed Oct. 24, 2003, now abandoned; which is a Continuation-in-Part of application Ser. No. 10/602,990 filed Jun. 24, 2003, now abandoned; which is a Continuation-in-Part of application Ser. No. 09/716,848 filed Nov. 17, 2000, now abandoned; which is a Continuation-in-Part of application Ser. No. 09/695,744 filed Oct. 24, 2000, which is a Continuation-in-Part of application Ser. No. 09/641,908, filed Aug. 18, 2000, now abandoned; which is a Continuation-in-Part of application Ser. No. 09/599,690 filed Jun. 22, 2000, now abandoned; which is a Continuation-in-Part of application Ser. No. 09/483,105, filed Jan. 14, 2000, now abandoned; application Ser. No. 09/465,859 filed Dec. 17, 1999, now abandoned; which is a Continuation-in-Part of application Ser. No. 09/447,121 filed Nov. 22, 1999, now U.S. Pat. No. 6,625,581; application Ser. No. 09/441,973 filed Nov. 17, 1999, now U.S. Pat. No. 6,961,712; which is a Continuation-in-Part of application Ser. No. 09/284,917 filed Apr. 21, 1999, now abandoned, which is a National Stage Entry Application from International Application No. PCT/US97/19227 filed Oct. 27, 1997, published as WIPO Publication No. WO 98/19259 on May 7, 1998; as well as a Continuation-in-Part of the following U.S. Applications: Ser. No. 08/736,798 filed Oct. 25, 1996, now U.S. Pat. No. 5,918,214; Ser. No. 08/752,136 filed Nov. 19, 1996, now U.S. Pat. No. 6,064,979; Ser No. 08/826,120 filed Mar. 27, 1997, now abandoned; Ser. No. 08/854,877 filed May 12, 1997, now U.S. Pat. No. 5,950,173; Ser. No. 08/871,815 filed Jun. 9, 1997, now U.S. Pat. No. 7,143,055; and Ser. No. 08/936,375 filed Sep. 24, 1997, now abandoned, each said Application is commonly owned by IPF, Inc., and is incorporated herein by reference in its entirety as if fully set forth herein.

BACKGROUND OF INVENTION

1. Technical Field

The present invention generally relates to a novel Internet-based method of and system for educating consumers and marketing branded products and services thereto within both electronic physical and retail environments.

2. Brief Description of the Prior Art

Presently, an enormous amount of time, money and effort is expended daily by thousands of manufacturers and retailers to market, brand, advertise and sell their products and services to consumers in both regional and global markets. Prior to the creation of the World Wide Web (WWW), based on the Hypertext Markup Language (HTML) and the Hypertext Transmission Protocol (HTTP) invented by Tim Berners-Lee, et al., conventional marketing and advertising systems and methods used print, radio, and television based communication mediums to communicate messages to consumers in the marketplace.

Since the development of the WWW and its enabling information file formats and communication protocols, a number of Internet-based advertising systems and networks have been developed and deployed in the world of consumer product and service advertising and promotion. Examples of commercially-available Internet-based advertising and promotion systems include: the Open Ad Stream™ (5.0) Internet Advertising Sales, Advertising-Management Software Technology And Media Services Network by RealMedia, Inc. (http://www.realmedia.com); the DoubleClick™ Internet Advertising Sales, Advertising-Management And Media Services Network by DoubleClick, Inc. (http://www.doubleclick.com) which employ its proprietary DART™ technology for collecting and analyzing audience behavior, predicting which ads will be most effective, measures ad effectiveness, and providing data for Web publishers and advertisers; the Adfusion™ Integrated Advertising Marketing, Sales and Management System by Adfusion, Inc. (http://www.adfusion.com) which integrates all phases of the media buying process including media research and planning, media inventory and yield management, secure online negotiation, the transaction execution, and tracking and post-campaign reporting; and the Promotions.com™ On-Line Promotion System by Promotions.com, Inc. (http://www.promotions.com) formerly Webstakes.com, which develops customized online promotions for clients providing technology and consulting services necessary to run the promotions on clients' own Web sites, and offering direct marketing e-mail services using a database of customer profiles.

Recently, two principally different methods have been proposed for providing product information to consumers over the Internet.

U.S. Pat. No. 5,640,193 to Wellner discloses a system and method for accessing and displaying Web-based consumer product related information to consumers using a Internet-enabled computer system, whereby in response to reading a URL-encoded bar code symbol on or associated with a product, the information resource specified by the URL is automatically accessed and displayed on the Internet-enabled computer system. Current commercial realizations of this general information access technique include the GoCode™ Print-to-Web Information Access System by GoCode, Inc. of Charleston, S.C. (http://www.gocode.com). While this system and method enables access of consumer product information related information resources on the WWW by reading URL-encoded bar code symbols, it requires that custom URL-encoded bar code symbols be created, printed and applied to each and every physical product in the stream of commerce.

U.S. Pat. No. 5,978,773 to Hudetz, et al discloses a solution to the problem presented by the system and method of U.S. Pat. No. 5,640,193. This solution involves the use of a UPC/URL database in order to translate UPC numbers (and other unique codes) read from consumer products by a bar code scanner, into the URLs of published information resources on the WWW relating to the UPC-labeled consumer product.

Like U.S. Pat. No. 5,978,773 to Hudetz, et al, WIPO Publication No. WO 98/03923 discloses the use of a UPC/URL database in order to translate UPC numbers read from consumer products by a bar code scanner, into the URLs of published information resources on the WWW relating to the UPC-labeled consumer product. Current commercial realizations of this general information access technique include: the PaperClick™ Print-To-Web Information Access System by Neomedia Technologies, Inc., of Fort Meyers, Fla. (http://www.paperclick.com); the AirClic™ Wireless Print-to-Web Media Consumer Product and Service Information Access System by Airclic, Inc. of Blue Bell, Pa. (http://www.airclic.com); the Cue-Cat™ Web-based Print-to-Media Product Information Access System by DigitalConvergence, Inc., of Dallas, Tex. (http://www.digitalconvergence.com); the Qode™ Wireless Print-to-Web Media Consumer Product Information Access System by Qode.Com, Inc. of Fort Lauderdale, Fla. (http://www.qode.com); et al.

While U.S. Pat. No. 5,978,773 and WIPO Publication No. WO 98/03923 both provide an effective solution to the problem presented by U.S. Pat. No. 5,640,193 to Wellner, et al., these prior art references and systems completely fail to recognize or otherwise address the myriad of problems relating to UPC/URL-link collection, management, delivery, access and display along the retail supply and demand chain, which must be first solved in order deliver a technically feasible, globally-extensive, UPC-driven consumer product information system for the benefit of consumers worldwide.

For over a decade, several years before the development of the WWW, both General Electric Information Services (GEIS) division of General Electric (GE) Corporation, and Quick Response Services (QRS), Inc. have maintained independent consumer product information databases based on the retail industry standard Universal Product Code (UPC) numbering system. These consumer product information databases, branded as the GEIS UPC Express® Product Catalog (recently renamed the GPC Express™ UPC Product Catalog), and the QRS Keystone™ UPC Product Catalog, are maintained in large-scale RDBMS that are connected to secure value-added networks, referred to as VANs, as well as the infrastructure of the Internet, and thus are easily accessible by retailers using Internet-enabled client computers. These UPC Product Catalogs contain "supply-side related" information records on millions of consumer products from thousands of manufacturers selling their products to retailers along the retail chain, at wholesale prices, terms conditions. The supply-side related information contained in these centralized UPC Product Catalogs are locally maintained by the manufacturers (i.e. vendors) using conventional UPC management software, as developed by Intercoastal Data Corporation (IDC) of Carrollton, Ga., and BarCode World, Inc. These manufacturer-managed UPC Product Catalogs are then periodically uploaded to GEIS's and/or QRS's centralized UPC Product Catalogs, using electronic data interchange (EDI) processes carried out between each manufacturer's UPC Product Catalog and the centralized UPC Product Catalog. The purpose of such uploading operations is to update these centralized UPC Product Catalogs with current and accurate pricing and shipping information required by retailers who visit these centralized UPC Product Catalogs, download the UPC Product Catalogs of their manufacturer trading partners (or portions thereof), to review current product offerings and wholesale prices, terms and conditions, and thereafter purchase desired products from the downloaded manufacturer's UPC Product Catalog using conventional EDI-enabled electronic-commerce (EC) transaction techniques. In essence, the primary function of these centralized UPC Product Catalogs is to enable B-2-B EC transactions between retailers and manufacturers (i.e. vendors) so that retailers can maintain a supply of products in their inventories sufficient to meet the demand for such products by consumers along the retain chain.

In addition to such centralized UPC Product Catalogs described above, these network administrators (GEIS and QRS) use information collected from B-2-B EC-transactions enabled by their centralized UPC Product Sales Catalogs, to provide a number of other solutions to problems relating to electronic commerce (EC) merchandising and logistics within the global supply chain. Such ancillary information services include, for example: Sales, Analysis and Forecasting Services providing retailers with information about what products consumers are buying; Collaborative Replenishment Services for determining what products retailers can buy in order to satisfy consumer demand at any given point of time; and Transportation and Logistics Information Services for providing retailers with information about when products purchased by them (at wholesale) will be delivered to their stores. Such information services are offered to retailers on a global basis through VANs and the Internet.

While the above-described supply-chain information management and delivery systems and services collectively cooperate to optimize the process of moving raw materials into finished products and into the hands of consumers, such supply-side information systems fail to address the information needs of the consumers of retail products who require and desire product-related information prior to, as well as after, the purchase of consumer-products. Moreover, such systems and services fail altogether to address the problems facing manufacturer marketing, brand and product managers, and their advertising and promotion agents, as well as retailer marketing and product managers and their advertising and promotion agents working along the demand-side of the retail chain.

Thus, it is clear that there is great need in the art for an improved Internet-based method of and system for collecting, managing, and delivering product related information to the consumers along the retail chain, while avoiding the shortcomings and drawbacks of prior art systems and methodologies.

DISCLOSURE OF THE INVENTION

Accordingly, a primary object of the present invention is to provide a novel method of and apparatus for enabling manufacturers to collect and manage consumer product-related information and transmit the same to consumers in both physical and electronic retail shopping environments including at home, work and on the road, while overcoming the shortcomings and drawbacks of prior art systems and methodologies.

Another object of the present invention is to provide such apparatus in the form of a novel consumer-product information collection, management, transmission and delivery system.

Another object of the present invention is to provide a novel method of and system for accessing consumer product related information at points within HTML-encoded documents, at which Universal Product Number (UPN) encoded Java Applets are embedded so as to produce, when executed, a consumer product information display enabling ("CPID-enabling") Java-based graphical user interfaces (GUIs) for the convenience of consumers shopping at electronic-commerce (EC) enabled stores, considering the placement of bids at on-line auction sites, or browsing product advertisements appearing on the World Wide Web.

Another object of the present invention is to provide an Internet-based consumer product information collection, managing and delivery system and method, wherein for each consumer product registered within the UPN/™/PD/URL database of the system, there is created and stored, an interactive consumer product information request (CPIR) enabling Applet (e.g. based on Java™ component principles or Microsoft's Active-X technology) which, when executed upon the initiation of the consumer through a mouse-clicking operation, automatically causes a preassigned CPID-enabling Java GUI to be displayed at the consumer's point of presence in Cyberspace, revealing the results of a consumer product information search conducted upon the product identified by the UPN encoded within the executed Applet.

Another object of the present invention is to provide such an Internet-based consumer product information collection, managing and delivery system and method, wherein (1) the UPN assigned to a particular consumer product by the manufacturer and (2) the URL of the Java script running on the IPD server of the system are encoded within the CPIR-enabling Applet so that, upon execution of the Applet, a consumer product information display (CPID) Java GUI is automatically produced for the consumer's convenience.

Another object of the present invention is to provide an Internet-based consumer product information collection, managing and delivery system and method, wherein the CPID-enabling Java GUI automatically displays a manufacturer-defined menu (i.e. list) of categorized URLs pointing to information resources on the Internet (e.g. WWW) relating to the consumer product identified by the UPN encoded within the CPIR-enabling Applet.

Another object of the present invention is to provide such an Internet-based consumer product information collection, managing and delivery system and method, wherein CPIR-enabling Applets are created by the system administrator, loaded within the UPN/™/PD/URL database management subsystem thereof, distributed to retailers, wholesalers, manufacturers, advertisers and others for embedding within HTML-encoded documents associated with EC-enabled stores, catalogs, Internet-based product advertisements, on-line auction sites, and other locations on the WWW where accurate consumer product related information is desired or required without leaving the point of presence on the WWW at which the consumer resides.

Another object of the present invention is to provide such an Internet-based consumer product information collection, managing and delivery system and method, wherein CPIR-enabling Applets are created, distributed, embedded within a HTML-encoded document related to a particular consumer product, and subsequently executed by a consumer so as to access and display a manufacturer-defined menu (i.e. list) of categorized URLs pointing to product-related Web-documents.

Another object of the present invention is to provide such an Internet-based consumer product information collection, managing and delivery system and method, wherein the consumer initiating the execution of a particular CPIR-enabling Applet may be anyone desiring or requiring consumer product related information while interacting with the communication medium provided by the Internet and its supported technologies (e.g. WWW, EC, etc.). As such, the consumer may be a student shopping at an EC-enabled (business-to-consumer) retail store for textbooks, a retail purchasing agent shopping at an on-line (business-to-business) wholesale product catalog for product inventory, a dealer looking to purchase a new or used product listed at an on-line auction site, or anyone encountering an Internet-based advertisement while surfing the WWW.

Another object of the present invention is to provide such an Internet-based consumer product information collection, managing and delivery system and method, wherein a thumbnail picture, arbitrary graphical object, predesignated CPIR-indicating icon, or hypertext-type link associated with a particular consumer product can be embedded within the CPIR-enabling Applet associated therewith, so as to enable the consumer to produce a CPID-enabling Java GUI upon encountering the same in an HTML-encoded document on the WWW.

Another object of the present invention is to provide such an Internet-based consumer product information collection, managing and delivery system and method, wherein licensed users can download CPIR-enabling Applets from the CPIR-Enabling Applet Library to any client computer for eventual insertion within the HTML code of a particular Web-document to be published on the Internet in accordance with the licensing arrangement between the contracting parties. Such end-use applications might be in EC-enabled retail product catalogs, EC-enabled wholesale/trade catalogs, Internet-based product advertisements, on-line auction WWW sites, on-line stock trading WWW sites, and the like.

Another object of the present invention is to provide such an Internet-based consumer product information collection, managing and delivery system and method, wherein the CPID-enabling Java GUIs enabled by executed CPIR-enabling Applets can function as CPI-serving "virtual kiosks" that can be installed at any location in Cyberspace for the convenience of consumers residing therewithin without disturbing their point of presence.

Another object of the present invention is to provide a novel method of and system for delivering consumer product advertisements, promotions and information to consumers over the WWW involving the use of a single mouse-clicking operation by the consumer.

Another object of the present invention is to provide a novel method of and system for embedding CPIR-enabling Applets within HTML-encoded consumer product advertisements published over the WWW involving the use of a single mouse-clicking operation by the consumer.

Another object of the present invention is to provide a novel method of and system for delivering consumer product related information to consumers at on-line auction sites on the WWW involving the use of a single mouse-clicking operation by the consumer.

Another object of the present invention is to provide a novel method of and system for embedding CPIR-enabling Applets within HTML-encoded on-line auction pages published over the WWW.

Another object of the present invention is to provide a novel method of and system for embedding CPIR-enabling Applets within HTML-encoded securities performance charts published at on-line electronic securities trading site on the WWW.

Another object of the present invention is to provide a new method of and system for purchasing a consumer product over the Internet (e.g. WWW) comprising the steps of: embedding a UPN-encoded CPIR-enabling Applet within the HTML-code of a consumer product advertisement, wherein the CPIR-enabling Applet when executed displays a categorized URL menu containing one or more URLs pointing to one or more EC-enabled stores or on-line catalogs on the WWW at which the consumer product identified by the encoded UPN can be purchased and delivered to a particular address in physical space.

Another object of the present invention is to provide a novel virtual CPI kiosk, launchable from predefined points of presence within an EC-enabled store, on-line product catalog or other type of WWW site, for enabling consumers (including retail purchasing agents) to quickly access and display at the predefined point of presence, an interactive menu of categorized URLs pointing to consumer product related information resources published on the WWW and symbolically linked to the UPNs of consumer products within a centralized UPN/™/PD/URL database management subsystem, by manufacturers and/or their agents.

Another object of the present invention is to provide a novel EC-enabled product catalog having a library of CPIR-enabling Applets embeddable within graphical images of consumer products in HTML-encoded documents and enabling, when executed, a UPN-directed search within the UPN/™/PD/URL database management subsystem and the display of an interactive menu of categorized URLs pointing to consumer product related information resources published on the WWW and symbolically linked to the UPNs of consumer products within a centralized UPN/™/PD/URL database management subsystem, by manufacturers and/or their agents.

Another object of the present invention is to provide a novel Internet-based electronic commerce (EC) enabled shopping system comprising an Internet information server connected to the infrastructure of the Internet and supporting the hypertext transmission protocol (http), a Web-enabled client subsystem connected to the infrastructure of the Internet, an EC-enabled WWW site comprising a plurality of interlinked HTML-encoded documents arranged and rendered to provide an electronic store environment when served to a consumer operating the Web-enabled client subsystem, wherein the electronic store environment presents a plurality of products for purchase and sale by an EC-enabled payment method supported over the Internet.

Another object of the present invention is to provide such an Internet-based electronic commerce (EC) enabled shopping system, wherein a Java Applet tag, associated with each product, is embedded within at least one of the HTML-encoded documents displayed on the Web-enabled client subsystem, and each Java Applet tag is associated with a Java Applet encoded with the universal product number (UPN) assigned to one of the products, and, when the consumer selects one of the Java Applet tags, the associated Java Applet is automatically executed enabling a search to be conducted against a product information database hosted on an Internet database server connected to the Internet, from which the results of the UPN-specified search are automatically displayed in a GUI served to the Web-enabled client subsystem.

Another object of the present invention is to provide client-side and server CPIR-enabling Java Applets for enabling the consumer product information searches at virtually any consumer point of presence on the WWW by performing a single mouse-clicking operation.

Another object of the present invention is to provide such an Internet-based consumer product marketing, merchandising and education/information system comprising a plurality of CPIR-enabling (e.g. JAVA) Applet servers, wherein each CPIR-enabling Applet server has a statically assigned IP address and is assigned to numerous physical CPIR-enabling Applet-driven virtual CPI kiosks deployed at retailer-oriented WWW sites served to physical CPI kiosks in the retailer's store, or otherwise on the WWW.

Another object of the present invention is to provide such an Internet-based consumer product marketing, merchandising and education/information system, wherein a CPIR-enabling Applet/Servlet Generator automatically generates, for each UPN/™/PD/URL link record in the UPN/™/PD/URL RDBMS, a CPIR-enabling Applet/Servlet, wherein (i) the compiled code associated with the CPIR-enabling Applet/Servlet is loaded onto one of the plurality of CPIR-enabling Applet servers, and (ii) the corresponding CPIR-enabling Applet tag is loaded within a CPIR-enabling Applet Catalog Web Server for viewing and downloading by retailers, advertisers, auctioneers, et al.

Another object of the present invention is to provide an Internet-based consumer product marketing, merchandising and education/information system, wherein a CPIR-enabling Applet/Servlet Generator is used to automatically generate, for each UPN/™/PD/URL link record in the UPN/™/PD/URL RDBMS, a CPIR-enabling Applet/Servlet, wherein (i) the compiled code associated with the CPIR-enabling Applet/Servlet is loaded onto one of the plurality of CPIR-enabling Applet servers, and (ii) the corresponding CPIR-enabling Applet tag is loaded within a CPIR-enabling Applet Catalog Web Server for viewing and downloading by retailers, advertisers, auctioneers, et al.

Another object of the present invention is to provide an Internet-based consumer product marketing, merchandising and education/information system, wherein the manufacturer may choose to deploy "multi-mode" type virtual product-specific CPI kiosks to the general public so that advertisements and/or product promotions can be programmably displayed from the virtual kiosk when launched from its point of installation on the WWW. In such applications, CPIR-enabling Applet enabling the virtual kiosk may be designed to automatically launch at the time of displaying its host HTML document, thereby providing a kiosk GUI on which to display product advertisement and/or promotion spots about the manufacturer's product.

Another object of the present invention is to provide such an Internet-based consumer product marketing, merchandising and education/information system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/™/PD/URL RDBMS.

Another object of the present invention is to provide such an Internet-based consumer product marketing, merchandising and education/information system, wherein the system delivers the advertisement spots to consumers in retail environments through the use of multi-mode CPI kiosks by (1) loading the advertisement spot within the product advertising/promotion spot queue on a Web server; and (2) serving the advertisement spot from the product advertising/promotion spot queue, to the physical CPI kiosk indicated in the advertisement spot order being executed.

Another object of the present invention is to provide such an Internet-based consumer product marketing, merchandising and education/information system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/™/PD/URL RDBMS.

Another object of the present invention is to provide an Internet-based consumer product marketing, merchandising and education/information system, wherein when a consumer establishes contact with a virtual "multi-mode" CPI kiosk hereof displayed in a virtual retail shopping environment, the consumer might be shown either: (1) a product advertisement ordered by the manufacturer of the product sold in the retailer's store, the advertising agent of the manufacturer, the retailer, or the retailer's advertising agent; or (2) a product promotion ordered by the retailer, the retailer's promotional agent, the manufacturer of the promoted product sold in the retailer's store, or the manufacturer's promotional agent. In either case, however, the consumer can automatically interrupt the product advertisement or promotion by (i) clicking on the product advertisement or promotion, or (ii) clicking on the CPI Request "button" on the virtual kiosk's GUI.

Another object of the present invention is to provide an Internet-based consumer product marketing, merchandising and education/information system, wherein a manufacturer's marketing, brand and/or product managers can project a coherent brand image of their products to consumers worldwide, substantially independent of the level of knowledge and skill of the retailers, advertising agents and promotional agents of the manufacturer. This translates to value to all those participating on the demand side of the retail chain.

Another object of the present invention is to provide an Internet-based consumer product marketing, merchandising and education/information system, wherein each CPI kiosk deployed therein has three primary modes of display operation, namely: a CPI Display Mode; Advertisement Spot Display Mode; and Promotion Spot Display Mode.

Another object of the present invention is to provide such an Internet-based consumer product marketing, merchandising and education/information system, wherein during its Advertisement Spot Display Mode of operation, purchased advertisement spots, which have been loaded in the physical CPI kiosk's advertisement/promotion spot queue, are automatically displayed in the information display frame of the physical kiosk GUI during the kiosk's quiescent moments of operation (i.e. when consumers are not making CPI requests with the kiosk).

Another object of the present invention is to provide a method of and system for generating a directory/catalog of virtual "UPN-restricted/product-specific" CPI kiosks which may be deployed and installed on the WWW by others who download CPIR-enabling Applet tags from a CPIR-enabling Applet Tag Library Server, and embed the tags in the HTML-fabric of the WWW at domains where the virtual kiosks are to be installed.

Another object of the present invention is to provide a method of and system for enabling a manufacturer to deploy "multi-mode" type virtual product-specific kiosks to the general public so that advertisements and/or product promotions can be programmably displayed from the virtual kiosk when launched from its point of installation on the WWW. In such applications, the CPIR-enabling Applet enabling the virtual kiosk may be designed to automatically launch at the time of displaying its host HTML document, thereby providing a kiosk GUI on which to display product advertisement and/or promotion spots about the manufacturer's product.

Another object of the present invention is to provide an Internet-based brand management and marketing communication instrumentation network for deploying, installing and remotely programming brand-building server-side driven multi-mode virtual kiosks on the World Wide Web (www).

Another object of the present invention is to provide improved methods of brand management and marketing communication between brand marketers and consumers over the Internet using brand-building server-side driven multi-mode virtual kiosks installed along the WWW.

Another object of the present invention is to provide an enterprise-level collaborative brand management and marketing communication solution-that is synchronized with the enterprise's supply-side information management operations.

Another object of the present invention is to provide brand managers with a revolutionary new brand management and marketing communication media designed to serve as a central control center for managing and marketing their brands everywhere on the Internet, over all Web-based consumer touch-points, now and into the future.

These and other objects of the present invention will become apparent hereinafter and in the Claims to Invention

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, briefly described below.

FIG. 2A1 is a schematic diagram illustrating the flow of information along the consumer-product supply and demand chain, including (i) the communication link extending between the information subsystems of manufacturers of UPC-encoded products and the centralized (or master) UPN/™/PD/URL RDBMS of the consumer-product information collection, transmission and delivery system of the present invention, (ii) the communication link extending between the UPN/™/PD/URL RDBMS and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, (vi) the communication link extending between the IPI Servers and the Client Subsystems of consumers, and (vii) the communication link extending between the UPN/™/PD/URL RDBMS for providing consumer product catalog services to retailer purchasing agents and others and enabling the on-line purchase of consumer products between trading partners (e.g. manufactures and retailers) using EDI (or XML/EDI) based business-to-business electronic commerce transactions.

FIG. 2A2 is a schematic diagram illustrating the flow of information along the consumer-product supply and demand chain, similar to that shown in FIG. 2A1, except that as shown in FIG. 2A2, each manufacturer transmits to the UPN/™/PD/URL RDBMS (realized as a massive data warehouse) one or more information resource files (IRFs) which are symbolically linked to particular UPN-encoded product, and that each IRF is then stored as a Web-based document on an Internet information server at predesignated URL, symbolically linked to the UPN, so that consumers can use the UPN to access a menu of URLs symbolically linked thereto for display of the corresponding Web-documents;

FIG. 2B1 is a block schematic diagram of the IPD Server of the first illustrative embodiment, showing its subsystem components namely a RDBMS server and a Java Web Server with Java servlet support, being accessed by a Java-enabled client machine seeking to access consumer product related information from the RDBMS server using server-side Java Applets whose HTML tags are embedded within HTML-encoded documents served to the client machine from any one of a number of potential http information servers on the Internet.

FIG. 2B2 is a block schematic diagram of the IPD Server of the second illustrative embodiment, showing its subsystem components namely a RDBMS server and a Java Web Server with CGI script support, being accessed by a Java-enabled client machine seeking to access consumer product related information from the RDBMS server using client-side Java Applets whose HTML tags are embedded within HTML-encoded documents served to the client machine from any one of a number of potential http information servers on the Internet.

FIG. 2B3 is a block schematic diagram of the IPD Server of the third illustrative embodiment, showing its subsystem components, namely: a RDBMS server and a Java Web Server being accessed by a Java-enabled client machine seeking to access consumer product related information from the RDBMS server using (i) a socket connection between the client machine and the Java Web server and (ii) client-side Java Applets whose HTML tags are embedded within HTML-encoded documents served to the client machine from any one of a number of potential http information servers on the Internet.

FIG. 2B4 is a block schematic diagram of the IPD Server of the fourth illustrative embodiment, showing its subsystem components, namely: a RDBMS server and a Java Web Server being accessed by a Java-enabled client machine seeking to access consumer product related information from the RDBMS server using (i) a Remote Method of Invocation (RMI) and (ii) client-side Java Applets whose HTML tags are embedded within HTML-encoded documents served to the client machine from any one of a number of potential http information servers on the Internet.

FIG. 2C1 is a schematic representation of the GUI of an exemplary computer operating system (OS), on which the UPN/™/PD/URL data linking function of the present invention is schematically depicted showing a GUI-based window associated with a content-creating application (e.g. Netscape Navigator browsing program), a GUI-based window associated with a UPN/™/PD/URL link management application (e.g., Microsoft Access or SQL RDBMS program), and the UPN/™/PD/URL data link GUI displaying the UPN/™/PD/URL data links between Web documents and a set of UPN-encoded consumer products being managed within the UPN/™/PD/URL link management application.

FIG. 2C2 is a schematic representation showing the manufacturer's EDI-enabled UPN/™/PD/URL of the present invention and the consumer product information catalog database management subsystem of the present invention configured between (i) a plurality of Web-enabled client machines operated within the manufacturer's enterprise by various departments as shown in FIG. 2C, and (ii) a conventional manufacturer's EDI-enabled UPC-indexed Product Sales Price Information Catalog (e.g. UPC+5.0 management software by Barcode World, Inc. or UPC Manager software by Inter Coastal Data Corporation) deployed within a manufacturer's enterprise for supporting conventional EDI-enabled business-to-business (B2B) applications between the manufacturer and its various retail trading partners through a conventional EDI-enabled B-2-B trading network (e.g. the QRS Network by QRS, Inc., or the GEIS Network by General Electric Information Services, Inc.).

FIG. 2C3 is a schematic representation of an exemplary graphical user interface (GUI) which is presented to the marketing and brand managers of a manufacturer by the UPN/™/PD/URL link management software program of the present invention, for the purpose of enabling such marketing personnel to create a "brand-image projecting" consumer product information (CPI) menu for each product in its product portfolio, ultimately for display to consumers and end-users alike by way of physical and/or virtual kiosks deployed within the system of the present invention, wherein each CPI menu contains (i) the Universal Product Number (UPN) uniquely assigned to the corresponding consumer product by the manufacturer, (ii) the trademark(s) used in connection with the marketing of the consumer product, (iii) a generic product description for the consumer product, and (iv) a collection URLs, arranged according to pre-purchase and post-purchases data-types, pointing to diverse types of consumer product related information resources published on the Internet, providing useful information about the consumer product and contributing to the overall brand image thereof which the manufacturer and its agents labor to create in the marketplace through their marketing programs.

FIG. 3A1 is a graphical representation of a first illustrative embodiment of the client computer system of the present invention, designed for use in desktop environments at home, work and play.

FIG. 3A2 is a graphical representation of a second illustrative embodiment of the client computer system of the present invention realized in the form of a bar code driven multi-media kiosk, designed for use as a "virtual sales agent" in retail shopping environments, such as department stores, supermarkets, superstores, retail outlets and the like.

FIG. 3A3 is a graphical representation of a third illustrative embodiment of the client computer system of the present invention realized in the form of a bar code driven multi-media kiosk, designed for use as a virtual sales agent in retail shopping environments such as department stores, supermarkets, superstores, retail outlets and the like, and shown as having an integrated "cord-connected" type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention.

FIG. 3A4 is a graphical representation of the bar code driven multi-media kiosk shown in FIG. 3A3, wherein the laser scanning projection-type bar code symbol reader is removed from its support stand, by pulling its connector cable out of its cable take-up unit, and used to read a bar code symbol on product located a relatively short distance away from the kiosk.

FIG. 3A5 is a graphical representation of a fourth illustrative embodiment of the client computer system of the present invention realized in the form of a bar code driven multi-media kiosk, designed for use as a virtual sales agent in retail shopping environments such as department stores, supermarkets, superstores, retail outlets and the like, and shown as having an integrated "cordless" type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention.

FIG. 3A6 is a graphical representation of the bar code driven multi-media kiosk shown in FIG. 3A4, wherein the laser scanning projection-type bar code symbol reader is removed from its support stand and used to read a bar code symbol on a product located a relatively short distance away from the kiosk.

FIG. 4A1 is a schematic representation of the relational-type IPI Registrant Database maintained by each IPD Server configured into the system of the illustrative embodiment of the present invention, showing the information fields for storing (i) the information elements representative of the UPN (e.g. UPC data structure, EAN data structure, and/or National Drug Code (NDC) data structure), URLs, trademark(s) ($TM_i$), Company Name (CNi) and company address, Product Description ($PD_i$), E-Mail Address ($EMA_i$) thereof symbolically-linked (i.e. related) for a number of exemplary IPI Registrants listed (i.e. registered) with the IPI Registrant Database maintained by each IPD Server, image files for registered consumer products, and consumer product information request (CPIR) enabling Applets for access by retailers, wholesalers, advertisers, Web publishers, and the like, and insertion within the HTML code of Web documents on various types of Internet information servers hosting WWW sites, as well as EC-enabled WWW-sites, EC-enabled stores and/or on-line e-commerce product catalogs, so that when executed, these CPIR-enabling Applets automatically access a categorized URL menu containing URLs (identified in FIG. 4A2) specifying the location of manufacturer-linked information resources on the Internet pertaining to a particular UPN-labeled product.

FIG. 4A2 is a schematic representation of the information subfield structure of the URL Information Field of the IPI Database of FIG. 4A1, showing the Product Advertisement Information Field, the Product Specification (Description/Operation) Information Field, the Product Update Information Field, the Product Distributor/Reseller/Dealer Information Field, the Product Warranty/Servicing Information Field, the Product Incentive Information Field thereof, the Product Review Information Field, the Related Products Information Field, and Miscellaneous Information Fields detailed hereinafter.

FIG. 4B is a schematic representation of the relational-type Non-IPI Registrant Database maintained by each IPD Server that is configured into the IPI Finding and Serving Subsystem of the illustrative embodiment of the present invention, showing the information fields for storing (i) the information elements representative of the Company Name (CNi) and Company Address, Trademark(s) ($TM_i$) registered by the associated Company, E-Mail Address ($EMA_i$) thereof symbolically-linked for a number of exemplary Non-IPI registrants listed within the Non-IPI Registrant Database maintained by each IPD Server, and CPIR enabling Applets for access by retailers, wholesalers, advertisers, Web publishers, and the like, and insertion within the HTML code of Web documents on various types of Internet information servers hosting WWW sites, as well as EC-enabled WWW-sites, EC-enabled stores and/or on-line e-commerce product catalogs, for the purpose described above.

FIG. 4C1 is a schematic representation illustrating the information fields of the table entitled "Manufacturer" used in the RDBMS shown in FIGS. 4A1 and 4A2 hereof.

FIG. 4C2 is a schematic representation illustrating the information fields of the table entitled "Consumer Product" used in the RDBMS shown in FIGS. 4A1 and 4A2 hereof.

FIG. 4C3 is a schematic representation illustrating the information fields of the table entitled "Information Resources on the WWW" used in the RDBMS shown in FIGS. 4A1 and 4A2 hereof.

FIG. 4D is a schematic representation illustrating the information fields of the table entitled "Retailer" used in the RDBMS shown in FIGS. 4A1 and 4A2 hereof.

FIGS. 4E1 and 4E2, taken together, provide a high-level flow chart describing the steps involved in the first illustrative method of creating, loading, distributing, embedding, displaying, and executing "server-side" consumer product information request (CPIR) enabling Applets (i.e. CPIR-enabling Servlets) when using the system architecture and servlet-based search and display mechanism schematically depicted in FIG. 2B1, enabling consumers to automatically search the RDBMS for consumer product information related to a particular UPN-specified product while visiting EC-enabled stores and other WWW sites without disturbing the point of presence of the consumer.

FIG. 4F1 is a schematic representation illustrating the method of FIGS. 4E1 and 4E2 being carried out using certain subcomponents of the system depicted in FIGS. 1A, 1B, and 2B1, in particular.

FIG. 4F2 is a schematic representation illustrating in greater detail the Applet-embedding step of the method of FIGS. 4E1 and 4E2, carried out using certain subcomponents of the system depicted in FIGS. 1A and 1B.

FIG. 5 is a schematic representation of the Internet-based Consumer Product Marketing, Merchandising and Education/Information Subsystem, wherein four distinct product function performing subsystems, namely, (1) Consumer Product Related Information Link Creation, Management And Transport Subsystem, (2) Consumer Product Advertisement Marketing, Sales, Management And Delivery Subsystem, (3) Consumer Product Promotion Marketing, Sales, Management and Delivery Subsystem, and (4) Consumer Product Information Kiosk Configuration, Deployment, Management and Access Subsystem are integrated about a common Internet-enabled UPN-indexed RDBMS for managing UPN-indexed consumer product related information in accordance with the principles of the present invention.

FIGS. 6A1 and 6A2, taken together, show a schematic diagram of the Internet-based Consumer Product Marketing, Merchandising and Education/Information System of the illustrative embodiment hereof shown embedded within the infrastructure of the global computer communications network known as the "Internet", and comprising a plurality of data-synchronized Internet Product Directory (IPD) Servers connected to the infrastructure of the Internet, a UPN/™/PD/URL Relational Database Management Subsystem (i.e. UPN/™/PD/URL RDBMS) connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of manufacturer-related electronic-commerce (EC) information servers for hosting EC-enabled stores or EC-enabled on-line catalogs of manufacturers, a plurality of retailer-related electronic-commerce (EC) information servers for hosting EC-enabled stores or EC-enabled on-line catalogs of retailers, a plurality of Internet Product-Information (IPI) Servers connected to the infrastructure of the Internet for serving consumer-product related information to consumers in retail stores and at home, a central e-mail RDBMS for receiving and storing copies of e-mail transmissions from retailer-store based kiosks to e-mail addresses of consumer accessing consumer product information therewith in retail shopping environments, a plurality of Client Subsystems connected to the infrastructure of the Internet and allowing manufacturers to transmit consumer-product related information to the Web-based Document Server for collection and retransmission to the IPD Servers, a plurality of Client Subsystems connected to the infrastructure of the Internet and allowing consumers in retail stores and at home to request and receive consumer-product related information from the IPD Servers, a plurality of mirrored Consumer Product Kiosk Advertisement Marketing/Sales/Management Web (http) Servers, a plurality of mirrored Consumer Product Kiosk Promotion Marketing/Sales/Management Web (http) Servers, and a plurality of Consumer Product Advertising Web Servers operated by a plurality of advertising agents registered with the system.

URL RDBMS, for distribution to (i) consumers and end-users within physical retail environments having access to a plurality of physical CPI serving kiosks driven by a plurality of Web (http) servers operably connected to the infrastructure of the Internet, (ii) consumers and end-users within electronic retail environments having access to a plurality of virtual CPI serving kiosks driven by a plurality of CPIR-enabling Java Applet servers operably connected to the infrastructure of the Internet, and (iii) consumers and end-users interfaced with a plurality of Web-enabled client machines at home, school, in the office or on the road having access to a plurality of UPN-driven consumer product information portals (e.g. BrandKey Request Central™ WWW Site) on the WWW, driven by a plurality of mirrored http information servers operably connected to the infrastructure of the Internet.

Figure 10A:
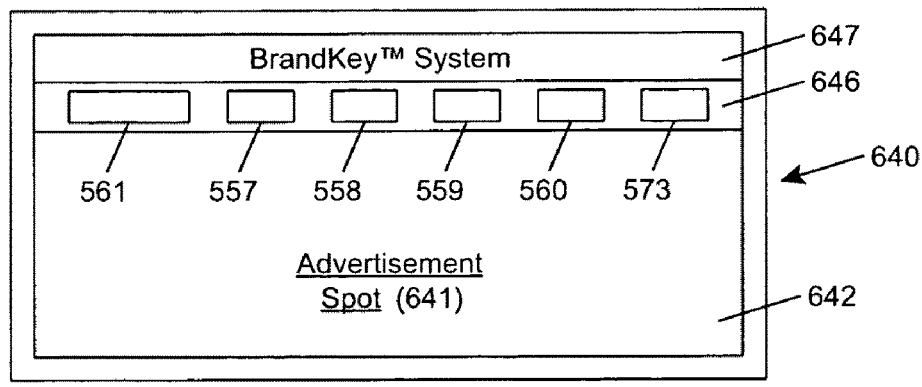

FIG. 10A is a schematic representation of an exemplary GUI screen displayed on the multi-mode physical CPI kiosk, during its CPI Display Mode of operation, in which requested CPI by a consumer is displayed in response to manual data input or scanning of UPN labels on consumer products.

Figure 10B:
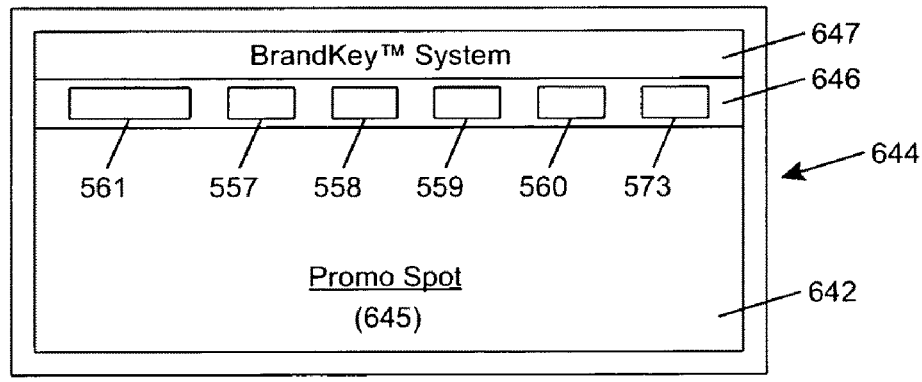

FIG. 10B is a schematic representation of an exemplary GUI screen displayed on the multi-mode physical CPI kiosk, during its Advertisement Spot Display Mode of operation, in which purchased advertisement spots loaded in the physical CPI kiosk's advertisement/promotion spot queue are automatically displayed on the display screen of the physical CPI kiosk during its quiescent moments (i.e. when consumer are not making CPI requests).

Figure 10C:
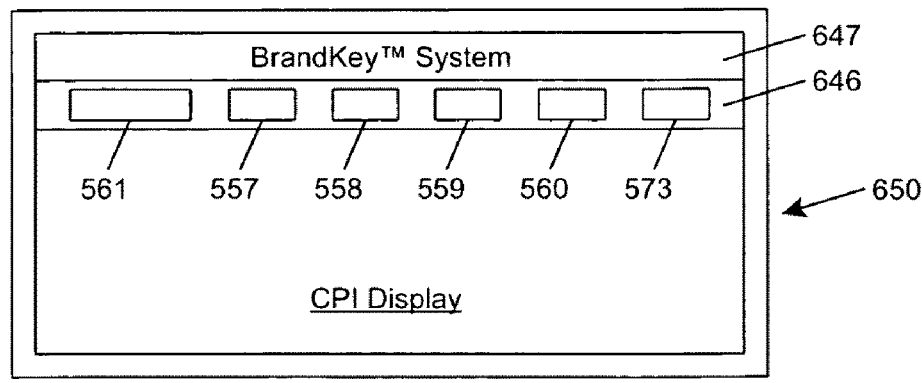

FIG. 10C is a schematic representation of an exemplary GUI screen displayed on the multi-mode physical CPI kiosk, during its Promotion Spot Display Mode of operation, in which purchased promotion spots loaded into the physical CPI kiosk's advertisement/promotion spot queue are automatically displayed on the display screen of the physical CPI kiosk during its quiescent moments (i.e. when consumer are not making CPI requests).

Figure 11:
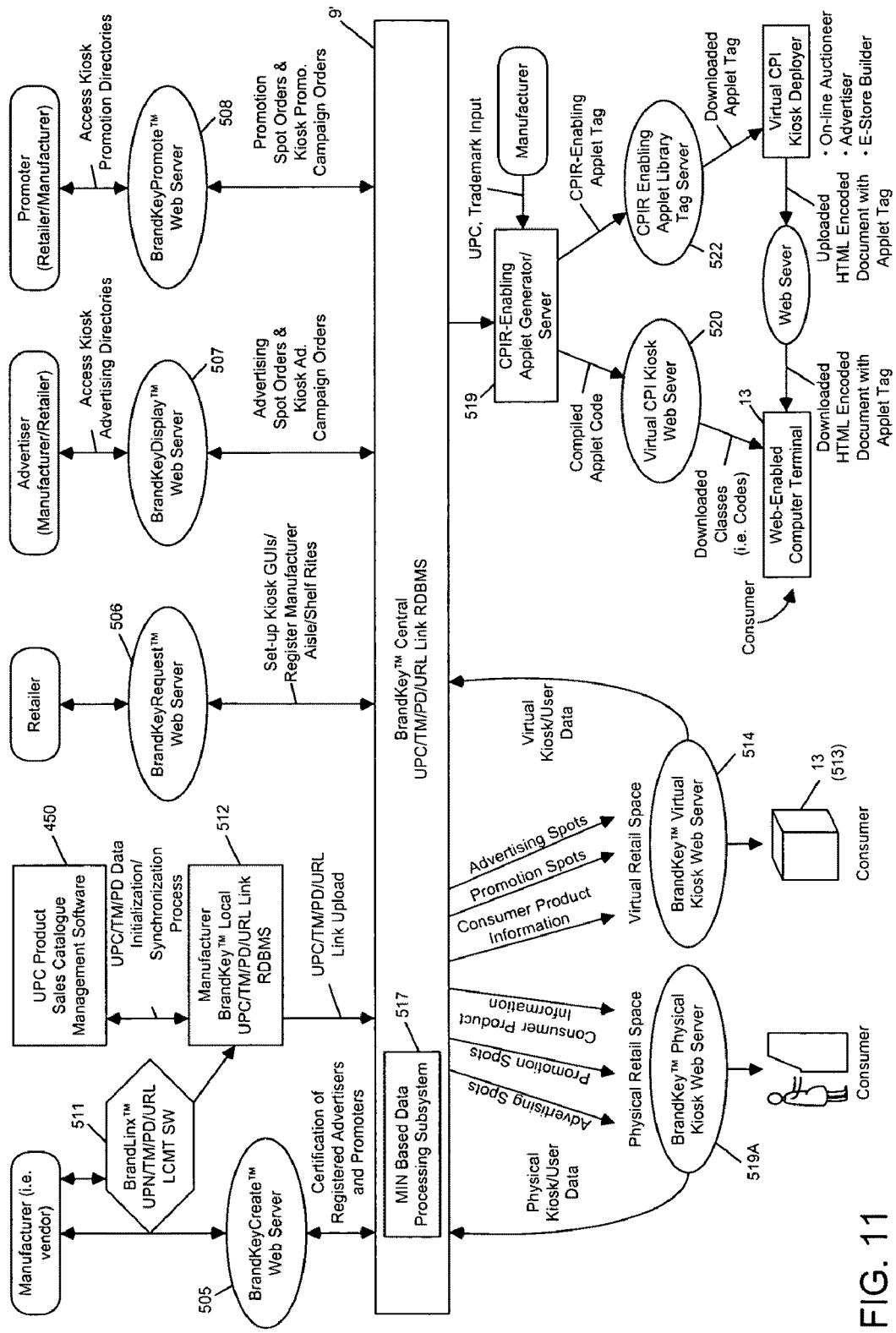

FIG. 11 is a schematic representation of the system architecture of an Integrated Consumer Product Marketing, Merchandising, and Education/Information System of an illustrative embodiment of the present invention.

Figure 12A:
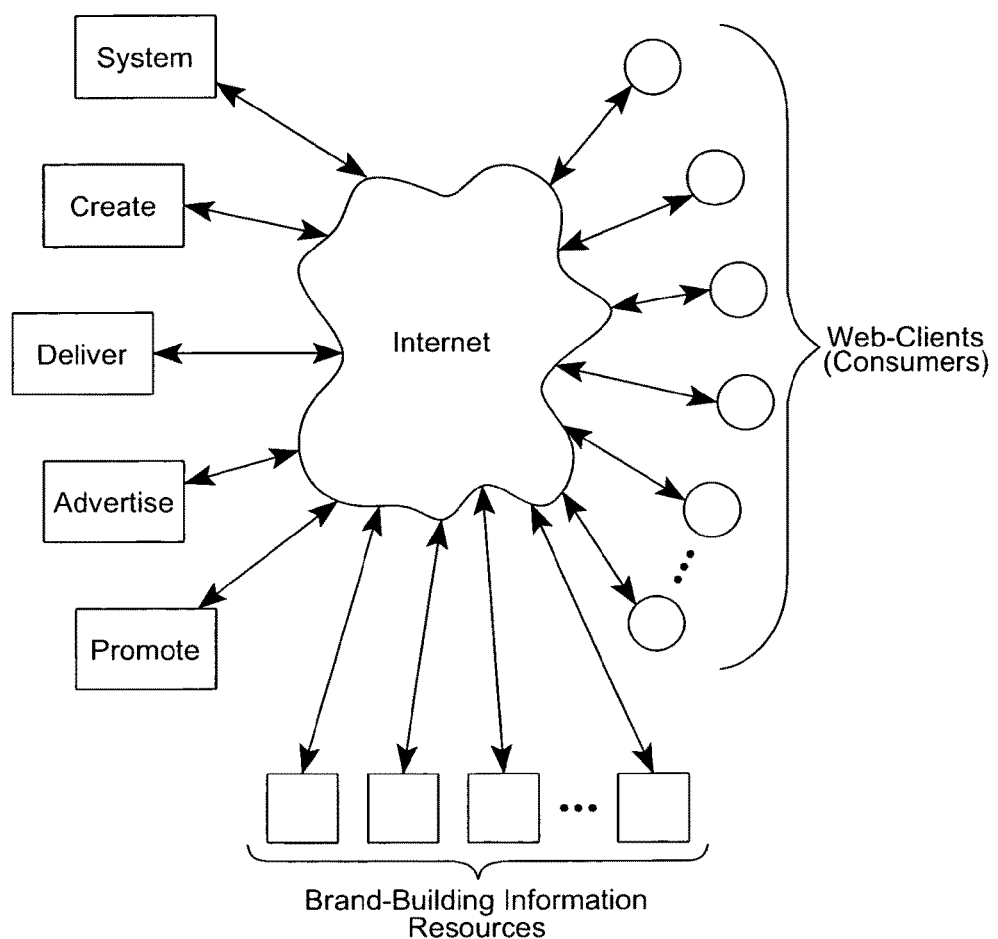
Figure 12B:
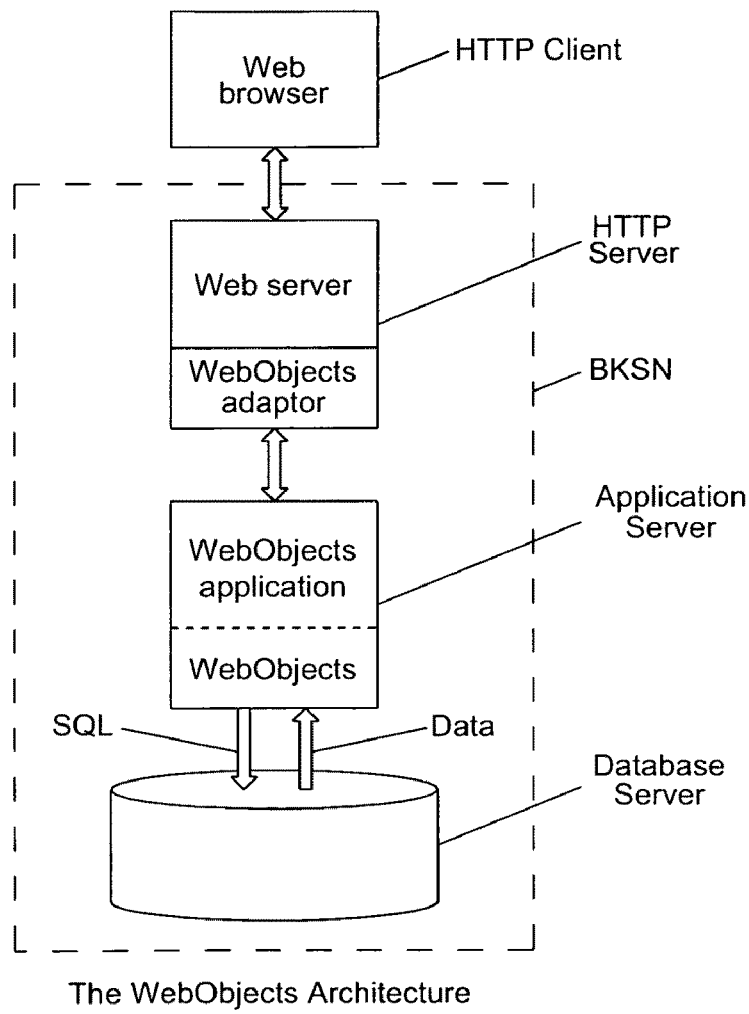
Figure 12C:
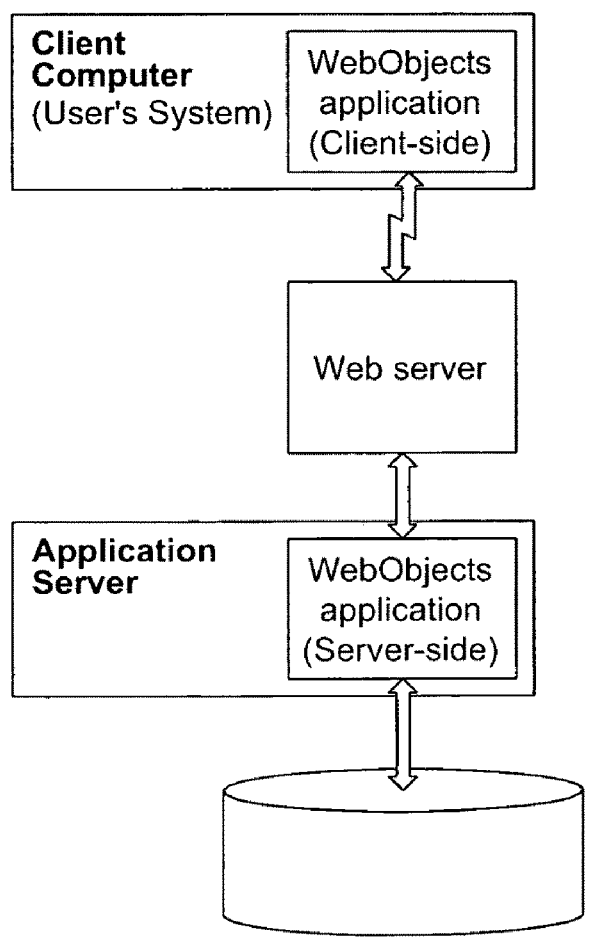
Figure 13A:
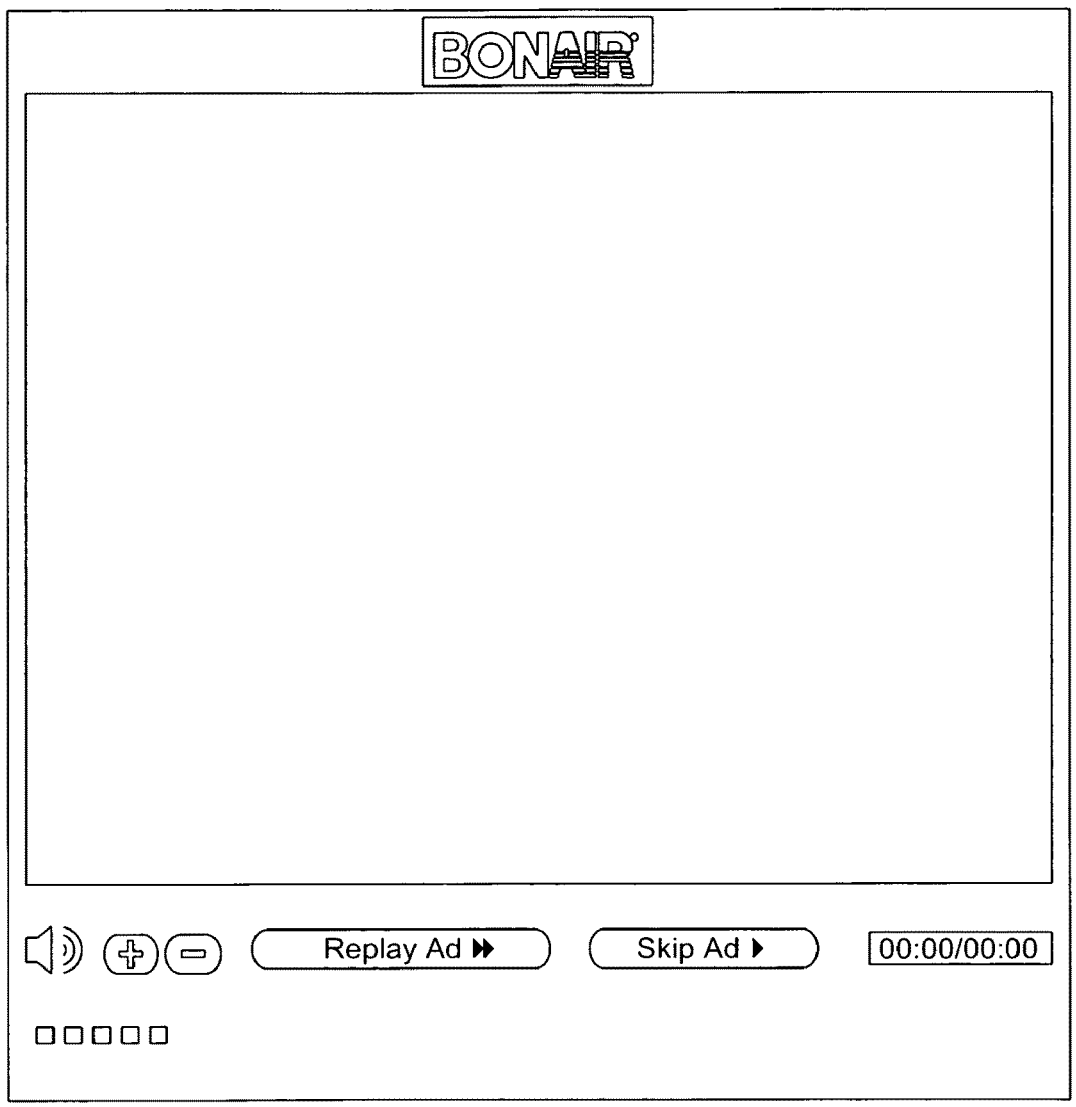
Figure 13B:
Figure 13C:
Figure 13D:
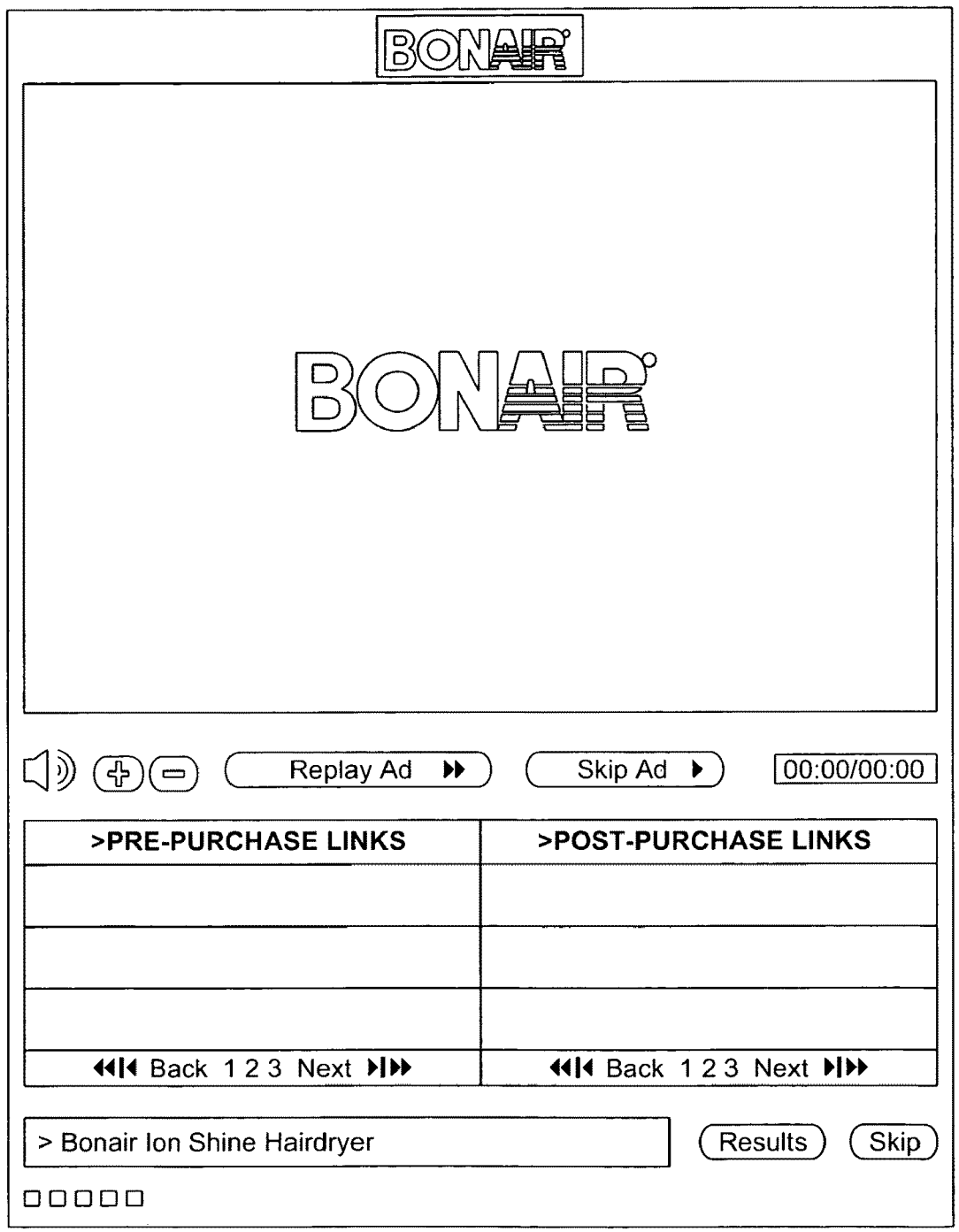
Figure 13E:
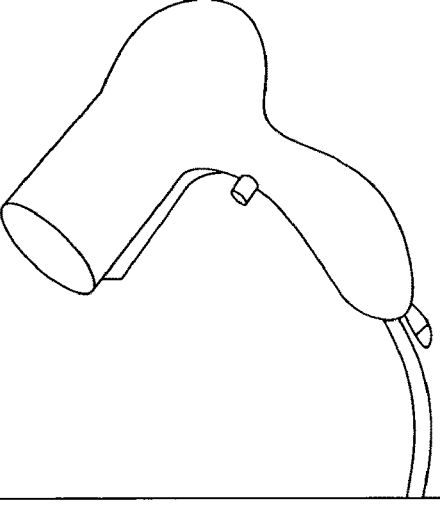

FIG. 12A sets forth high-level schematic representation of the Internet-based Brand Marketing Communication Instrumentation Network of the present invention, based on the inventions disclosed in connection with illustrative embodiments disclosed herein, realized as an industrial-strength, carrier-class Internet-based multi-media communications network of object-oriented system design, implemented on a Java-based object-oriented integrated development environment (IDE) such as WebObjects 5.2 by Apple Computer Inc, Websphere IDE by IBM, or Weblogic IDE by BEA;

FIGS. 12B and 12C are schematic representations of implementations of the Brand Marketing Communications Network of the present invention using the WebObjects IDE, using Web-based and Java-client technology, respectively;

FIG. 13A is a graphical representation of an exemplary multimode virtual kiosk displaying in its advertising display mode;

FIGS. 13B and 13C are graphical representations of an exemplary multimode virtual kiosk displaying in its promotional display mode; and FIGS. 13D and 13E are graphical representations of an exemplary multimode virtual kiosk displaying in its brand/product information display mode.

DETAILED DESCRIPTION OF THE ILLUSTRATIVE EMBODIMENTS OF THE PRESENT INVENTION

Referring to the accompanying Drawings, like structures and elements shown throughout the figures thereof shall be indicated with like reference numerals.

In general, the Detailed Description set forth below discloses a detailed specification of two illustrative embodiments of the Consumer Product Related Information Collection, Management, and Marketing Communication System of the present invention, namely: a first illustrative embodiment thereof disclosed in FIGS. 1 through 4F2, which enables manufacturers (i.e. vendors), retail advertisers and promoters to perform diverse product related functions; and a second illustrative embodiment thereof disclosed in FIGS. 5 through 11. While the second illustrative embodiment discloses an integrated set of subsystems and methods for performing diverse product related functions in an integrated manner, many of the subsystem components and methods employed in the first illustrative embodiments can be used in the second illustrative embodiment.

In general these illustrative embodiments employ many of the inventive principles disclosed in Applicants' International Patent Application Publication No. WO 98/19259 published on May 7, 1998, which is incorporated herein by reference in its entirety.

Figure 1:
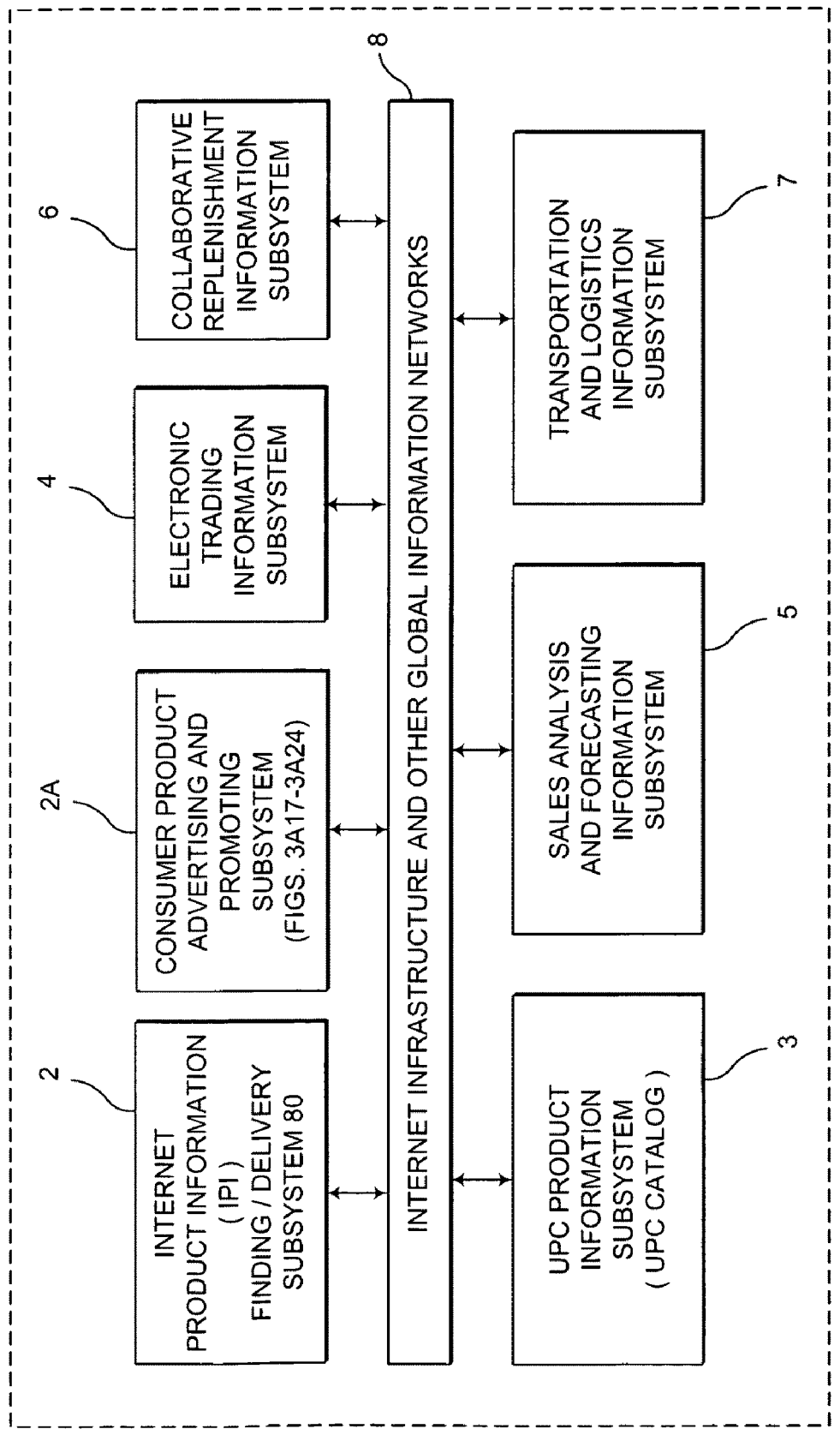
FIG. 1 is a schematic diagram illustrating the various information subsystems provided by the consumer product related information collection, transmission and delivery system of invention along the consumer-product demand chain, namely an Internet-based Product-Information (IPI) Finding and Serving Subsystem, a UPC-based Product-Information Subsystem ("UPC Catalog"), an Electronic Trading Information Subsystem, a Sales Analysis and Forecasting Information Subsystem, Collaborative Replenishment Information Subsystem, and a Transportation and Logistics Information Subsystem.

Overview of the First Illustrative Embodiment of the System of the Present Invention As illustrated in FIG. 1, the consumer-product information collection, transmission and delivery system of the first illustrative embodiment of the present invention is generally indicated by reference numeral 1 and comprises an integration of information subsystems, namely: an IPI finding and serving subsystem 2 for allowing consumers to find product related information on the Internet (e.g. WWW) at particular Uniform Resource Locators (URLs), using UPC numbers, trademarks, and/or product descriptions symbolically-linked or related thereto; a Consumer Product Advertising and Promoting Subsystem 2A for advertising and promoting consumer products within physical retail shopping environments using Web-based product promotion kiosks; a conventional UPC Product sales Price Information Subsystem ("UPC Sales Price Catalog") 3 (e.g. QRS Keystone UPC™ Product Sales Price Catalog, or GEIS's GPC Express™ UPC Product Sales Price Catalog) for providing retailers with accurate up-to-date product information on numerous consumer-products offered for wholesale to retailers by manufacturers registering their products therewith; a Electronic Trading Information Subsystem 4 for providing trading partners (e.g. a manufacturer and a retailer) to sell and purchase consumer goods by sending and receiving documents (e.g. purchase orders, invoices, advance slip notices, etc.) to consummate purchase and sale transactions using either Value Added Network (VAN) based EDI transmission or Internet (e.g. HTTP, SMTP, etc.) based electronic document communications; a Sales Analysis and Forecasting Information Subsystem 5 for providing retailers with information about what products consumers are currently buying at retail stores or expect to be buying in the near future; Collaborative Replenishment Information Subsystem 6 for determining what products retailers can be buying in order to satisfy consumer demand at any given point in time; a Transportation and Logistics Information Subsystem 7 for providing retailers with information about when ordered products (purchased by retailers at wholesale) will be delivered to the retailer's stores; and Input/Output Port Connecting Subsystems 8 (realized by the infrastructure of the Internet) for interconnecting the input and output ports of the above-identified subsystems through the infrastructure of the Internet and various value-added EDI networks of global extent. Notably, unlike prior art supply chain management systems, the consumer-product information collection, transmission and delivery system of the present invention embraces the manufacturers, retailers, and consumers of UPC-encoded products, and not simply the manufacturers and retailers thereof. As will become apparent hereinafter, this important feature of the present invention allows manufacturers and retailers to deliver valuable product related information to the consumers of their products, thereby increasing consumer purchases, consumer satisfaction and consumer loyalty. Prior art supply chain management systems have no way or means of providing such information services to the consumers of UPC-encoded products along the consumer-product supply and demand chain.

Figure 1A:
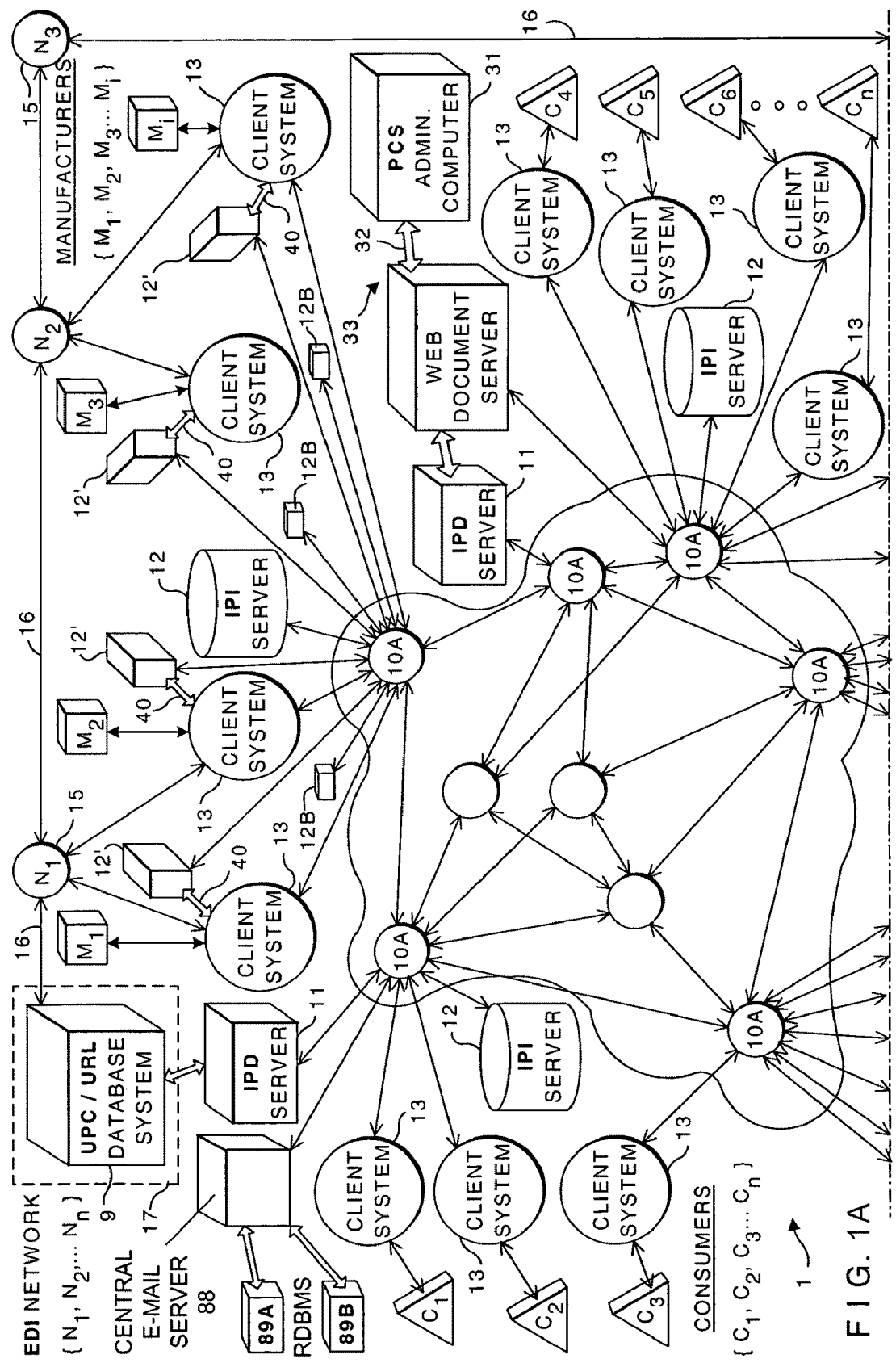
FIGS. 1A and 1B show a schematic diagram of the consumer-product information collection, transmission and delivery system of the illustrative embodiment hereof shown embedded with the infrastructure of the global computer communications network known as the "Internet", and comprising a plurality of data-synchronized Internet Product Directory (IPD) Servers connected to the infrastructure of the Internet, a UPN/™/PD/URL Relational Database Management Subsystem (i.e. UPN/™/PD/URL RDBMS) 9 connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of manufacturer-related electronic-commerce (EC) information servers for hosting EC-enabled stores or EC-enabled on-line catalogs of manufacturers, a plurality of retailer-related electronic-commerce (EC) information servers for hosting EC-enabled stores or EC-enabled on-line catalogs of retailers, a plurality of Internet Product-Information (IPI) Servers connected to the infrastructure of the Internet for serving consumer-product related information to consumers in retail stores and at home, a central e-mail RDBMS for receiving and storing copies of e-mail transmissions from retailer-store based kiosks to e-mail addresses of consumer accessing consumer product information therewith in retail shopping environments, a plurality of Client Subsystems connected to the infrastructure of the Internet and allowing manufacturers to transmit consumer-product related information to the Web-based Document Server for collection and retransmission to the IPD Servers, and a plurality of Client Subsystems connected to the infrastructure of the Internet and allowing consumers in retail stores and at home to request and receive consumer-product related information from the IPD Servers.
Figure 1B:
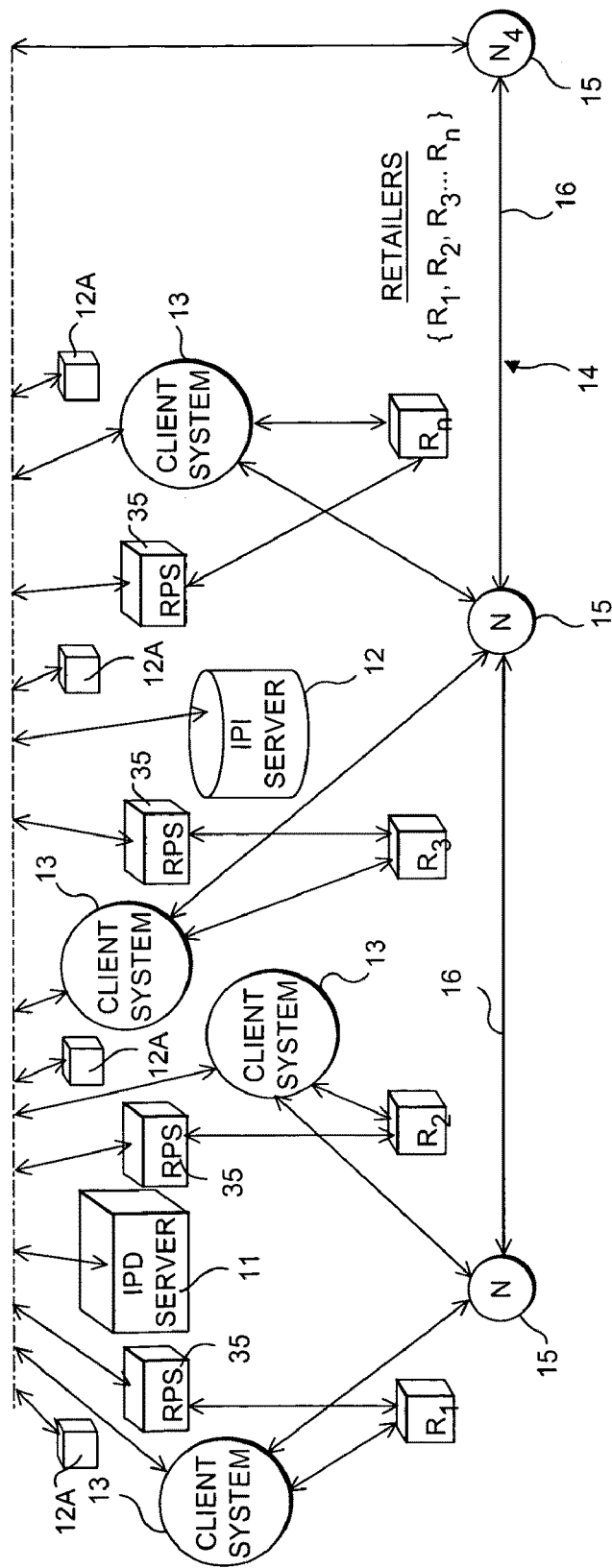
Figure 4C:
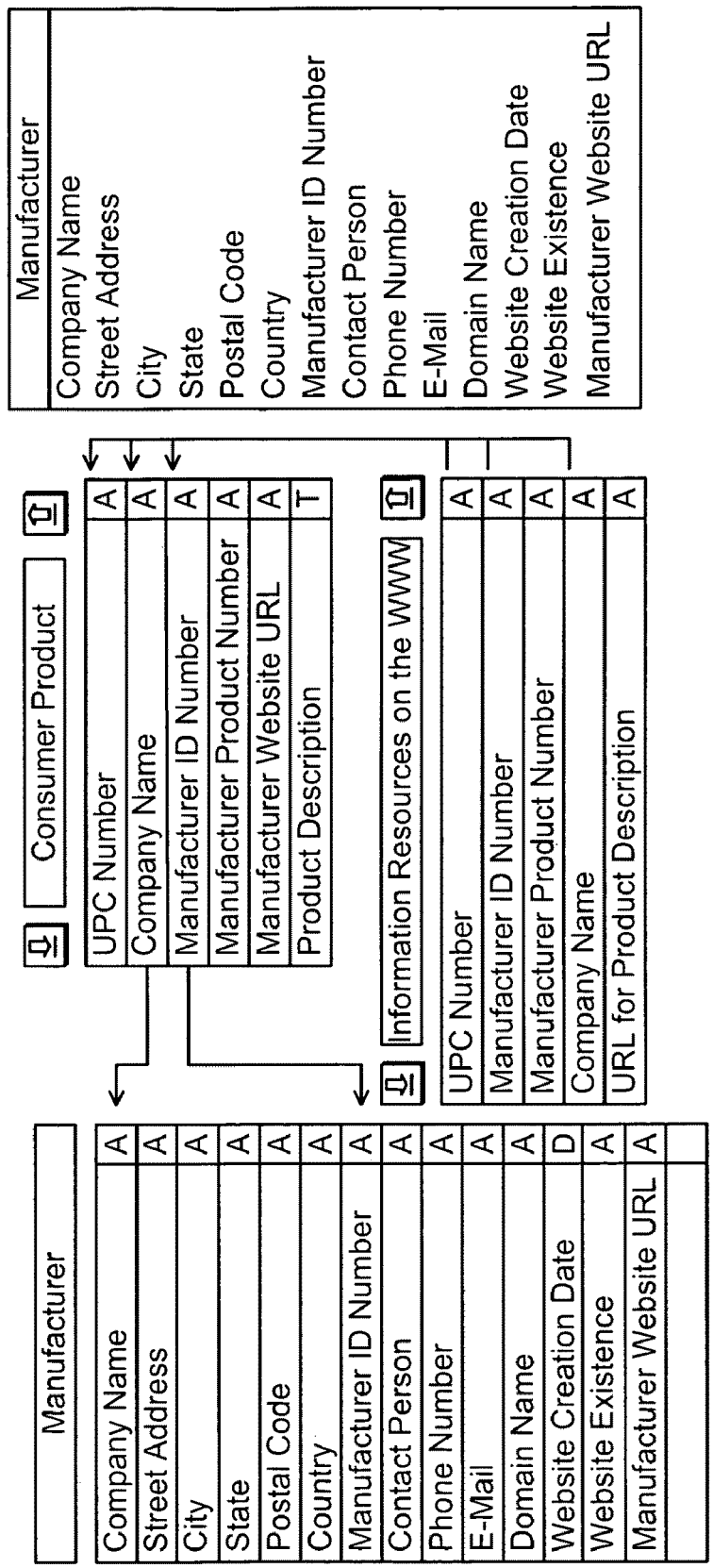
FIG. 4C is a schematic representation of the structure of a relational database management subsystem (RDBMS) used to carry out a best-mode embodiment of the IPI Registrant Database represented in FIGS. 4A1 and 4A2 hereof.

As shown in FIGS. 1A and 1B, the consumer-product information collection, transmission and delivery system of FIG. 1 is realized as an arrangement of system components, namely: a central UPN/™/PD/URL Relational Database Management Subsystem RDBMS 9 for storing and serving various types of consumer-product information to retailers, manufacturers and consumers alike (e.g., the name of the product's manufacturer; the Universal Product Code (UPC) or European Article Number (EAN) assigned to the product by the manufacturer; one or more URLs specifying the location of information resources on the Internet at which particular kinds of information relating to the consumer-product can be found; merchandise classification; style number; trade name; information specifying the size, color and other relevant characteristics of the consumer-product, where applicable; ordering criteria; availability and booking dates, etc.); a globally-based (packet-switched) digital telecommunications network (such as the Internet) 10 having an infrastructure including Internet Service Providers (ISPs), Network Service Providers (NSPs), routers, telecommunication lines, channels, etc., for supporting packet-switched type digital data telecommunications using the TCP/IP networking protocol well known in the art; one or more Internet Product Finding Directory (IPD) Servers, each indicated by reference numeral 11 and being connected to the Internet at strategically different locations via the Internet infrastructure 10 and data-synchronized with each other in order that each such Server maintains mirrored a relational-type database structure as represented in FIGS. 4A and 4B; a plurality of Internet Product-Information (IPI) Servers, each indicated by reference numeral 12 and being connected to the Internet via the Internet infrastructure; a plurality of retailer-related electronic-commerce (EC) information servers 12A, each operably connected to the infrastructure of the Internet, and enabling the hosting or one or more EC-enabled stores or EC-enabled on-line catalogs (i.e. EC-enabled WWW sites) owned, operated, managed and/or leased by one or more retailers along the retail supply and demand chain; a plurality of manufacturer-related electronic-commerce (EC) information servers 12B, each operably connected to the infrastructure of the Internet, and enabling the hosting or one or more EC-enabled stores or EC-enabled on-line catalogs (i.e. EC-enabled WWW sites) owned, operated, managed and/or leased by one or more manufacturers along the retail supply and demand chain; a plurality of User (or Client) Computers, each indicated by reference numeral 13, being connected to the Internet via the Internet infrastructure and available to consumers ($C_1, C_2, C_3, \ldots, C_i$); one or more data communication (i.e. EDI) networks 14, comprising data collection nodes 15 and communication links 16, operably connected to the centralized UPN/™/PD/URL Database Management Subsystem 9, each Client Computer 13 available to a Manufacturer ($M_1, M_2, M_3, \ldots, M_j$) and Retailer ($R_1, R_2, R_3, \ldots, R_k$) within the retail supply and demand chain; a Web-based Document Server 30 connected to at least one of the IPD Servers 11 and the Internet infrastructure, for transferring documents and messages to remote Client Computer Systems during the registration of manufacturers and consumer products with the system hereof and periodically updating product-related information with the IPD Servers 11 in an automatic manner; and a Web-based Document Administration Computer 31 connected to the Web-based Document Server 30 by way of a TCP/IP connection 32, for administrating the registration of manufacturers and products with the system, initiating the transfer of consumer product related information (e.g. menu of URLs) between the remote Client Computer Systems and Web-Based Document Server 30, transferring such information to the IPD Servers 11, and maintaining local records of such information transfers and the like. As will become apparent hereinafter, Web-based Document Server 30 and Web-based Document Administration Computer 31 provide a subsystem for (i) managing the process of registering qualified manufacturers and their consumer products and related Web pages (e.g. UPC numbers and URLs), and (ii) updating the product-related information with the IPD Servers 11 in an automatic manner to ensure accurate links between UPNs and URLs within the UPN/™/PD/URL RDBMS. The subsystem comprising the Web-based Document Server 30 and Web-based Document Administration Computer 31 shall be referred to as the Manufacturer/Product Registration Subsystem of the consumer product information finding and delivery subsystem 2 and indicated by reference numeral 33 throughout the figure drawings hereof.

Preferably, the centralized UPN/™/PD/URL RDBMS 9 and at least one of the IPD Servers 11 are located at a secured information storage/processing center 17, along with a multiprocessor (or mainframe) computer system, information servers, routers, data communication lines, disk storage devices (e.g. RAIDs), tape drives and tape-library system, uninterrupted power supplies (UPS), and other peripheral technology to provide on-line, batch and back-up operations. However, the IPI Servers, the Client Computers and the other IPD Servers (if provided for database mirroring purposes), typically will be located throughout the world, as the distribution of manufacturers, retailers and consumers who are encouraged to use the system is scattered across the Planet.

In the illustrative embodiment, the Web-based Document Server 30 is a Windows NT Server running WebDox™ Server software from Premenos Corporation of Concord, Calif. The Windows NT Server can be realized using a suitable computer system having a Pentium® or higher CPU, 64 MB of RAM or higher, running (i) Microsoft Windows NT Server 4.0 or higher Operating System software from Microsoft Corporation, (ii) Microsoft Internet Information Server 2.0 or higher from Microsoft Corporation, and (iii) Microsoft SQL Server 6.5 or higher software from Microsoft Corporation. Also, the WebDox™ Server is provided with a dedicated Internet connection (i.e. ISDN or better) to the Internet infrastructure 10.

The EDI administration computer 31 is either a Windows 95 or Windows NT Computer system running WebDox Admin™ software from Premenos Corporation of Concord, Calif. The Windows 95 or Windows NT computer system 31 can be realized using a suitable computer system having an Intel 486 or higher CPU, 12 MB of RAM or higher, running Microsoft Windows 95 or Windows NT 4.0 or higher, and having a TCP/IP connection 31 to the WebDox™ Server 30.

In order to use the WebDox™ system, each remote Client Computer System 13 includes either a Windows 95 or Windows NT Computer system running WebDox Remote™ software from Premenos Corporation of Concord, Calif. The Windows 95 or Windows NT computer system 13 can be realized using a suitable computer system having an Intel 486 or higher CPU, 16 MB of RAM or higher, and a VGA monitor or better, and running (i) Microsoft Windows 95 or Windows NT 3.51 or higher Operating System (OS) software, and (ii) Microsoft Internet Explorer 3.0 or higher from Microsoft Corporation. Also, the WebDox Remote™ Server is provided with a dial-up Internet connection (i.e. 14,400 bps or better) to the Internet infrastructure. The function of the Web-based Document Server 30, Web-based Administration System 31 and remote client subsystems 13 running the Premenos® WebDox Remote™ software is to provide a Web-based Document Transport System for automatically transferring information (e.g. UPN/™/PD/URLs) from manufacturers to the IPD Servers of the system in order to periodically update the same. While the illustrative embodiment of this Web-based Document Transport System has been described in terms of its implementation using the WebDox™ system from Premenos, it is understood that other commercially available electronic document transport systems (e.g. COMMERCE: FORMS™ Electronic Business Forms Package from Sterling Commerce, Inc., http://www.stercomm.com) can be used to carry out this subsystem. The operation of this Web-Based Document Transport System will be described in detail hereinafter with respect to the collection and delivery of consumer product-related information to the IPDs hereof.

As shown in FIGS. 1A and 1B, each synchronized IPD Server 11 is interfaced with an ISP 10A in a conventional manner. The actual number of IPD Servers 11 used in any particular application will depend on various factors including, for example, user demand, Internet traffic conditions, network router capacity and performance, etc. Each such IPD Server 11 is assigned a static IP address and a common domain name on the Internet according to the Domain Name System (DNS) well known in the art. Data synchronization among such databases can be achieved using conventional data synchronization techniques well known in the art. In addition, a backup and mirroring program can be used to maintain data security. Preferably, the synchronized IPD Servers are maintained by a team of network managers under the supervision of one or more webmasters.

As shown in FIGS. 2B1 through 2B4, using presently known technology available for use on the WWW, there are at least four different ways of configuring IPD Server 11 and back-end UPN/™/PD/URL Database Management Subsystem 9 of the illustrative embodiment. These four different subsystem architectures are schematically depicted in FIGS. 2B1 through 2B4.

In the system architectures shown in FIGS. 2B2 through 2B4, client-side Applets ("Applets"), having their <APPLET> HTML tags embedded within HTML documents (e.g. using the HTML 3.2 Specification), are executed with Java-enabled browsers on the client-side of the information network. In the system architecture set forth in FIG. 2B1, server-side Applets ("Servlets"), having their <SERVLET> HTML tags embedded within HTML documents (e.g. the HTML 3.2 Specification), are executed within Java-enabled Web servers on the server-side of the information network. Collectively, client-side Applets and server-side Applets shall be referred to as "Applets", wherein the major distinction between these two types is based on where the Applet is executed on the network (i.e. client-side or server side).

In each of these four system architectures, the IPD Server 11 performs a number of basic functions, for example: (1) serving HTML-encoded documents associated with Retail Industry/Market Oriented and Retailer-Hosted/Oriented Web-sites (e.g. BrandKey Request Central™ WWW site, BrandKey Request Retail™ WWW sites, etc.) to client subsystems 13 on the Internet so as to enable the six primary modes of operation of the consumer product information finding and delivery subsystem hereof including, but not limited to, access to consumer product related information stored within the IPI and Non-IPI Registrant Databases on the UPN/™/PD/URL Database Management Subsystem 9; as well as (2) serving Libraries of executable files containing "UPN-enabled Java Applet tags" for client-side Applets as well as server-side Applets a/k/a "Servlets", so as to enable retailers, manufacturers, advertisers, et al to download the executable "Applet tag containing" file to client subsystems.

According to the first system architecture shown in FIG. 2B1, the UPN/™/PD/URL RDBMS 9 is realized by a SQL-based RDBMS server 9, whereas the IPD server 11 is realized by a Java Web Server 11', provided with Java servlet support, and operably connected to the RDBMS server 9 by way of high-speed digital transmission link known in the art. During system operation, the Java Web Server 11' serves to a Java-enabled client subsystem 13, an HTML-encoded document containing a servlet HTML tag <SERVLET> which, upon selection by a single mouse-clicking operation by the consumer, sends an http request to the Java Web Server 11', invoking a prespecified UPN-encoded servlet stored therewithin, causing the CPIR-enabling servlet to execute on the server-side of the network. This causes the servlet to call and run certain predefined Java methods, which carry out an UPN-specified CPI search on the RDBMS server 9 and return the search results to the client subsystem 13 for display within a predetermined GUI generated therewithin. Using this system architecture, each UPN-encoded servlet executed within the Java Web Server 11' will contain information relating to (1) the UPN-specified consumer product on which product information is to be searched for within the RDBMS server 9, (2) licensing information relating to whom the CPIR-enabling servlet has been licensed.

According to the second system architecture shown in FIG. 2B2, the UPN/™/PD/URL RDBMS 9 is realized by a SQL-based RDBMS server 9, whereas the IPD server 11 is realized by a Java Web Server 11", providing Java Applet support and being operably connected to the RDBMS Server 9 by a high-speed digital data transmission link known in the art. During system operation, the Java Web Server 11" serves to the Java-enabled client subsystem 13, an HTML-encoded document containing a "UPN-encoded" Applet HTML tag <APPLET> which, upon selection by a single mouse-clicking operation by the consumer, causes the CPIR-enabling Applet to execute on the client-side of the network, sending an http request to the Java Web Server 11", invoking a prespecified Common Gateway Interface (CGI) stored within the Java Web Server 11". This causes the Applet to call and CGI to run certain predefined methods for carrying out a UPN-specified CPI search on the RDBMS server 9 and returning the search results to the client subsystem 13 for display within a predetermined GUI prespecified within the Applet. Using this system architecture, each UPN-encoded Applet executed within the Java browser of the client machine 13 will contain information relating to (1) the UPN-specified consumer product on which product information is to be searched for within the RDBMS server 9, and (2) licensing information relating to whom the client-side Applet has been licensed and by whom the Applet may be served to others within the terms of the licensing program/agreement, etc.

According to the third system architecture shown in FIG. 2B3, the UPN/™/PD/URL RDBMS 9 is realized by a SQL-based RDBMS server 9, whereas the IPD server 11 is realized by a Java Web Server 11''', providing client-side Applet support, and being operably connected to the RDBMS server 9 by way of a high-speed digital data transmission link known in the art. During system operation, the Java Web Server 11''' serves to the Java-enabled client subsystem 13, an HTML-encoded document containing a UPN-encoded Applet HTML tag <APPLET> which, upon selection by a single-mouse clicking operation by the consumer, causes the Applet to execute on the client-side of the network, creating a "socket-type" connection at lower (TCP/IP) communication layers between the client subsystem 13 and Java Web Server 11''', enabling the Java Web Server 11''' to run certain predefined Java methods for carrying out a UPN-specified CPI search on the RDBMS server 9, and returning the search results to the client subsystem 13 for display within a GUI prespecified within the Applet. Using this system architecture, each UPN-encoded Applet executed within the Java client subsystem 13 will be created to contain information relating to (i) the UPN-specified consumer product on which product information is to be searched for within the RDBMS server 9, (ii) licensing information relating to whom the client-side Applet has been licensed and by whom the Applet may be served within the terms of the licensing program, etc.

According to the fourth system architecture shown in FIG. 2B4, the UPN/™/PD/URL RDBMS 9 is realized by a SQL-based RDBMS server 9, whereas the IPD Server 11 is realized by a Java Web Server 11'''', supporting client-side Applet execution and being operably connected to a high-speed digital data communication link well known in the art. During system operation the Java Web Server 11'''' serves to the Java-enabled client subsystem 13, an HTML-encoded document containing a Applet HTML tag <APPLET> which, upon selection by a single mouse-clicking operation by the consumer, causes the CPIR-enabling Applet to execute within the Java-enabled client 13 on the client-side of the network, calling a Remote Invocation Method to carry out a prespecified CPI search on the RDBMS server 9 and returning the search results to the client subsystem 13 for display within a predetermined GUI prespecified by the Applet. Using this system architecture, each UPN-encoded Applet executing within the Java enabled client 13 will contain information relating to (1) the UPN-specified consumer product on which product information is to be searched for within the RDBMS server, and (2) licensing information relating to whom the server-side Applet has been licensed and by whom the Applet may be served to others within the terms of the licensing program, etc.

In the first illustrative embodiment shown in FIG. 2B1, Java (enabled) Web Server 11' can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; and (2) a servlet-enabled Web (http) server software program such as, the Java Web Server (JWS) 1.0 or later from JavaSoft, division of Sun Microsystems, Inc., or the JigSaw Web Server from the World Wide Web Consortium, each proving native Java support, or alternatively, the Fastrak™ Web (http) server from Netscape Communications, Inc., the Internet Information Server (IIS) from the Microsoft Corporation, the Apache HTTP Server from The Apache Software Foundation at http://www.apache.org, or any other http server capable of transporting HTML-encoded documents, in conjunction with the Java Servlet Developer's Kit from JavaSoft, or the Servlet Express Tool from IBM Research Labs in Haifa, Israel, for managing servlets on Web servers lacking native Java support. In order to develop servlets, the Java Web Server 11' should also be equipped with the following software tools: the Sun Java Developers Kit 1.1.x from Sun Microsystems, Inc.; and the Java Servlets Development Kit (JDSK) from Sun Microsystems, Inc., or a Java Development Environment that supports JDK 1.1.x, such as VisualAge for Java by IBM, Microsoft's Visual J++, or the like. Optionally, the Java Web Server 11' may also include Web-site development software (e.g. based on the HTML 3.2 or 4.0 Specification) for creating and maintaining the IPI Web-sites of the present invention, although such tools will be typically run on client subsystem 13 for practical reasons.

In the illustrative embodiments of FIGS. 2B2 through 2B4, Java Web Servers 11'' through 11'''' can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; (2) a Web (http) server such as the Java Web Server (JWS) from JavaSoft, the JigSaw Web Server from the World Wide Web Consortium, the Internet Information Server (IIS) from the Microsoft Corporation, the Apache HTTP Server from the Apache Software Foundation, or other Java-enabled Web server capable of transporting HTML encoded documents; (3) the Sun Java Developers Kit, from Sun Microsystems, Inc., for developing client-side Applets; and (4) optionally, Web-site development software (e.g. based on the HTML 3.2 or 4.0 Specification) for creating and maintaining the IPI Web-sites hereof, although such tools will typically run on client subsystems 13 for practical reasons. Notably, when using the Microsoft IIS, one can use a Java Development Environment that supports JDK 1.1.x, such as VisualAge for Java by IBM, Microsoft's Visual J++, and the like. Also, Java Web Server 11'' must provide support for running CGI scripts written in Java, PERL or other suitable scripting language known in the art.

In the illustrative embodiments shown in FIGS. 2B1 through 2B4, each SQL-based RDBMS Server 9 can be realized by, for example, the Origin 200 Server from Silicon Graphics, Inc., the $O_2$ Desktop Workstation from Silicon Graphics, Inc., a ULTRA™ information server from Sun Microsystems, Inc., or any other suitable computing machine, running a RDBMS software program such as ORACLE 8.0 from Oracle Corporation, Sybase SQL from Sybase, Inc., Access 98 from Microsoft, or other database development program based on a database programming language such as the SQL Language, the Sybase language, or any other suitable database language enabling database programming and connectivity over the Internet.

In principle, there can be millions of IPI Servers 12 within the system hereof, each enabled to serve Web-based documents containing consumer product related information.

Notably, each such IPI Server 12 can be realized by, for example, the Origin 200 Server from Silicon Graphics, Inc, the O2 Desktop Workstation from Silicon Graphics, Inc., the ULTRA™ information server from Sun Microsystems, Inc., or any other computing machine (e.g. desktop, palmtop, laptop, etc.) running an operating system (e.g. UNIX, LINUX, Macintosh, MS Windows, NT, etc.) capable of performing the functions of an Internet (http) information server in a client-server distributed object computing environment. As shown in FIGS. 2-1 and 2-2, each IPI Server 12 is interfaced with an ISP 10A in a conventional manner. Each such IPI Server 12 is assigned a static IP address and a unique domain name on the Internet. Each IPI Server 12 is also provided with (i) Web-site development software for creating HTML-encoded multi-media pages for Web-site development, (ii) a dynamic web-site auction hosting software solution, such as, AuctionNow 4.2 from OpenSite, Inc. at http://wvw.opensite.com; and (iii) Web-site server software for supporting HTTP and serving HTML, XML and other document formats used to construct hypermedia-type Web-sites containing product related information of a multi-media nature. Such Web sites can be expressed in HTML, XML, SGML and/or VRML or any other suitable language, which allows for Web-site construction and Web-site connectivity. Web-site management software can be used to maintain correct hyper-links for any particular Web site. Preferably, the IPI Servers 12 is maintained by a team of network managers under supervision of one or more webmasters.

Each retailer-related electronic-commerce (EC) information server 12A indicated in FIGS. 1A and 1B is operably connected to the infrastructure of the Internet. In general, each retailer-related information server 12A can be realized by, for example, the Origin 200 Server or O2 Desktop Workstation from Silicon Graphics, Inc., a high-end information server from Sun Microsystems, Inc., or any other computing machine that can perform the function of a Server in a web-based, client-server type computer system architecture of the illustrative embodiment. As shown in FIGS. 1A and 1B, each retailer-related EC-enabled information server 12A is interfaced with an ISP 10A in a conventional manner, and is assigned a static IP address and a unique domain name on the Internet. Each retailer-related EC-enabled information server 12A is also provided with: (i) Java-enabled WWW (http) server software, such as Netscape Communications Fastrak Information Server software, for supporting http, ftp, XML/ICE and other Internet protocols, and serving HTML and XML formatted documents (i.e. pages) associated with Web-sites containing product related information of a multi-media nature; (ii) an advanced EC-enabled product merchandising software solution, such as the Host and Merchant (or Enfinity) Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, creating business-to-business and business-to-consumer product catalogs; (iii) an Internet Advertisement Management Software Solution, such as OPEN ADSTREAM™ Internet AD management software solution by REAL-MEDIA, Inc. of New York, N.Y.), for managing all aspects of Internet advertising on Internet information servers; (iv) a dynamic web-site auction hosting software solution, such as, AuctionNow 4.2 from OpenSite, Inc. at http://www.opensite.com; and optionally (v) Web-site development software for enabling the creation of HTML-encoded multi-media pages and the like for the EC-enabled Web-site development. Such EC-enabled Web-sites can be expressed in HTML, XML and/or VRML or any other suitable language, which allows for Web-site construction and Web-site connectivity. Web-site management software can be used to maintain correct hyper-links for any particular Web site. Preferably, each EC-enabled retailer-related server 12A is maintained by a team of network managers under supervision of one or more webmasters. The primary function of each retailer-related EC information server 12A is to enable the hosting of one or more EC-enabled stores or EC-enabled on-line catalogs (i.e. WWW sites) owned, operated, managed and/or leased by one or more retailers, (and optionally wholesalers and manufacturers as well) along the retail supply and demand chain. The use of the Intershop 4 Hosting and Merchant E-commerce software solution enables sellers to design and build dynamic environments for buyers and sellers by enabling sellers (i.e. vendors) to: (1) create a unique look and feel for their e-commerce sites using a Web browser; (2) fully customize their e-commerce sites to maximize the buyers experience, using an import/export function for easily importing existing product databases and site design directly into the Intershop; (3) build detailed profiles of buyers and present them with products that match these profiles, creating a personalized shopping experience; and (4) offer complementary products for sale based on current selections, thereby raising the overall value of each e-commerce transaction carried out. Also, the back-office portion of the Intershop 4 E-commerce Solution is intuitively organized to make it easy for sellers to manage their on-line business through a Web browser.

Each manufacturer-related electronic-commerce (EC) information server 12B indicated in FIGS. 1A and 1B is operably connected to the infrastructure of the Internet. In general, each manufacturer-related EC information server 12B can be realized by, for example, the Origin 200 Server from Silicon Graphics, Inc., the O2 Desktop Workstation from Silicon Graphics, Inc., the ULTRA™ information server from Sun Microsystems, Inc., or any other computing machine that can perform the function of an http server in a client-server distributed object-computing environment. As shown in FIGS. 1A and 1B, each manufacturer-related EC-enabled information server 12B is interfaced with an ISP 10A in a conventional manner, and is assigned a static IP address and a unique domain name on the Internet. Each manufacturer-related EC-enabled information server 12B is also provided with: (i) Java-enabled WWW (http) server software, such as Netscape Communications FastTrak Information Server software, for supporting http, ftp, and other Internet protocols, and serving HTML and XML formatted documents (i.e. pages) associated with Web-sites containing product related information of a multi-media nature; (ii) an advanced EC-enabled product merchandising software solution, such as the Host and Merchant Intershop 4 E-Commerce Server Solution from Intershop Communications, Inc., of San Francisco, Calif., and/or catalogMANAGER® and catalog-MAKER® software programs from RealEDI, Inc. of Sherman Oaks, Calif., for building, managing and operating all aspects of e-commerce WWW sites, whether implementing on-line merchandising solutions for retailers and manufacturers, or creating business-to-business and business-to-consumer product catalogs; (iii) an Internet Advertisement Management Software Solution, such as OPEN ADSTREAM™ Internet AD management software solution by REAL-MEDIA, Inc. of New York, N.Y.), for managing all aspects of Internet advertising on Internet information servers; (iv) a dynamic web-site auction hosting software solution, such as, AuctionNow 4.2 from OpenSite, Inc. at http://www.opensite.com; and optionally (v) Web-site development software for enabling the creation of HTML-encoded multi-media pages and the like for the EC-enabled Web-site development. Such EC-enabled Web-sites can be expressed in HTML, XML, SGML and/or VRML or any other suitable language which allows for Web-site construction and Web-site connectivity. Web-site management software can be used to maintain correct hyper-links for any particular Web site. Preferably, each EC-enabled manufacturer-related server 12B is maintained by a team of network managers under supervision of one or more webmasters. The primary function of each manufacturer-related EC information server 12B is to enable the hosting or one or more EC-enabled stores or EC-enabled on-line catalogs (i.e. WWW sites) owned, operated, managed and/or leased by one or more manufacturers, (and optionally wholesalers and retailers as well) along the retail supply and demand chain.

Each Client Computer Subsystem (hereinafter "client subsystem") 13 can be realized by any computing system employing operating system (OS) software (e.g. Macintosh, Windows 95, Windows NT, Unix, etc.), which supports a Java-enabled Internet browser program (e.g. Netscape's Navigator, Microsoft's Explorer, NCSC's Mosaic, etc.). The operating system should also include: (1) Internet networking software that supports the TCP/IP networking protocol (required by HTTP, FTP and the like) and provides a JAVA GUI-based Web browser interface; and, in the case of client computer machines 13 that are used by manufacturers and retailers in their "back office" operations, (2) Electronic Data Interchange (EDI) networking software that supports all versions of EDI between two or more client subsystems over the VAN-based or Web-based EDI networks illustrated in FIGS. 1A and 1B. Alternatively, client subsystems may also be realized by any of the following systems: (i) a Newton Message Pad 130 (running the Newton 2.0 Operating System and NetHopper™ Internet Software and equipped with a Motorola RF PCMCIA modem card); (ii) a Pippin™ computer system from Apple Computer, Inc.; (iii) a Palm Pilot VII wireless Internet-enabled palmtop computing device by 3COM, Inc.; (iv) a network computer (NC) that supports the Java™ programming language and Java applets expressed therewith; (v) a Sony® WebTV Internet Terminal (supported by the WebTV Service provided by WebTV Network, Inc.); or the like. As shown in FIGS. 1A and 1B, each Client Computer is interfaced with an ISP 10A in a conventional manner. Each such client subsystem may be assigned a static IP address and a unique domain name on the Internet, or one may be dynamically assigned thereto by way of its ISP depending on its connectivity, and set of assigned functions within the consumer product information network of the present invention. Optionally, any client subsystem may include Web-site (http) server software serving Web documents of various formats (HTML, XML, SGML or the like) from one or more hypermedia-type Web sites in a manner well known in the art.

Typically, each client subsystem 13 will be maintained by either present or future manufacturers, retailers and/or consumers of products, about which information can be found on the Internet. As shown in FIG. 3A1, any client subsystem of the present invention may be realized as a desktop computer workstation comprising: a processor and memory 19; a visual display monitor 20; a keyboard 21; a JAVA GUI mouse 22; and a bar code symbol reader 23 for reading UPC, UPC/EAN and other types of bar code symbols printed on consumer products, brochures, documents, and the like.

As shown in FIG. 3A2, any Client Computer 13 may also be realized in the form of a Web-based (wired or wireless) multi-media kiosk, designed for use as a "Cyber sales agent" within retail shopping environments. As shown in FIG. 3A2, the Web-based kiosk of the present invention may comprise: a floor, wall or ceiling supported housing 25; an omnidirectional laser bar code symbol reader (e.g. Metrologic MS 6720 Laser Scanner) 26 for reading UPC (and other types of) symbols printed on products, brochures, documents and the like; an active-matrix LCD-type visual display screen 27 for viewing product related information automatically displayed thereon in response to the entry of the UPC numbers scanned into the UPC Number Entry Window 21D below the IPI Finder button 21A of Control Strip 20B displayed on the client subsystem, as shown in FIG. 3C; a touch-screen type keyboard and pointing device 28 for clicking on anchored links on Web pages, entering information into client subsystem during its use; audio-speakers 29A for supporting multimedia Web-sites that may be visited when using the client subsystem; a color or black/white printer for printer 29B for printing out Web pages under consumer command during an information finding session using the system; and also, one or more floppy-disc (or otherwise removable) drive units 29C, accessible to the consumer for recording promotional and trial versions of information-based consumer products (e.g. video and audio recordings, computer software products, and the like) on removable information storage media (e.g. 1.44 MB floppy discs, 100 MB Zips® floppy discs, 1 GB Jazz® floppy discs, etc.) supplied by either the retailer or consumer. Optionally, the kiosk can be provided with a stereoscopic micropolarizing LCD panel from VRex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, any Client Computer 13 within the system hereof may be realized in the form of the Web-based multi-media kiosk 34, also designed for use as a "virtual sales agent" within retail shopping environments. As shown, the Web-based kiosk 34 comprises: an ultra-compact housing 35 capable of being supported upon a pair of support rods (35A), a vertical support surface (e.g. wall), a horizontal support surface (e.g. countertop), or supported from a ceiling or pedestal; an omnidirectional laser bar code symbol reader (e.g. Metrologic MS 6720 Laser Scanner) 36, modified with handle 36A, for reading UPC (and other types of) symbols printed on products, brochures, documents and the like; an active-matrix LCD-type visual display screen 37 for viewing product related information automatically displayed thereon in response to the entry of the UPC numbers scanned into the UPC Number Entry Window 21D displayed on the client subsystem; a touch-screen type keyboard and pointing device 38 for clicking on anchored links on Web pages, entering information into client subsystem during its use; audio-speakers 39A for supporting multimedia Web-site that may be visited when using the client subsystem; a color or black/white printer for printer 39B for printing out Web pages under consumer command during an information finding session using the system; a scanner support stand 40 with guide flanges 41A and 41B, for guidably receiving and supporting the scanner 36 as shown in FIG. 3A3; a recoilable scanner cable 42, dispensed from cable cartridge 43 and guided through hole 44 in a scanner support bridge 40; a telephone handset 45 and associated communication apparatus for making telephone calls over a public telecommunications switching network (PSTN) independent of the operation of the Web-browser of the kiosk; and a mag-stripe card reader 46 and associated credit transaction terminal for automatically dialing up consumer credit and like databases over the PSTN (or Internet) upon scanning mag-stripe card 47 through reader 46. Optionally, the kiosk may also include one or more floppy-disc (or otherwise removable) drive units (not shown) accessible to the consumer for recording promotional and trial versions of information-based consumer products (e.g. video an audio recordings, computer software products, and the like) on removable information storage media (e.g. 1.44 MB floppy discs, 100 MB Zip® floppy discs, 1 GB Jazz® floppy discs, etc.) supplied by either the retailer or a consumer. Also, the kiosk can be provided with a stereoscopic micropolarizing LCD panel from VRex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A4, the bar code symbol reader is supported within its support stand/bridge 40. In this configuration, the laser-scanning field of the reader is projected downwardly upon the surface of the LCD touch screen display panel. By virtue of the angle of tilt of the display panel 37 relative to the ground surface of the retail store, and the projection angle of the laser scanning field relative to the display panel surface, the consumer will be able to easy read the bar code symbol on most consumer products by simply presenting the bar code symbol to the scanning window. In the event that the product is too large to lift from the floor to the scanning window, the consumer can simply remove the bar code symbol reader 36 from its support stand 40, as shown in FIG. 3A4, by pulling cord 42 out of its take-up compartment 43 so that the reader is positioned to read the bar code symbol 49 on the retail consumer product 48. When symbol scanning is completed, the bar code symbol reader is lifted back into its stand support position, between support guides 41A and 41B, while the cord 42 is automatically recoiled back into storage compartment 43, as shown in FIG. 3A4. While the consumer uses the kiosk to scan UPC (or UPC/EAN) symbols on products, to find, access and display consumer product-related information on the display panel 37, he or she may choose or need to use telephone 45 to speak with a manufacturer's representative and engage in electronic commerce, and/or use the magstripe card reader 46 to read magstripe cards (e.g. credit cards) to pay for consumer purchases made over the Internet using the kiosk of the present invention.

Figure 5:
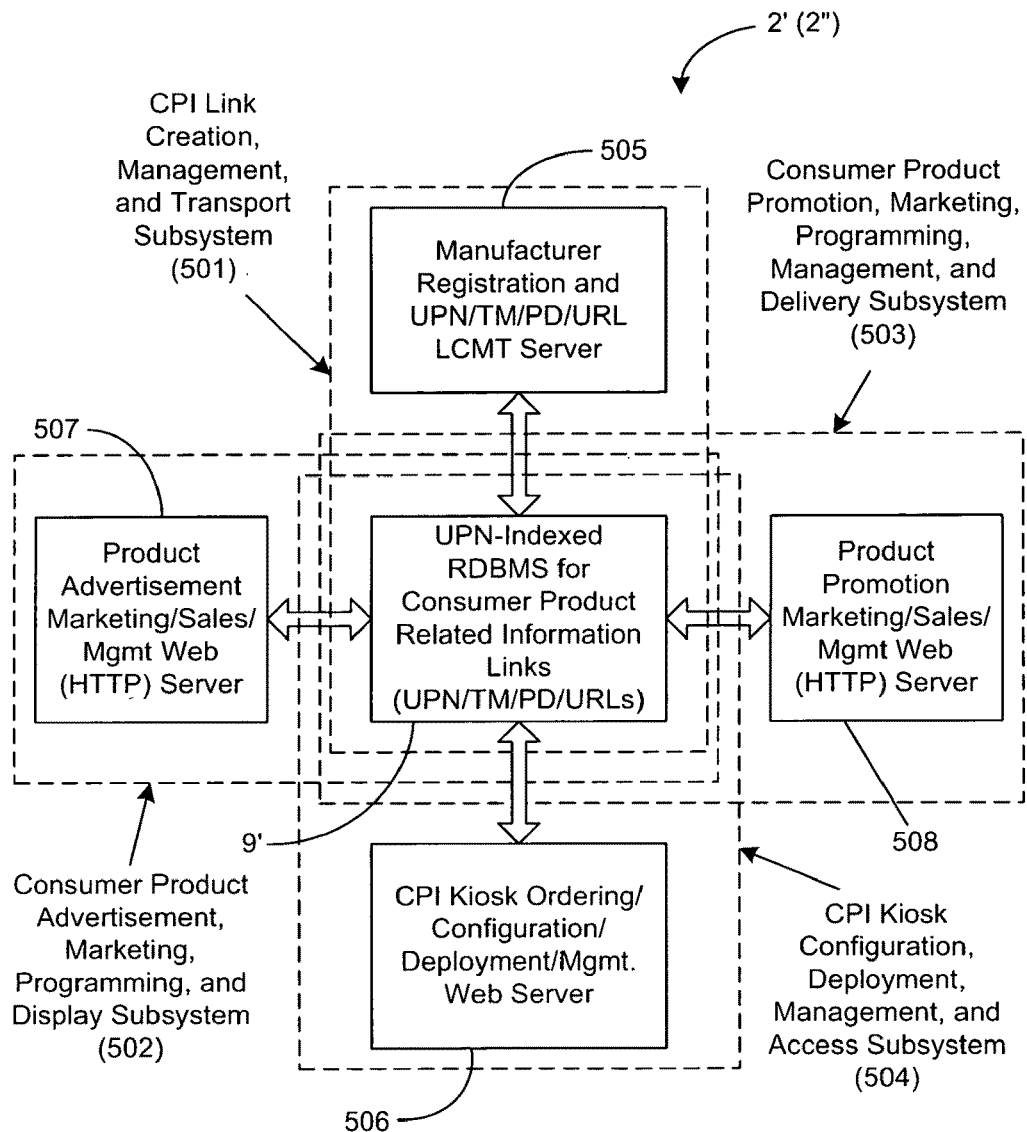
Figure 7:
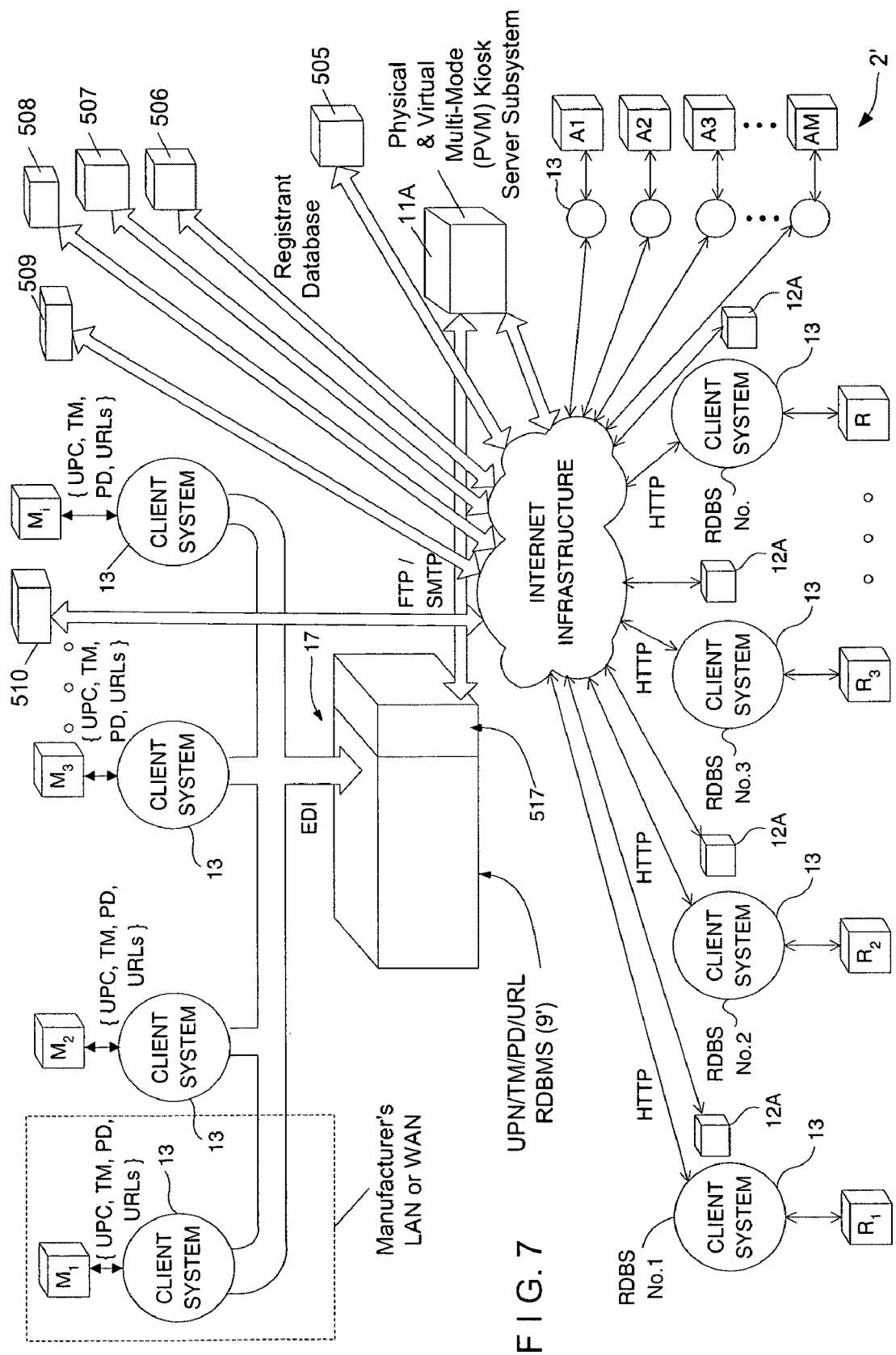
FIG. 7 is a schematic diagram illustrating the flow of information within the system of the present invention, including (i) the communication link extending between the information subsystems of manufacturers of UPC-encoded products and the centralized (or master) UPN/™/PD/URL RDBMS of the present invention, (ii) the communication link extending between the UPN/™/PD/URL RDBMS and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, (vi) the communication link extending between the IPI Servers and the Client Subsystems of consumers, and (vii) the communication link extending between the UPN/™/PD/URL RDBMS and the EC-enabled UPN-based Consumer Product Catalog Server(s) of the present invention for providing consumer product catalog services to retailer purchasing agents and others and enabling the on-line purchase of consumer products between trading partners (e.g. manufactures and retailers) using EDI (or XML/EDI) based business-to-business electronic commerce transactions, with (viii) a first plurality of mirrored Consumer Product Kiosk Advertisement Marketing/Sales/Management Web (http) Servers of the present invention shown operably connected to the infrastructure of the Internet and accessible by registered advertising agents for purposes of placing advertisement orders with the system and creating, managing and implementing product advertising campaigns deployed within physical and electronic streams of commerce, and (xi) a second plurality of mirrored Consumer Product Kiosk Promotion Marketing/Sales/Management Web (http) Servers of the present invention operably connected to the infrastructure of the Internet and accessible by product promotional agents, for purposes of placing product promotion orders with the system and creating, managing and implementing product advertising and promotion campaigns deployed within physical and electronic streams of commerce.
Figure 8:
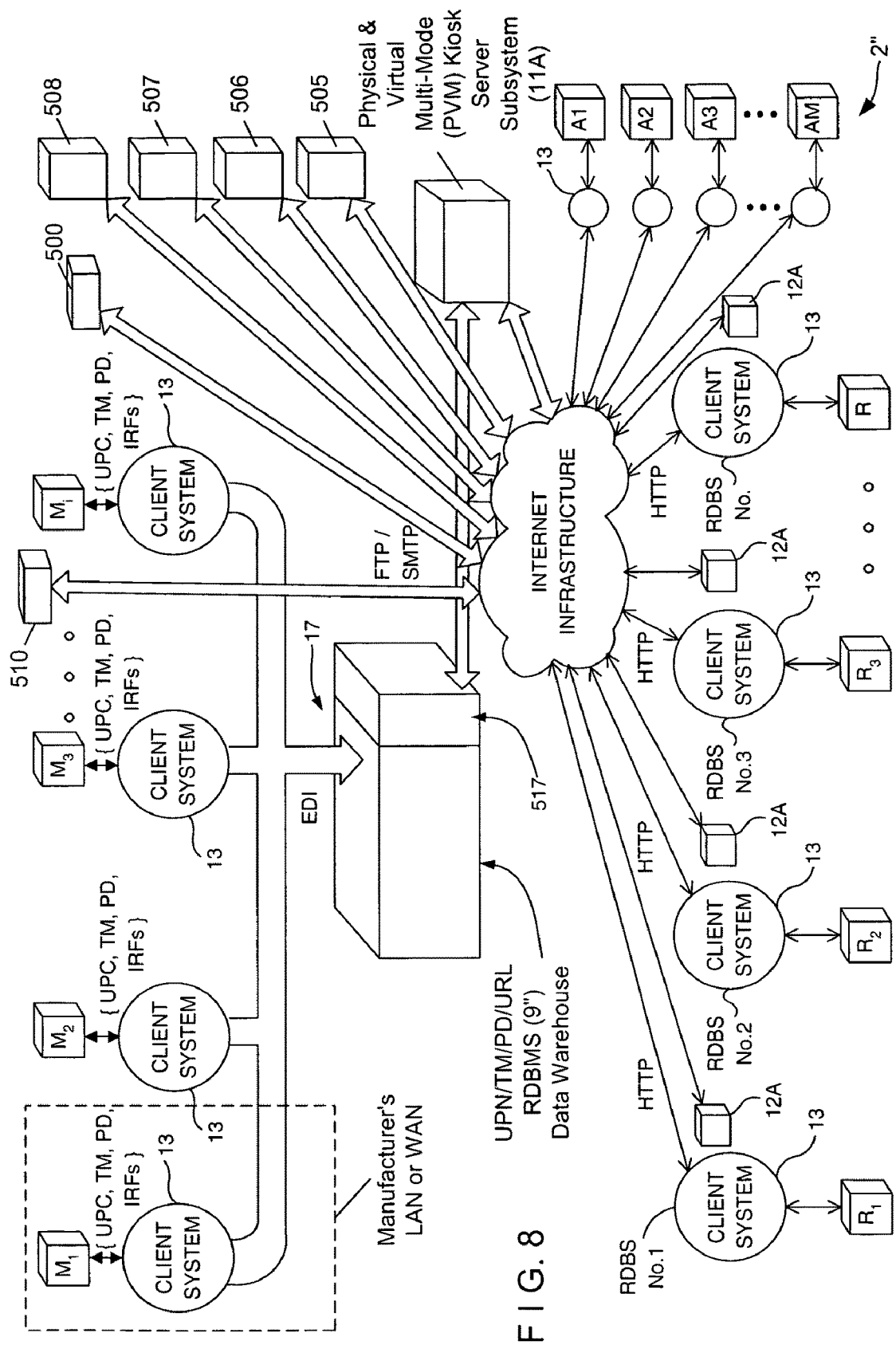
FIG. 8 is a schematic diagram illustrating the flow of information within the system of the present invention, similar to that shown in FIG. 7, except that as shown in FIG. 8, each manufacturer transmits to the UPN-indexed RDBMS (realized as a massive RDBMS data warehouse) one or more information resource files (IRFs) which are symbolically linked to a particular UPN-encoded product, and that each IRF is then stored as a Web-based document on an Internet information server at predesignated URL, symbolically linked to the UPN, so that consumers can use the UPN to access a menu of URLs symbolically linked thereto for display of the corresponding Web-documents.

As shown in FIG. 3A5, the Web-enabled kiosk of FIG. 3A3 is modified to include a bar code symbol reader having a "cordless-type" scanner interface, thereby eliminating the need for the communication/scanner cable 42 shown in FIG. 3A3. RF-based wireless interfaces, as disclosed in US Letters Patents and Published International Patent Applications, incorporated herein by reference, can be used to realize this cordless-type scanner interface arranged between the bar code symbol reader 36 and the Web-enabled access terminal integrated within the information kiosk. In all other respects, the kiosk shown in FIGS. 3A5 and 3A6 is similar to the kiosk shown in FIGS. 3A3 and 3A4 and described above.

Notably, it is understood that there will be many different types of wireless mobile Internet-enabled access terminals that may be used to realize the client computer subsystems of the present invention. For example, recently 3COM, Inc. introduced into its commercial product line the Palm Pilot VII Wireless Hand-Held Internet Access Terminal, which is similar in many respects to the Newton MessagePad Model 130 equipped with the Motorola PCMCIA-based modem card 75, and Nethopper™ Software, described above. Also, Symbol Technologies, Inc. of Holtsville, N.Y. has introduced the Symbol SPT 1500, SPT 1700, SPT 1740 and PPT 2700 handheld wireless bar code scanning Internet access terminals which have virtually the same functionalities embodied within the wireless hand-held Internet access terminal shown in FIG. 3A8, and originally disclosed in U.S. Pat. No. 5,905,251, supra.

The Web-enabled client subsystems 13 of the present invention described hereinabove may be used to access consumer product-related information, as well as to carry out electronic-commerce related transactions, at home, at work, in the office, on the road, as well as in physical retail shopping environments.

For example, when visiting particular EC-oriented (i.e. electronic-commerce enabled) Web-sites, a consumer may scan UPC (and/or UPC/EAN) numbers on products within his or her home (e.g. in the pantry) using any one of the client computer subsystems hereof equipped with a bar code symbol reader in order to remotely purchase such consumer products using credit or debit type financing, and direct shipment of purchased products to the consumer's home or elsewhere by a particular delivery service. Such EC-enabled WWW sites, commonly referred to as electronic-commerce (EC) stores or storefronts, as well as on-line electronic commerce catalogs, can be operated by manufacturers, wholesalers and/or retailers of consumer products, as indicated in FIGS. 1A and 1B. As shown therein, retailer operated, managed and/or owned EC stores (i.e. EC-enabled WWW sites) are hosted on retailer operated/owned EC information servers (MECIS) 12A, whereas manufacturer operated, managed and/or owned EC stores (i.e. EC-enabled WWW sites) are hosted on manufacturer operated/owned EC information servers (MECIS) 12B operably connected to the infrastructure of the Internet.

The consumer product information delivery system of the present invention shall enable an infinite array of applications with regard to electronic commerce and home shopping, now made possible by the present invention.

The Database Structure of the IPD Server

In the illustrative embodiment of the present invention, each data-synchronized IPD Server 11 of the preferred embodiment maintains at least two different relational-type databases, namely: a IPI Registrant Database for storing information about manufacturers whose products are registered with the system; and a Non-IPI Registrant Database for storing information about manufacturers whose products are not registered with the system. A schematic representation of the IPI Registrant Database is shown in FIG. 4A1, whereas a schematic representation of the Non-IPI Registrant Database is shown in FIG. 4B.

As shown in FIG. 4A1, the relational-type IPI Registrant Database maintained by each IPD Server comprises a plurality of labeled information fields for each product "registered" therewith, namely: an IPN Information Field for storing information (e.g. numeric or alphanumeric string) representative of the Universal Product Number (e.g. twelve-digit UPC Version A number, eight-digit UPC Version E number, thirteen-digit UPC/EAN number, or twelve-digit UPC Version A number plus five-digit Add-On Code Segment number frequently used in the publishing industry) assigned to the consumer product; a Company Name Information Field for storing information (e.g. numeric or alphanumeric string) representative of the name of the company making, selling or distributing the corresponding product; a URL Information Field(s) for storing information (e.g. numeric or alphanumeric string) representative of the Universal Resource Locator (URL) or Universal Resource Locators (URLs) at which information resource(s) of the multimedia type can be found on the Internet relating to the corresponding consumer product; a Trademark Information Field for storing information (e.g. text and/or alphanumeric strings) representative of each trademark (or Domain Name) used in connection with the promotion, sale, distribution and/or use of the corresponding product, and preferably registered with the United States Patent and Trademark Office (USPTO) or other governmental or quasi-governmental agency (e.g. INTERNIC or Network Solutions, Inc.); a Product Description Information Field for storing information (e.g. text strings) descriptive of the corresponding product; an E-mail Address Information Field for storing information (e.g. numeric or alphanumeric string) representative of the e-mail address of the corresponding company (e.g. manufacturer) on the Internet; a CPIR-Enabling Applet Information Field for storing information representative of consumer product information request (CPIR) enabling Applets accessible by retailers, wholesalers, advertisers, Web publishers and the like by downloading operations to be described in detail hereinafter, and eventually inserted within the HTML code of Web documents on various types of Internet information servers used to host WWW sites of all sorts, so that, when executed, these CPIR-enabling Applets automatically access from the master UPN/™/PD/URL Database Management Subsystem 9 hereof, a categorized menu of URLs specifying the location of information resources on the Internet pertaining to a particular UPN-labeled product and symbolically linked thereto by its manufacturer or authorized agent; image file storage field for storing color images of consumer products registered with the system; and a Status Information Field for storing information (e.g. numeric or alphanumeric string) representative of whether the company (e.g. manufacturer) associated registered product has paid their monthly, quarterly or annual registration fees associated with registration within the IPD Servers of the information finding and serving subsystem hereof. Notably, each information item contained with the information field shown along the same horizontal line of FIG. 4A1 is related or linked.

In general, the URL stored in the URL Information Field specifies the address of an information resource on the Internet (e.g. Web), and thus may point to any one of the following types of information resources: a HTML document or file on the World Wide Web (expressed in the Hypertext Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mail to", and specifies the type of resource that the URL is pointing (i.e. connecting) to; a Host Indicator, represented by double slashes "//" if the URL is requesting information from a Web Server; Server Name comprising an Internet Domain Name (e.g. "www."), the address of the Web Server (e.g. "ibm."), and a designator (e.g. "com", "edu", "int", "mil", "net", "org", etc.) identifying who owns the server or where it is located; a Path Name, such as "Products/Computers/", indicating a path to the destination information file on the identified Server; and a Resource Name (including file extension, e.g. ".html"), such as "aptiva.html", identifying the actual named information file that contains actual information resource specified by the URL.

As used herein as well as in the Claims to Invention, the term "registered" and the variants thereof shall be understood to mean listed or having an entry within a database. Such listing or entry can be achieved in a variety of ways including, but not limited to: (i) by specific request of the associated company or business; or (ii) by the system administrator without a request and/or authorization of the corresponding company or business linked to the product.

Notably, each information item contained within the information field shown along the same horizontal line of FIG. 4A1 is symbolically related or linked. Different products of the same registrant or related registrant may also be linked together so that a user looking for information about a particular product is automatically provided with URLs which are assigned to related products of the registrant which may satisfy the goals or objectives of a particular advertising and/or marketing campaign or product promotion program of the registrant company. As it may be desired to relate particular products at particular points in time, the relationships therebetween can be dynamically changed within the IPI Registrant Database by a straightforward database updating operation carried out by a system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve-digit numeric string (for UPC Version A) or eight-digit numeric string (for UPC Version E) will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit "number system" number and a five digit manufacturer code; (ii) a five digit "product" number assigned to the product by the manufacturer; and (iii) a one digit modulo check digit (mathematically calculated) and added to each UPC number to check that the code has been read correctly by the bar code symbol reader.

In order to provide the requester greater control over what information is actually displayed on its client subsystem, the URL Information Field of the IPI Database shown in FIG. 4A1 contains a number of information subfields. As shown in FIG. 4A2, these information subfields comprise: a Product Advertisement Information Field for storing information representative of URLs pointing to information on the Internet relating to advertising and/or promotion of the product; a Product Specification (i.e. Description) Information Field for storing information representative of URLs pointing to information on the Internet relating to specifications on the product; a Product Update Information Field for storing information representative of URLs pointing to information on the Internet relating to product updates, recalls, notices, etc; a Product Distributor (e.g. Wholesaler and/or Resaler) Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field(s) for storing information representative of URLs pointing to information on the Internet relating to miscellaneous aspects of the product (e.g., direct product sales on the WWW, product installation/set-up and operating manuals, company reports (10 Ks, annual reports, etc.), and the like. Each URL symbolically linked to a UPC-labeled product registered in the Registered IPI Database is categorized within one or more of these URL categories.

The list of URLs recordable in the IPI Registrant Database for each registered UPC-labeled product is virtually unlimited. Below are just a few examples of how the IPI Finding and Serving Subsystem hereof can be used as a virtual sales agent that provides value-added services to consumers, retailers and the like.

For each CD sound recording, the URL list may contain a URL that points to a promotional QuickTime® video recording or MP3-formatted sound recording published on the WWW for reviewing and evaluation by the consumer. The promotional song can be by a commissioned or endorsing artist, as is typically done in conventional advertising programs. The same can be done for video recordings on tape and digital video discs (DVDs). The URL may also provide the consumer with a down-loadable trial version of the product for a limited time period.

For each computer software product, the URL list may contain a URL that points to a multi-media clip on the WWW that provides a demonstration of the solutions that the software product provides, as well as the functions and development tools that it enables. It may also provide the consumer with a down-loadable version of the software product for a time-limited trial period.

For electronic consumer products, the URL list may contain a URL that points to a multi-media clip on the WWW that provides an audio-visual demonstration of the product in various user environments. Also, the URL list can contain a URL that points to a Web-based Specification Sheet that can be printed out in a retail environment, at home, work or on the road.

For groceries and like articles, the URL list may contain a URL that points to a multi-media clip on the WWW that provides a QuickTime® video recording or the like of the product, illustrating various cooking recipes and uses for the product. Also, the URL list can contain a URL that points to a Web-based Discount Coupon that can be printed out in the store, at home or work.

For toys, the URL list may contain a URL that points to a multi-media clip on the WWW that provides an audio-visual demonstration of the toy along with promotional endorsements by the various characters used in its advertising campaign.

For clothing, garments, or accessories (e.g. wearing apparel), the URL list may contain a URL that points to a multi-media clip on the WWW that provides a QuickTime® video recording or the like of the clothing, garments, and/or accessories being modeled by stunning fashion models. Ideally, such video recordings, linked to particular articles of wearing apparel by their UPC number, can be used to extend and augment the advertising campaign being carried out in other forms of media (e.g. television, radio, print, billboards, etc.).

Preferably, the manufacturer, its marketing personnel and advertising agents will actively participate in the creation of the product related information resources, as well as the placement of their URLs into the above-defined (or like) URL categories maintained within the Database of the IPI Finding and Serving Subsystem hereof. Also, using the Manufacturer/Product Registration Subsystem hereof, manufacturers and/or their agents can easily link their UPNs (e.g. UPC and/or EANs) with such URLs and manage the same in a dynamic manner to ensure that product related information on the Internet is accurately linked to the UPNs of the manufacturer's products. Through such active participation, the business objectives of any particular manufacturer or retailer can be promoted by way of the IPI Finding and Serving Subsystem of the present invention. In this way, the information-requesting consumer is provided with only the kinds of product-related information, which he or she seeks.

As shown in FIG. 4B, the Non-IPI Registrant Database maintained by each IPD Server comprises a plurality of labeled information fields for each product that is not currently registered with the IPD Server, namely: an IPSN (i.e. IPN) information Field for storing information (e.g. numeric or alphanumeric string) representative of the Universal Product Number (e.g. a UPC number from a UPC numbering system, or an EAN numbering system) assigned to the non-registered product; a Company Name Information Field for storing information (e.g. numeric or alphanumeric string) representative of the name of the company making, selling or distributing the corresponding non-registered product; a Trademark Information Field for storing information (e.g. text and/or alphanumeric strings) representative of each trademark used in connection the promotion, sale, distribution and/or use of the corresponding product, and preferably registered with the USPTO or other governmental agency; a Product Description Information Field for storing information (e.g. text strings) descriptive of the corresponding product; and an E-mail Address Information Field for storing information (e.g. numeric or alphanumeric string) representative of the e-mail address of the corresponding company (e.g. manufacturer) on the Internet; a Status Information Field for storing information (e.g. numeric or alphanumeric string) representative of whether the company associated non-registered product has been solicited by the IPD Server, and on what dates registration solicitation has occurred. Notably, each information item contained with the information field shown along the same horizontal line of FIG. 4A1 is related or linked. The information required to construct the Non-IPI Registrant Database shown in FIG. 4B can be readily obtained from a number of commercially or publicly available information sources (e.g., the Universal Code Council, Inc., Dayton, Ohio; QRS, Inc. of Richmond. Calif.; General Electric Information Services (GEIS) of Delaware, Md.; etc.).

Methods of Constructing UPN-Encoded Server-Side Applets and Distributing the HTML Tags Associated therewith to Remote Client Subsystems for Embedding within HTML-Encoded Documents to be Published Over the Internet in Connection with UPN-Labeled Consumer Products In general, for each system architecture shown in FIGS. 2B1 through 2B4, there will be a different Applet-driven method used to access consumer product related information (e.g. UPN/™/PD/URL links, trademark/URL links, etc.) from the RDBMS server 9 and display the search results within a Java-based GUI at the point of presence of the consumer using a Java-enabled client machine 13. In order to practice these different methods, in various e-commerce related applications which will be described in greater detail hereinafter, it will be helpful to construct server-side UPN-encoded CPIR-enabling Applets, distribute the HTML tags associated therewith to remote client subsystems, and thereafter embed these CPIR-enabling Applet tags within HTML-encoded documents for publishing over the Internet. Such CPIR-enabling Applet construction, distribution and embedding methods will now be described in detail hereinbelow.

Method of Accessing and Displaying Categorized UPN/™/PD/URL Link Menus from the UPN/™/PD/URL Database Management Subsystem the Present Invention After providing a brief overview on the system architecture of FIG. 2B1 and the nature of the server-side CPIR-enabling Applets deployed therewithin, The steps associated with Servlet-driven CPI-acquisition method of the first illustrative embodiment will be described in detail with reference to FIGS. 4E1, 4E2, 4F1 and 4F2.

In general, the method of FIGS. 4E1 and 4E2 involves using a server-side CPIR-enabling Applet to automatically conduct a UPN-directed search on the UPN/™/PD/URL RDBMS 9 hereof (i.e. RDBMS server 9) in response to a single mouse-clicking operation by the consumer on the HTML tag associated with the server-side Applet. In the illustrative embodiment, the CPIR-enabling servlet of the present invention is a program written in the Java™ programming language and has an HTML tag (indicated by <SERVLET>) which is designed to be included in an HTML page, much in the same way an image can be included therewithin (according to the HTML 3.2 Specification).

CPIR-enabling servlets of the present invention are designed to work within a request/response processing model, as shown in FIG. 2B1. In this request/response model, a client subsystem 13 sends a request message to the Java Web Server 11' and the Server 11' responds by sending back a reply message. In the illustrative embodiment, requests come in the form of http, although is understood that the use of other protocols such as ftp, EDI or a custom protocol, may be possible in particular embodiments. The request and the corresponding response reflect the state of the client and the server at the time of the request.

When using a Java-enabled browser to view a Web page containing a server-side CPIR-enabling Applet tag <SERVLET>, the servlet's compiled class code is automatically accessed from the Java Web Server 11' and executed on the server-side of the network connection illustrated in FIG. 2B1. Thus, as shown in FIG. 2B1, the Java Web Server 11' must provide a Java Virtual Machine (JVM) for running/executing Java servlets on the server-side of the network in much the same way that a client browser must provide a JVM for running Java Applets on the client side thereof. Additionally, the Java Web browser 11' must also support the Java Servlet API, developed by JavaSoft, and define how and when the servlet communicates with the Java Web Server. Essentially, the Servlet API is a well-defined set of function calls (i.e. set of Java classes) to get information to and from the Java Web Server. The servlet needs to be able to access server-defined variables, issue redirects, send error messages and the like. Sun's Java Web Server supports the Servlet API and, of course, includes their JVM.

As shown in FIG. 2B1, the Java Web Server 11' includes a number of software components including the Java Servlet API which comprises several Java interfaces and fully defines the link between the hosting server (e.g. Java Web Server) and the servlets located at the middle tier. The Servlet API is defined as an extension to the standard JDK. This means that there is an explicit definition of servlet interfaces, but it is not part of the Java Development Kit (JDK) 1.1 or the Java 2 platform. Instead, the servlet classes are delivered with the Java Servlet Development Kit (JSDK) version 2.0 from Sun (http://java.sun.com/products/servlet/). This JSDK version is intended for use with both JDK 1.1 and the Java 2 platform. There are a few significant differences between JSDK 2.0 and JSDK 1.0.

JDK extensions are packaged under javax—the root of the Java extension library tree. The Java Servlet API contains the following packages: Package javax.servlet; and Package javax.servlet.http dedicated to supporting HTTP protocol and HTML generation. The Servlet API provides a tight link between a server and servlets, allowing servlets to add new protocol support to a server. Essentially, any protocol (e.g. SMTP, POP, FTP, etc.) that follows a request/response computing model can be implemented by a servlet.

General servlet support is provided by the package "javax.servlet" which comprises the following components:

(1) Servlet: An interface that defines communication between a web server and a servlet. This interface defines the init( ), service( ), and destroy( ) methods (and a few others).

(2) ServletConfig: An interface that describes the configuration parameters for a servlet. This is passed to the servlet when the web server calls its init( ) method. Note that the servlet should save the reference to the ServletConfig object, and define a getServletConfig( ) method to return it when asked. This interface defines how to get the initialization parameters and the context under which the servlet is running.

(3) ServletContext: An interface that describes how a servlet can get information about the server in which it is running. It can be retrieved via the getServletContext( ) method of the ServletConfig object.

(4) ServletRequest: An interface that describes how to get information about a client request.

(5) ServletResponse: An interface that describes how to pass information back to the client.

(6) GenericServlet: A base servlet implementation. It takes care of saving the ServletConfig object reference, and provides several methods that delegate their functionality to the ServletConfig object. It also provides a dummy implementation for init( ) and destroy( ).

(7) ServletInputStream: A subclass of InputStream used for reading the data part of a client's request. It adds a readLine( ) method for convenience.

(8) ServletOutputStream: An OutputStream to which responses for the client are written.

(9) ServletException: Should be thrown when a servlet problem is encountered.

(10) UnavailableException: Should be thrown when the servlet is unavailable for some reason.

Support for HTTP Servlets is provided by the package "javax.servlet.http" which comprises the following components:

(1) HttpServletRequest: A subclass of ServletRequest that defines several methods that parse HTTP request headers.

(2) HttpServletResponse: A subclass of ServletResponse that provides access and interpretation of HTTP status codes and header information.

(3) HttpServlet: A subclass of GenericServlet that provides automatic separation of HTTP request by method type. For example, an HTTP GET request will be processed by the service( ) method and passed to a doGet( ) method.

(4) HttpUtils: A class that provides assistance for parsing HTTP GET and POST requests.

The central abstraction in the Java Servlet API is the Servlet interface. All servlets implement this interface, either directly or more commonly by extending a class that implements it (e.g. such as the HttpServlet class). The Servlet interface declares but does not implement methods that manage the servlet and its communication with clients. The servlet writer will provide some or all of these methods when developing a CPIR-enabling servlet.

Having provided an overview on server-side CPIR-enabling Java Applets (i.e. Servlets) of the present invention and the support framework required thereby in a distributed-computing object oriented programming environment shown in FIG. 2B1, it is appropriate to now describe the method of creating, loading, distributing, embedding and executing server-side CPIR-enabling Java Applets in accordance with the principles of the present invention schematically illustrated in FIGS. 4E1, 4E2, 4F1 and 4F2.

As indicated at Block A1 in FIG. 4E1, the first step of the method involves using the Java Servlet API to write or otherwise author the source code for a server-side CPIR-enabling Java Applet, for each UPN-specified consumer product registered in the UPN/™/PD/URL Database Management Subsystem 9. In general, the source code for each server-side CPIR-enabling Java Applet (i.e. servlet) will embody one or more of following items of information, namely: (i) the UPN of the particular product on which the CPI search is to be carried out and the search results thereof displayed; (ii) Java classes required for performing a UPN-directed search on the RDBMS Server 9 using one or more Java methods running natively on the Java Web Server 11', and producing a particular Java GUI for displaying the results obtained from the UPN-directed search; and (iii) license-related information specifying the terms and conditions of the CPIR-enabling Servlet license and the conditions under which the CPIR-enabling servlet shall operate.

Notably, such license-related information may specify: (1) one or more specific host domains from which a Web document containing the corresponding servlet tag may launch the CPIR-enabling servlet under a licensing program; (2) one or more general Internet domains (e.g. .com, .org., .gov, .int, .mil, .uk, etc.) from which a Web document containing the corresponding servlet tag may launch the CPIR-enabling servlet under a licensing program; (3) the time duration of the licensing period associated with the CPIR-enabling servlet; and (4) any other restrictions set by the associated manufacturer and/or retailer, and/or administrator of the consumer product information system hereof, that must be observed for a registered CPIR-enabled servlet to operate within a Web-document served from the registered Internet domain.

Notably, the Java source code for each CPIR-enabling Servlet will vary depending upon implementation. However, regardless of the particular implementation, it can be expected that each JDBC-supporting CPIR-enabling servlet when, for example, designed to search an (Oracle JDBC-supported) UPN/™/PD/URL Database Server 11A for the UPC/URL list currently symbolically linked to a specified UPN and display the search results on the requesting client machine 13, will typically include Java source code specifying:

(1) the importable JDBC classes required by the CPIR-enabling Servlet;

(2) the importable Java classes to be used in the CPIR-enabling Servlet;

(3) the JDBC driver to be loaded for the Oracle-based UPN/™/PD/URL Database;

(4) the connection strings to the UPN/™/PD/URL Database;

(5) the CPI query to be executed on the UPN/™/PD/URL Database, dependent on the UPN of the associated consumer product and possibly other search criteria and Servlet licensing conditions;

(6) the servlet tag, its graphical icon or alias to trigger execution the Servlet and its associated CPI query;

(7) the CPI Search Result GUI to be displayed on the requesting client machine and its relative location to the associated Servlet tag; and (8) the operations that will be carried out upon execution of the CPI query including Boolean search logic to be carried out upon initiation of the UPN-directed CPI search;

if a new connection is required between Java Web Server and the UPN/™/PD/URL Database;

Loading the JDBC driver;

Connecting to the UPN/™/PD/URL Database;

Creating a SQL statement based on the specified Boolean search logic and UPN;

Executing the SQL query statement; and

Dumping the search results to the CPI Search Result GUI.

In the embodiment depicted in FIG. 2B1, a UPN-encoded Servlet is used to replace a Common Gateway Interface (CGI) script and provide a way of searching the UPN/™/PD/URL Database on RDBMS Server 11', with the advantage of increased speed and stability. In this instance, CPIR-enabling Servlets are accessed by the user as an HTML tag <SERVLET> embedded in an HTML document served to the client subsystem 13. For example, when the consumer selects the servlet tag (graphically encoded by an icon or image) in an HTML-encoded document, the linked servlet residing on the server-side of the network, is automatically executed, causing a UPN-directed search to be carried out on the RDBMS server 9.

After writing/authoring the source code for the Applet, the CPIR-enabling Java servlet is ascribed a unique name such as, for example, "UPNXXXXXXYYYYYZ" for a 12 digit Uniform Product Code.

Reference can be made to the following technical publication for additional details on writing Java servlets, designing Java GUIs and the like: "Java Servlets and Serialization With RMI" (1999) by Scott McPherson, published by Sun Microsystems, Inc., of Palo Alto, Calif.; "The Java™ Tutorial Second Edition: Object Oriented Programming For The Internet" (1999), by Mary Campione and Kathy Walrath, published by Sun Microsystems, Inc., of Palo Alto, Calif.; and "The JFC Swing Tutorial: A Java Guide To Constructing JAVA GUIs" (1999), by Mary Campione and Kathy Walrath, published by Sun Microsystems, Inc., of Palo Alto, Calif.; "JAVA" (1997) by Ed Tittel and Bill Brogden, published by IDG Books Worldwide, Inc.; "Wilde's WWW: Technical Foundations of the World Wide Web" (1999) by Erik Wilde, published by Springer-Verlag, Berlin, Heidelberg each said publication being incorporated herein by reference.

As indicated at Block A2 in FIG. 4E1, the source code for the authored servlet is compiled into Java bytecode, and java bytecode for the servlet classfiles are placed in the server_ root/servlets directory on the Java Web Server 11'. When compiling, the javax.servlet.* package should be placed in the classpath. The easiest way to do this is to include server_ root/lib/classes.zip in the classpath, but it is understood that one must look to the compiler's documentation for specific details in this regard.

As indicated at Block B1 in FIG. 4E1, the second step of the method involves using the Java Server Administration Applet to configure the Java Web Server so as to extend the functionalities thereof and embody (or install) the CPIR-enabling Java servlet within the Java Web Server 11'. This process of extending the functionalities of the Java Web Server 11' involves specifying the default parameters and arguments thereof. This configuration step is carried out when using the Servlet Loading facility of the Administration Applet in order. The loading process is achieved by clicking on the Servlets Button, and then selecting Add from the list of choices on the left GUI of the Servlet Loading Facility. Thereafter, to add a new servlet, the following procedure is performed: Enter in the Servlet Name field, the unique name for the CPIR-enabling Java servlet one is loading onto the Java Web Server (e.g. "UPNXXXXXXYYYYYZ"); Enter in the Servlet Class field, a valid class name for the Java class of the CPIR-enabling servlet, i.e., the full package name, e.g. "sun.server.http.FileServlet"; and thereafter Click on the Add button.

As indicated at Block B2 in FIG. 4E1, the fourth step of the method involves invoking the CPIR-enabling Java servlet by creating a URL having the path section "/servlet/" prepended to the assigned Servlet Name, so that the URL can be thereafter embodied within the servlet HTML tag <SERVLET>, prior to its insertion within the HTML code of a Web document. To invoke a servlet, the webmaster/administrator calls the servlet by creating a URL with "/servlet/" prepended to the servlet name. One can confirm that the servlet is correctly invoked by entering this URL into ones Web browser and analyzing the output of the created servlet.

As indicated at Block B3 in FIG. 4E1, the fifth step of the method involves (1) embodying the unique URL, created for each consumer product, within a CPIR-enabling servlet HTML tag <SERVLET>, (2) containing each such servlet HTML tag within an executable file, and (3) storing each such servlet tag containing file in the Central CPIR-Enabling Applet Library on the RDBMS Server 9.

As indicated at Block C in FIG. 4E2, the sixth step of the method involves distributing the CPIR-enabling servlet HTML tags (within the Central CPIR-enabling Applet Library) to retailers, wholesalers, advertisers, and others who desire to deliver UPN-directed CPI search results to their customers, clients and the like. This distribution process can be carried out by downloading servlet tag containing files to a remote computer system connected to the Internet using, for example, ftp or other electronic data or document interchange protocols (e.g. XML/ICE) to carry out the servlet tag transport process. These downloaded CPIR-enabling servlet tags can then be stored in a local CPIR-Enabling Applet/Servlet Library maintained on a client computer 13, as shown in FIG. 4F2, until it is time to embed the same into a particular HTML-encoded document.

As indicated at Block D in FIG. 4E2, the seventh step of the method involves enabling retailers, wholesalers, advertisers, and others to (1) open the downloaded servlet tag containing files, (2) extract the CPIR-enabling servlet tags contained therewithin, and (3) embed (i.e. insert) one or more distributed CPIR-enabled servlets HTML tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may, understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling servlet tag <SERVLET> using, for example, simple commands or drag-and-drop procedures.

As indicated at Block E in FIG. 4E2, the eighth step of the method involves serving "servlet-tag" encoded HTML documents from Internet information servers to Java-enabled client computer subsystems 13 operated by consumers at home, in the office, in EC-enabled or "brick and mortar" retail stores, or on the road, as the case may be. As shown in FIG. 4F, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4E2, the ninth step of the method hereof involves using a Java-enabled client computer subsystems 13 to display served HTML-encoded documents having one or more of CPIR-enabling servlet tags embedded therewithin. This step is carried out by the consumer pointing his or her Java-enabled browser program (e.g. Netscape Navigator, Microsoft Explorer, or Sun Microsystems' HotJava program) to an HTML-encoded document within which a CPIR-enabling Java servlet tag is embedded, at a particular point of presence on the WWW. CPIR-enabling Applets can be graphically-encoded in an variety of different ways to provide the consumer with a visual indication that, clicking on the graphical object however manifested, will automatically result in a consumer product information search on a particular product identified by the UPN encoded within the associated servlet. In view of the fact the CPIR-enabling servlet tags are distributed over the Internet and inserted within HTML documents by others than the servlet author, at some future date, graphical encoding of CPIR-enabling servlets will typically occur at the time of writing the servlet.

With the above point in mind, it will be helpful to adopt a standardized icon for graphically indicating the presence of a CPIR-enabling servlet tag within an HTML document. For example, small predefined images of service marks such as "GO: BRANDKEY REQUEST™ URL Search" can be served to inform the consumer that the Java object, if selected from the displayed Web page, will automatically cause a product-specific URL search to be performed with respect to the particular consumer product and the results thereof displayed at the "point of presence" of the consumer who may be residing at a particular point in an EC-enabled store (e.g. at the check-out display screen or POS), at on-line auction site, at a Web-based product advertisement, or anywhere else on the WWW. Notably, an important advantage provided by this information search technique of the present invention is that it does not disturb the consumer at his or her point of presence (or sale), wherever that may be. Instead, the method enables the delivery of accurate product-specific manufacturer-defined information at precise points in Cyberspace by performing a single mouse-clicking operation. This enables consumers to make informed decisions thereat based on the information displayed in the corresponding Java GUI generated upon launching a CPIR-enabling servlet at the consumer's point of presence on the WWW.

It is understood, however, that other techniques may be used to create a visual indication to the consumer that a CPIR-enabling Applet is located at a particular point on the WWW and that if this Applet is executed (e.g. by a single mouse-clicking operation), then a UPN-directed consumer product information search will be automatically executed and the results therefrom will be displayed within a Java GUI at the consumer's point of presence.

One alternative technique would be to embed within the CPIR-enabling Applet, a thumbnail or large size photo-image of the consumer product being offered for sale, lease, auction, or other purpose on the WWW. Notably, this product image any reside on the RDBMS server 9, or on the http server from which the HTML-encoded document is served. Using this technique, the consumer need only click on the image to initiate an UPN-directed consumer product information search against the UPN/™/PD/URL RDBMS 9 hereof.

Notably, the person or persons responsible for delivering product advertisements to particular locations on one or more WWW sites can use the OPEN ADSTREAM™ (OAS) 5.0 Internet Advertisement Management Solution software from Real Media, Inc., of New York, N.Y., and any other suitable software solution, running on the Internet (http) information server (12, 12', 12A or 12B), and managed using an Web-enabled client subsystem 13, as shown in FIG. 4F1. Using the OAS 5.0 advertisement management solution, and the CPI search and display method of present invention described above, a webmaster or advertising manager assigned to a particular Internet information server (12, 12', 12A or 12B) can: (1) access the Web-based product advertisement for a particular product (i.e. HTML code, image files, and any other rich media content associated therewith); (2) access previously downloaded CPIR-enabling Java servlet(s) for the consumer product, stored in a locally-maintained "Library (i.e. Catalog) of CPIR-Enabling Applets" on a client machine or server on the network, or directly access CPIR-enabling Java servlets from the centrally-maintained "Library (i.e. Catalog) of CPIR-Enabling Applets" illustrated in FIG. 4F1, via the Java Web Server 11'; and (3) use Real Media's OAS 5.0 solution software deliver both the Web-based product advertisement (i.e. its HTML code and other media-rich content) and the corresponding CPIR-enabling Applet tag (and possibly any image files associated therewith) to a designated section on a particular Web page of a specific WWW-site.

It is understood that there are different ways of inserting/embedding both of these objects within a particular section of an HTML-encoded document using the highly advanced HTML-editing functionalities of the OAS 5.0 software system. For example, the Web-based product advertisement can be inserted within a first spatially defined portion of the target HTML document (occupying the largest portion of the purchased Internet advertising space), while the CPIR-enabling server-side Applet (i.e. servlet) is inserted within a second spatially-defined portion of the target HTML document occupying the balance of the purchased Internet advertising space. Alternatively, both the CPIR-enabling Applet and the Web-based product advertisement can be inserted within substantially same spatially defined portion of the target HTML document so as to achieve spatial overlap therebetween. This way when the consumer clicks on the advertisement image, or some preselected portion thereof, the underlying CPIR-enabling servlet will be automatically executed and the corresponding Java GUI generated for displaying the results of the UPN-directed database search.

In situations where the Internet product advertisement (e.g. banner advertisement) embodies a servlet HTML tag which, when executed, produces a new Java GUI (i.e. new browser interface), then a CPIR-enabling servlet can be embedded within the HTML-encoded document displayed in the new Java GUI. This servlet tag embedding technique will be useful in many applications where the display space allocated for the Web advertisement in the target HTML-encoded document is limited, and there is a need to generate a new Java GUI for presenting the content of the advertisement.

Other ways of embedding the Web-based advertisement and the related CPIR-enabling servlet tags will become apparent hereinafter to those skilled in the art having had the benefit of reading the present disclosure.

As indicated at Block G in FIG. 4E2, the tenth step in the method involves the consumer recognizing that a CPIR-enabling servlet tag is embedded within a Web-document displayed on a Java-enabled client computer subsystem, and thereafter launching/executing the associated servlet to initiate a UPN-directed consumer product information search within the RDBMS server 9.

Notably, the above illustrative embodiment has been described with particular focus given to CPIR-enabling servlets encoded with the UPN of a particular consumer product. It is understood, however, that the CPIR-enabling servlets of the present invention can be encoded with the trademark(s) used in connection with a particular consumer product, thus providing Trademark-encoded CPIR-enabling servlets, in contrast with UPN-encoded CPIR-enabling servlets. In such alternative embodiments, the encoded trademark would be used to direct a search through the RDBMS server 9, and display the results thereof in a new (independent) Java GUI generated at the point of servlet tag embodiment. Alternatively, a product descriptor associated with a particular product can be encoded within the corresponding CPIR-enabling servlet, used to direct a search through the RDBMS server 9, and display the results thereof in an independent Java GUI generated at the point of servlet tag embodiment.

Figure 2C:
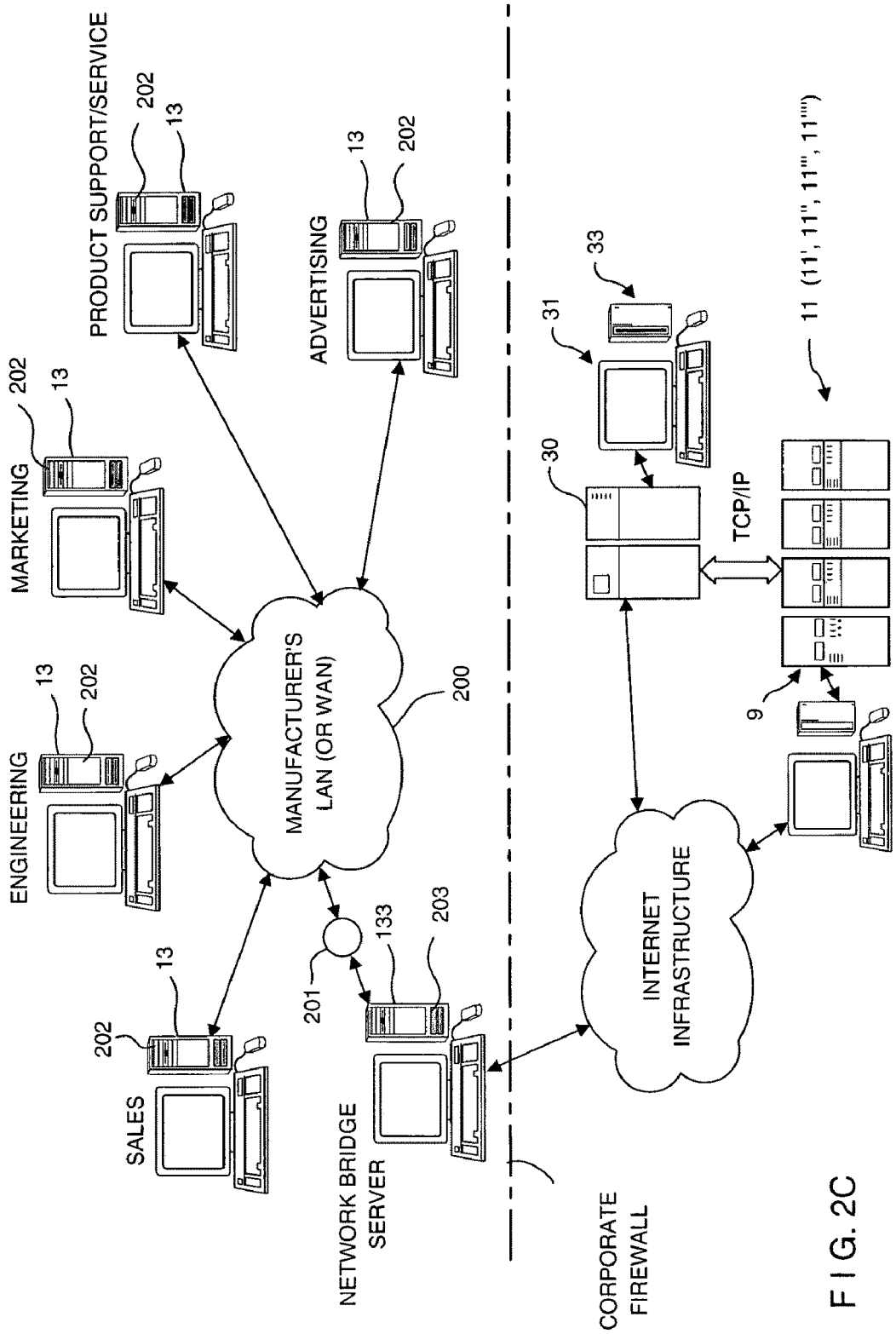
FIG. 2C is a schematic representation of a portion of the system shown in FIGS. 2-1 and 2-2, wherein a plurality of manufacturer-operated client subsystems are shown connected to a local or wide area IP-based network, preferably maintained behind a secure corporate firewall, and the secured manufacturer information network is connected to the infrastructure of the Internet by way of an Internet router and server, for the purpose of enabling different departments within a business organization (e.g. marketing, sales, engineering, support and service, advertising, finance, etc.) manage different types of multi-media consumer product related information, as well as the Universal-Product-Number/trademark/product-descriptor/Universal-Resource-Locator (UPN/™/PD/URL) links based on the type of information contained within UPN-indexed information resources on the WWW.

Method of Collecting, Managing And Transmitting UPN/™/PD/URL Menus For Consumer Products In FIG. 2C, there is disclosed a novel distributed method of collecting, managing and transmitting UPN/™/PD/URL menus for consumer products. Notably, this distributed system and method will be useful in large corporate environments, where departmentalization is the general rule. As shown, instead of each manufacturer having a single EDI-enabled workstation (equipped with EDI or EDI/XML software) 13 for carrying out UPN/™/PD™ URL management operations, a group of EDI-enabled client computers 13 are connected to a local or wide area network 200 via a network-centric Web (http) server 133 using a network router 201 to interface with the infrastructure of the Internet, as well as the other local or wide area network 200 as shown in FIG. 2C. Preferably, each client computer 13 on the LAN or WAN is equipped with UPN/™/PD/URL management software for managing the consumer product information collected in the UPN/™/PD/URL RDBMS 9 for a particular manufacturer, as shown in FIGS. 4A1 through 4B.

In one arrangement, each manufacturer-operated client machine 13 would be assigned the task of managing the UPN/™/PD/URLs associated with a particular department of the manufacturer (e.g. engineering department, sales department, service/support department, marketing department, advertising department, etc.). The UPN/™/PD/URLs menus and other CPI related information collected by each department is maintained within a local UPN/™/PD/URL RDBMS 202 on the department's client machine 13, and is periodically transmitted to a Manufacturer's UPN/™/PD/URL RDBMS 203 hosted on the network Internet server 133 In addition to providing the client machine behind the corporate firewall with http, e-mail and ftp services, the network Internet server 133 is also equipped with an EDI (e.g. EDI or XML/ICE) software solution which enables periodic uploading of the manufacturer's UPN/™/PD/URL RDBMS 203 to the Central UPN/™/PD/URL RDBMS 9, shown in FIG. 2C.

Another arrangement, each manufacturer-operated client machine 13 would be assigned the task of managing the UPN/™/PD/URLs associated with a particular department of the manufacturer (e.g. engineering department, sales department, service/support department, marketing department, advertising department, etc.). The UPN/™/PD/URLs menus and other CPI related information collected by each department is maintained within a local UPN/™/PD/URL RDBMS 202 on the department's client machine 13, and is periodically transmitted directly to the Central UPN/™/PD/URL RDBMS 9, shown in FIG. 2C. In such an alternative embodiment of the present invention, the network Internet server 133 would provide each client machine behind the corporate firewall with http, e-mail and ftp services in a conventional manner, but not maintains a central manufacturer's UPN/™/PD/URL database 202.

The primary advantage of the above described techniques for distributed UPN/™/PD/URL management hereof is that such techniques provide manufacturers with a revolutionary way of and means for enlisting the different departments within the organization, having different business perspectives, goal and resources, to create "up-to-date" links between UPN's on their consumer products and the diverse types of consumer related information resources published on the Internet, all in concerted effort to achieve the sales, marketing and support programs of the company in a unified manner. Using the system and method of the present invention, symbolic links between the manufacturer' products and published information resources on the Internet (e.g. WWW) can be impressed upon the minds of consumers as they seek access to such current information at home, in the office, in physical and electronic stores, as well as on the road.

Preferably, each manufacturer-operated client machine 13 on the LAN (or WAN) of FIG. 2C will be equipped with OS program software, Web-browser program software and RDBMS program software configured so that an UPN/™/PD/URL manager (e.g. assigned to a particular department within the company) can easily link (i) URLs associated with consumer product related information on the WWW, to (ii) the UPN of a particular product registered with the IPI finding subsystem 2 of the present invention. As shown in FIG. 2C1, this can be achieved by providing a UPN/™/PD/URL data linking function between a GUI-based window associated with a Web-document editing/browser application (e.g. Microsoft Explorer browser program) and a GUI-based window associated with a UPN/™/PD/URL data link management program (e.g., Microsoft Access or SQL RDBMS program), running either on each manufacturer-operated client machine, or on a manufacturer-operated server connected to the manufacturer's LAN or WAN, whereto Internet connectivity is enabled in a manner known in the art. As will be described below, this UPN/™/PD/URL data linking function can be realized in a number of different ways.

One way of realizing this UPN/™/PD/URL linking function is to create and install a plug-in module within the Web browser program with which consumer product information can be viewed on the WWW. The function of the plug-in module would be to write the URL of the currently viewed Web document (viewed by the browser program) into the currently selected URL field within the UPN/™/PD/URL data link management program. Using this method, the UPN/™/PD/URL manager would perform the following procedure: first open the UPN/™/PD/URL data link management program; select the URL field to be filled (i.e. written into); open the browser program; browse onto a Web document containing consumer product information related to the selected UPN information field; and then select the UPN/™/PD/URL link button on the browser's control panel enabled by virtue of the plug-in module of the present invention.

Another way of realizing this UPN/™/PD/URL linking function is to use a multi-tasking/multi-threading operation system (OS), such as UNIX or some version thereof, into which support has been designed to simultaneously run the Web browser program and the UPN/™/PD/URL data link management program, as shown in FIG. 2C1. Using this method, the UPN/™/PD/URL data linking program would include URL importing functionalities of the plug-in module designed above so that when a desired Web document is being browsed by the Web browser program, the URL of the currently displayed Web document will be automatically written into the currently selected URL information field in the UPN/™/PD/URL data link management program upon selecting, for example, a "URL Import" button provided for on the GUI of the UPN/™/PD/URL data link management program.

Another way of realizing this UPN/™/PD/URL linking function is to provide the enterprise of each manufacturer with a consumer product information catalog subsystem (RDBMS) 450 (shown in FIG. 2C) for storing and managing media-rich consumer product information content relating to each and every UPN-indexed product that the manufacturer makes, sells and/or distributes to retailers along the retail supply and demand chain. As shown in FIG. 2C, such a consumer product information management database subsystem 450 can be realized as a standalone database application supported on one or more client machines operably connected to the LAN or WAN of the manufacturer's enterprise, and or as a network database information server connected to the LAN or WAN and being accessible to various consumer product information managers working within the manufacturer's enterprise, and using Web-enabled client machines (e.g. 13, 202) to carry out consumer product information content management operations across the enterprise, most likely under the supervision of one or more consumer product brand-managers, responsible for branding of such consumer products. The consumer product information management database subsystem 450 can be constructed using commercially-available catalog software such as, for example, Lexmedia Catalog Pro™ (Regular, Sales Force or Distributor Edition) catalog software, Lexmedia Catalog Pro Express™ catalog software, and/or Lexmedia Catalog Showcase™ catalog software, from Lexmedia Corporation, of Fairfield, Conn., (http://www/lexmedia.com/catalog-software.asp), suitably modified using database structures and data linking techniques of the present invention disclosed herein, and database programming techniques and electronic data interchange (EDI) or communication techniques well known in database construction and data communication arts. The consumer product information management database subsystem (RDBMS) 450 will permit storage of all major information file formats including multimedia files such as MPEG, AVI, MP3, JPEG, GIF, Web Pages (HTML), CAD Drawings, PDF files, and the like.

Also, in accordance with the principles of the present invention, the consumer product information management subsystem 450 will also include one or more computer programs (e.g. scripts) for (i) analyzing the information fields of the RDBMS 450, (ii) automatically generate a set of UPN/™/PD/URL data links for each UPN-indexed product with the RDBMS, (iii) locally store each such set of UPN/™/PD/URL/Trademark/Product-Descriptor data links within the RDBMS 450, and (iv) ultimately electronic data transport each such set of data links to the UPN/™/PD/URL Database Management Subsystem 9, shown in FIG. 2A1, during periodic database updating operations, described in greater detail hereinafter.

Notably, the structure of the consumer product information management database 450 of the present invention can be similar to the database structure shown in FIGS. 4A1 through 4D, with the exception that the actual (multi-media) files of the consumer product information related to each UPN of the manufacturer will be stored within the RDBMS 450, rather than just the URLs of such information files stored on the Internet, as described in the other illustrative embodiments of the present invention disclosed herein in greater technical detail.

One advantage of using the consumer product information management subsystem (RDBMS) 450 described above is that the brand managers are provided with useful tools for managing various types of consumer product information published by the manufacturer, its agents (e.g. advertising agents) or other third parties publishing consumer product related information on the Internet. Another advantage is that, by using such consumer product information tools within the manufacturer's enterprise, the manufacturer (i.e. brand manager) is given the choice of either storing the URLs of consumer product related information, and also the actual information file content thereof if such multi-media information content is within the control of the manufacturer's operations, or copyable into the RDBMS 450 under its supervision control.

In view of the present disclosure described above, many modifications to the consumer product information management (and data-link generation) subsystem 450 of the present invention will occur to those with ordinary skill in the art.

While several methods have been described above for realizing the UPN/™/PD/URL data linking functionalities provided for on manufacturer-operated clients (and servers) of the present invention, it is understood that there will be alternative ways of realizing such functionalities within the scope and spirit of the present invention.

As shown in FIG. 2C2, it is possible to realize the Manufacturer's EDI-enabled UPN/™/PD/URL Database 203 shown in FIG. 2C1 as an integral part of a conventional manufacturer's EDI-enabled UPC-indexed Product Sales Catalog (e.g. UPC+5.0 management software by Barcode World, Inc. or UPC Manager software by Intercoastal Data Corporation) 460 deployed within a manufacturer's enterprise. The purpose of the EDI-enabled UPC-indexed Product Sales Catalog software 460, typically run on an internet-worked computing platform, is to support conventional UPC management functions required by EDI-enabled business-to-business (B2B) processes carried out between the manufacturer and its various retail trading partners through a conventional EDI-enabled B-2-B trading network (e.g. the QRS Network by QRS, Inc., or the GEIS Network by General Electric Information Services, Inc.). In most larger manufacturer enterprises, the personnel assigned the responsibility of carrying out UPN/™/PD/URL data linking operations in accordance with the present invention will most likely not be the same the personnel assigned the responsibility of maintaining conventional EDI-enabled UPC-index product sales catalogs (e.g. UPC+5.0 management software by Barcode World, Inc. or UPC Manager software by Intercoastal Data Corporation). Rather, UPN/™/PD/URL data linking operations will most likely be carried out under the supervision of the manufacturer's brand, product and/or agency promotion managers, and not conventional UPC managers responsible for managing the manufacturer's EDI-enabled UPC-indexed Product Sales Catalog 460 using, for example, UPC+5.0 management software by Barcode World, Inc. or UPC Manager software by Intercoastal Data Corporation, which is designed specifically for carrying out very limited functions. Also, graphical user interface (GUI) design requirements for conventional UPC product catalog management operations are also markedly different from the GUI requirements for the novel UPN/™/PD/URL management operations associated with the present invention. Furthermore, the conventional forces of established concerns in the field of UPC management may initially provide opposition to the practice of the UPN/™/PD/URL data link management operations taught herein, for various reasons.

In order to accommodate such concerns described above, an alternative subnetwork arrangement is disclosed in FIG. 2C2, wherein the manufacturer's EDI-enabled UPN/™/PD/URL RDBMS of the present invention 203 and/or the consumer product information catalog database management subsystem of the present invention 450 are shown configured between (i) a plurality of Web-enabled client machines 13 operated within the manufacturer's enterprise by various departments as shown in FIG. 2C, and (ii) a conventional manufacturer's EDI-enabled UPC-indexed Product Sales Catalog (e.g. UPC+5.0 management software by Barcode World, Inc. or UPC Manager software by Intercoastal Data Corporation) 460 running on a (possibly remotely-situated) computing platform deployed within a manufacturer's enterprise. The function of the manufacturer's EDI-enabled UPC-indexed Product Sales Catalog 460, as discussed above, is to enable (1) the local maintenance of the manufacturer's UPC-indexed Product catalog (containing product descriptors, price terms, shipping terms, trading conditions, etc.) and (2) uploading the catalog to one or more centralized UPC Product Sales Catalogs (e.g. the Keystone™ UPC Product Sales Catalog by QRS, Inc. and/or the UPC Express™ UPC Product Sales Catalog by GEIS) using, for example, EDI techniques employing the 832 Transaction Set (i.e. Price Sales Catalog) over VAN or TCP/IP networks interconnected with conventional EDI-enabled B-2-B trading networks (e.g. the QRS Network by QRS, Inc., or the GEIS Network by General Electric Information Services, Inc.), well known in the art. In accordance with convention, such centralized UPC Product Sales Catalogs enable retail-trading parties (e.g. retail purchasing agents) to shop from such product sales catalogs and purchase such products at wholesale prices by way EDI-enabled business-to-business (B2B) transaction sets.

In this novel subnetwork arrangement within the manufacturer's enterprise, shown in FIG. 2C2, the manufacturer's EDI-enabled UPN/™/PD/URL RDBMS 203 and/or the consumer product information catalog database management subsystem 450 are initialized by importing UPC numbers, trademarks and product-descriptors from the manufacturer's locally-maintained UPC-indexed product sales catalog 460 deployed within the manufacturer's enterprise. According to the aspect of the present invention shown in FIG. 2C2, the conventional UPC-indexed product sales catalog 460 would function as the "master" UPC catalog source within the manufacturer's enterprise, while the manufacturer's EDI-enabled UPN/™/PD/URL RDBMS 203 and the consumer product information catalog database management subsystem 450 would function as "slave" UPC catalog sources within the enterprise, data-synchronized to the master UPC catalog source 460.

In accordance with this method of the present invention, the manufacturer's EDI-enabled UPN/™/PD/URL RDBMS 203 (as well as the consumer product information catalog database management subsystem 450) are programmed to automatically (i) access the conventional UPC-indexed product sales catalog 460 on periodic (e.g. daily) basis and (ii) import up-to-date (i.e. current) UPC numbers, trademarks and product-descriptors that are being used by the manufacturer within its UPC product sales catalog 460 for enabling B-2-B e-commerce transactions with its retail trading partners. Such data-synchronization operations can be carried in a fully automatic programmed manner over the Internet or particular VAN, regardless of where the manufacturer's EDI-enabled UPN/™/PD/URL 203 and UPC-indexed product sales catalog 460 resides on the network. Using these imported UPC numbers, trademarks and product-descriptors, through the above-described database-initialization and data-synchronization techniques of the present invention, the manufacturer's brand managers, product managers, advertising agents and support personnel can manage UPN/™/PD/URL data links within the manufacturer's EDI-enabled UPN/™/PD/URL RDBMS 203 and transport the same to the central UPN/™/PD/URL RDBMS 9 shown in FIG. 2C, in cooperation with pre-existing EDI-based B-2-B e-commerce support operations. Alternatively, using a less preferred method, manufacturer's brand managers, product managers, advertising agents and support personnel can manage UPN/trademark-indexed CPI data files within the manufacturer's consumer product information catalog database management subsystem 450 and transport the same to central UPN-indexed Data warehouse 470 shown in FIG. 2C, in accordance the principles of the present invention.

By virtue of the above-described database-initialization and synchronization techniques illustrated in FIG. 2C2, the business-to-consumer (B-2-C) consumer product information management and distribution system of the present invention can be used in cooperation with conventional EDI-enabled B-2-B e-commerce transaction networks supported by conventional UPC Product Sales Price Catalogs (e.g. the Keystone™ UPC Product Sales Catalog by QRS, Inc. and the UPC Express™ UPC Product Sales Catalog by GEIS), enabling brand managers, product managers, advertising agents and support personnel to practice the novel UPN/™/PD/URL management techniques of the present invention without disrupting or compromising conventional UPC management operations traditionally performed by others within the manufacturer's enterprise in connection with enabling EDI-based B-2-B e-commerce transactions.

CPIR-Enabling Applet Tag Download/Distribution Mode of System Operation

As illustrated in FIGS. 2A1, 2A2, 4F1 and 4F2, a centralized Library of CPIR-enabling Applet/Servlet Tags is created, managed and stored within the UPN/™/PD/URL RDBMS 9 hereof in accordance with the above-described methods. In accordance with the principles of the present invention, these CPIR-enabling Applet/Servlet tags can be widely distributed to retailers, manufacturers, advertisers and others about the globe and thereafter widely embedded within HTML-encoded documents, as taught in detail hereinabove, to practice this aspect of the present invention in a commercially successful manner. The function of the CPIR-enabling Applet Tag Download/Distribution mode of operation of the system is to enable the global distribution of this centralized Library of CPIR-enabling Applet/Servlet Tags, in accordance with the licensing program associated with each such CPIR-enabling Applet/Servlet.

The CPIR-enabling Applet Download/Distribution mode is automatically initiated by the user depressing mode control button 21F displayed on the control panel 20B of the IPI Website GUI of the illustrative embodiment, but certainly elsewhere in practice. The user can be anyone with the requisite authority to use the Applets in accordance with the terms of the licensing program to be enforced in connection therewith. Understandably, the terms of such licensing programs will be based on prevailing business conditions and will vary from embodiment to embodiment of the present invention.

As best illustrated in FIG. 4F2, upon entering the UPC-Encoded-Applet Tag Download/Distribution mode, the IPD server 11 of the illustrative embodiment will serve a custom Java GUI for carrying out Applet tag downloading and licensing procedures. The GUI will provide (1) links to the centralized Library of CPIR-Enabling Applet/Servlet Tags maintained within the UPN/™/PD/URL RDBMS 9, as well as (2) launchable GUIs for downloading selected UPN-identifiable CPIR-enabling Applet tags to specified Internet-enabled client computer subsystems 13 or Internet information/application servers operated by the user interfacing with this mode of system operation. Notably, electronic data interchange/exchange processes (e.g. based on EDI, XML/ICE or other protocols) can be used to carry out the downloading of CPIR-enabling Applets and other files between client computers and the IPD server 11 during this and other modes of operation.

For licensing purposes, it may be desirable or necessary to have the user supply "end-use" types of information to the IPD server 11 during this mode of operation in order to identify on which information servers or domains particular CPIR-enabling Applets are to be used (i.e. embedded within HTML-documents and launched therefrom by the end-user which will typically be the consumer). In some instances, licenses for CPIR-enabling Applets will carry a fee to be paid by the downloader; in other instances, there will be no fee requirements. Such details will depend on prevailing business conditions along the retail supply and demand chain.

Once a user has downloaded CPIR-enabling Applet tags onto a designated (target) client machine or server, the user will have built a local Library (or Catalog) of CPIR-enabling Applet tags for use during Applet tag embedding operations which will typically be carried out alongside of other HTML-code authoring and management operations involving, for example, the design, construction, management and maintenance of Web-pages, EC-stores, on-line (retail and wholesale) product catalogs, on-line auction site pages, Web advertisements, and the like.

As shown in FIG. 4F2, during Step D1 of the Applet tag embedding process, CPIR-enabling requests are accessed from the local Library of CPIR-enabling Applets typically over an IP-type local area network (LAN) or wide area network (WAN). Then during Step D2, the accessed CPIR-enabling Applet tag is inserted within the HTML code of the target document. This step of the process will typically involve use of HTML-editing tools of one sort or another, as discussed herein above.

Once the CPIR-enabling Applet tag has been embedded within the target HTML-encoded documents, the HTML-encoded can then be published in its intended publishing environment so that consumers can instantly initiate UPN-directed searches within the centralized UPN/™/PD/URL RDBMS 9 hereof by clicking on the CPIR-enabling Applet tag, and thereafter display the search results within an independent Java GUI which performs the function of a "virtual kiosk" provided at the consumer's point of presence on the WWW.

As described in detail hereinabove, a consumer can automatically produce a CPID-enabling Java GUI (i.e. "virtual kiosk") by clicking upon a CPIR-enabling Java Applet tag that has been embedded within the HTML code of any Web-document. Each consumer product information display (CPID) enabling GUI of the illustrative embodiment is a new and independent Web browser. When such CPID-enabling GUIs are displayed at the consumer's point of presence on the WWW, the consumer is free to select any one of the mode selection buttons and cause the system to enter the selected mode and precisely deliver the information service associated therewith without disturbing his or her present Cyberspace experience.

Modifications of and Extensions to the System and Method of the Present Invention to Provide an Integrated Solution to the Diverse Problems Encountered by Manufacturers, Retailers, E-Retailers, the Advertising and Promotional Agents thereof, and Consumers Along the Demand-Side of the Retail Chain.

By integrating the functionalities provided by systems 2 and 2A shown in FIG. 1, the consumer product information related network thereof is transformed into a "functionally-integrated" consumer product marketing, merchandising and education/information system network 2', as shown in FIG. 5. As will be described in greater detail hereinafter this system 2', a subsystem within the Internet-based Consumer Product Related Information Collection, Management, and Communication System 1, enables manufacturers, retailers, their respective agents, and consumers to carry out (i.e. perform) four (4) basic product-related functions along the demand-side of the retail chain, namely: (1) enabling manufacturers' marketing, brand and/or product managers to create and manage a composite brand image for each consumer product being offered for sale in both physical and electronic marketplaces; (2) enabling manufacturers, retailers, and their advertising and marketing agents to display consumer product advertisements to consumers, at or near the point of purchase or sale within both physical and electronic retail shopping environments, in a way which is guaranteed to project the manufacturer's intended brand image while positively influencing product demand; (3) enabling retailers, manufacturers, and their marketing and promotional agents to promote consumer products with consumers within physical and electronic retail shopping environments in order to positively influence (i.e. reduce) the supply of such products in inventory and promote sales and profits; and (4) enabling consumers to request and obtain reliable information about a manufacturer's product in order to make informed/educated purchases along the demand side of the retail chain, while enabling retailer purchasing agents to request and obtain reliable information about a manufacturer's product in order to make informed/educated purchases along the supply side, thereby influencing product demand in a positive manner.

In order to enable manufacturers, retailers, their agents, and consumers to simply and reliably carry out these four product-related functions in an integrated manner, the consumer product marketing, merchandising and education system/network 2' illustrated in system architecture schematic of FIG. 9A comprises four functionally-integrated Internet-based information subsystems, namely: an Internet-Based Consumer Product Information (CPI) Link Creation, Management and Transport (LCMT) Subsystem 501; an Internet-Based Consumer Product Advertisement Marketing, Programming, Management and Delivery Subsystem 502; an Internet-Based Consumer Product Promotion Marketing, Programming, Management and Delivery Subsystem 503; and Consumer Product Information (CPI) Kiosk Configuration, Deployment, Management and Access Subsystem 504.

The primary functions of the Internet-Based CPI Link Creation, Management and Transport Subsystem are to enable a manufacturer, as to anyone else operating along the retain chain as a vendor of consumer products (which may also include retailers as well), to register with the system, and download software-based EDI-enabled UPN/™/PD/URL link creation, management and transport tools 511, as well as technical support and materials therefor, to registered manufacturers, and their agents, so as to enable the manufacturer's marketing, brand and/or product managers (and their support personnel) to create and manage (within their back offices) a list of UPN/™/PD/URL links for each consumer product within their product/brand portfolio. In accordance with the present invention, these UPN/™/PD/URL links are used to build and maintain a dynamic and robust manufacturer-managed UPN/™/PD/URL link database 511 essential for supporting and operating the other functionally-integrated subsystems comprising system 2'. Using downloaded UPN/™/PD/URL LCMT software 511, UPN/™/PD/URL information-link lists for each product are stored in a locally managed UPN/™/PD/URL link RDBMS 512, typically within the manufacturer's enterprise, and periodically are electronically transported to the central (and preferably mirrored) UPN/™/PD/URL Link RDBMS 9'. These UPN/™/PD/URL links are then distributed globally to consumers having access to physical and virtual CPI kiosks of the present invention 513 and 514, respectively, from which such information-link lists are displayed in the form of a UPN/™/PD/URL link display GUI 515 for use in accessing valuable brand-creating information about the related consumer product.

The primary functions of the Consumer Product Kiosk Configuration, Deployment, Management and Access Subsystem 504 are to enable: (1) retailers and their agents to configure, deploy and manage physical and virtual CPI kiosks in retail shopping space 516; (2) manufacturers and their agents to configure, deploy and manage virtual CPI kiosks anywhere along the HTML-fabric of the WWW (outside physical retail shopping space); (3) advertisers, auctioneers, publishers, writers, critics, Web-site developers, masters and others to download CPIR-enabling Applet tags and install "product-specific" virtual CPI kiosks at licensed domains on the WWW; and (4) consumers, including retail purchasing agents, to access physical and virtual CPI kiosks in the retail world, and request CPI links (e.g. UPN/™/PD/UPN links) that have been carefully created and managed by the marketing, brand and/or product managers of the manufacturer, so that such informational links, once received by the consumer at a Web-enabled client subsystem, can be used to access and display media-rich Internet-based (e.g. HTML, XML, ftp, mail, etc.) information resources published on the WWW about the consumer product. Thus, subsystem 504 comprises:

(i) a network of barcode-driven/touch-screen operated physical CPI kiosks 513, each installed within a "brick and mortar (B&M)" type retail environments using wireless Internet-connectivity enabling technology, and made accessible to millions of retail shoppers across the globe; and (ii) a network of CPIR-enabling Applet driven virtual CPI kiosks 514, each symbolically embedded within the HTML-fabric of the WWW (e.g. in EC-based retail stores and catalogs, on-line auction sites, Internet product advertisements, etc.) as the described hereinabove, and made accessible to millions of retail shoppers across the Internet. These system elements have been described in great detail hereinabove.

The primary functions of the Internet-Based Consumer Product Advertisement Marketing, Programming, Management and Delivery Subsystem 502 are to enable advertisers of manufacturers (and retailers) to: (1) register with the system; (2) buy randomly-allocated advertising slots on particular retailer-deployed physical barcode-driven CPI kiosks 513 (and/or retailer-deployed virtual CPI kiosks 514); (3) build kiosk-based product advertising campaigns within physical and electronic retail space 516; (4) execute such kiosk-based advertisement campaigns by having short UPC-indexed (QuickTime® or Superstitial™ video) product advertisements delivered to consumers over a network of physical and/or virtual CPI kiosks 513, 514, deployed within physical and/or electronic retail shopping space 516, preferably during moments when consumers are not requesting CPI from the system 2'; and (5) manage such kiosk-based product advertisement campaigns as required by the needs and conditions of the advertiser, to determine their effectiveness by comparing sales data collected at physical or virtual point-of-sale (POS) stations with UPON-indexed advertisements displayed to consumers in the same retail shopping space in which the participating physical and/or virtual CPI kiosks are deployed.

The primary function of the Internet-Based Consumer Product Promotion Marketing, Programming, Management and Delivery Subsystem 503 is to enable the retailer, as well as the manufacturer and their promotion agents to: (1) register with the system; (2) buy randomly-allocated promotion slots on particular retailer-deployed physical barcode-driven CPI kiosks 513 (and/or retailer-deployed virtual CPI kiosks 514); (3) build kiosk-based product promotion campaigns within physical and electronic retail space; (4) execute such kiosk-based promotion campaigns by having short UPC-indexed (QuickTime® or Superstitial™ video) product promotions delivered to consumers over a network of physical and/or virtual CPI kiosks deployed within physical and/or electronic retail shopping space 516, preferably during moments when consumers are not requesting CPI from the system; and (5) manage such kiosk-based product promotion campaigns as required by the needs and conditions of the advertiser, to determine their effectiveness by comparing sales data collected at physical or virtual point-of-sale (POS) stations with UPN-indexed promotions displayed to consumers in the same retail shopping space in which the participating physical and/or virtual CPI kiosks are deployed.

While each such subsystem shown in FIG. 5 and described above performs a different set of product-related functions along the demand side of the retail chain, each of these subsystems is built upon and uses diverse types of information contained within the common centralized (typically mirrored) UPC/™/PD/URL RDBMS 9' which stores UPN-indexed CPI links, i.e. UPN/™/PD/URL link records, including URLs pointing to Web-based product advertisements and sales-promotions, and diverse types of information records relating to the various participants in the system hereof, as well as the primary structures involved in the methods supported thereby. The UPN/™/PD/URL links in the RDBMS 9' are collaboratively managed by manufacturers' marketing, brand and/or product managers and support personnel across their enterprises using electronic data interchange (EDI) techniques in the manner detailed hereinabove. As will be described in greater detail hereinafter, these UPN/™/PD/URL links are also data processed (i.e. filtered) in various ways prior to distribution to consumers over the physical and virtual CPI kiosk networks of the system, so as to preserve the trust, confidence and good will developed between manufacturers and retailers in both physical and electronic streams of commerce, thus ensuring delivery of the highest possible level of service and value to consumers, retailers and manufacturers alike. As will be described in greater detail, such data filtering operations involve using information about (i) the manufacturers represented (or promoted) by a particular retailer in a particular retail environment, as well as (ii) the rights and/or privileges accorded to product manufacturers and/or distributors (i.e. vendors) by retailers with regard to displaying a manufacturer's product in, for example, a particular aisle of the retailer's store and perhaps even at a particular shelf location therealong, as well as on a particular Web-page(s) of a retailer's electronic store or catalog (e.g. virtual aisles) and perhaps even at a particular location (i.e. virtual shelf location) therealong. In addition, novel data filtering operations are provided to generate kiosk-based advertising directories customized to each advertising and promotional agent registered with the system so that the directories list only CPI kiosks that have been effectively authorized by registered retailers as having been assigned particular manufacturer aisle/shelf rights/privileges in their physical and/or electronic retail stores.

The structure and function of these Internet-based information subsystems will be described in greater detail below.

Referring now to FIGS. 6A1 and 6A2, there is shown a more detailed schematic diagram of the functionally-integrated consumer-product marketing, merchandising, and education/information system 2' of the second illustrative embodiment of the present invention. As shown, system 2' is similar in all respects to the system 2 shown in FIGS. 1A and 1B, except for the removal of system components 11, 31, 33 and 35, and the addition of the following system components, namely: a plurality of mirrored Physical And Virtual Multi-Mode Kiosk Server Subsystems (i.e. PVM kiosk server subsystems) 11A; a plurality of mirrored Web-Based (HTTP) Manufacturer Registration and UPN/™/PD/URL Link Creation, Management And Transport (LCMT) Servers 505 operably connected to the infrastructure of the Internet; a plurality of mirrored Web-Based (HTTP) CPI Kiosk Ordering/Configuration/Deployment/Management Servers 506 operably connected to the infrastructure of the Internet; a plurality of mirrored Web-Based (HTTP) CPI Kiosk Advertisement Marketing/Sales/Management Servers 507; a plurality of mirrored Web-Based (HTTP) CPI Kiosk Promotion Marketing/Sales/Management Servers 508 operably connected to the infrastructure of the Internet; a plurality of Web-Based (HTTP) Consumer Product Advertising Servers 509; and a plurality of Web-Based (HTTP) Consumer Product Promotion Servers 510 operably connected to the infrastructure of the Internet. The structure and function of these system components will be described briefly below, and in greater detail hereinafter.

In the Internet-Based Consumer Product Related Information Link Creation, Management and Transport Subsystem 501, the primary function of the web-based manufacturer registration and UPN/™/PD/URL link creation, management and transport (LCMT) server 505 is for (1) supporting manufacturer registration operations, (2) downloading UPN/™/PD/URL link creation, management and EDI-enabled transport (LCMT) software described hereinabove to registered manufacturers, (3) installing and setting up such software within the manufacturer's enterprise, (4) selecting and customizing the GUI Design for the UPN/™/PD/URL link display menu filled by the UPN/™/PD/URL link creation, collection, management and EDI-enabled transport software 511 (e.g. including Manufacturer Customization Options, Default CPI Categories for linked URLs, Custom CPI Categories for linked URLs), (5) On-Line Training for UPN/™/PD/URL Link Creation, Collection, Management and Transport Software, (6) Updating Manufacturer Registration Information, (7) Registering Manufacturer's Product Advertising Agents, (8) Registering Manufacturer's Product Promotional Agents; and central UPN/™/PD/URL RDBMS 9'.

In the Consumer Product Information (CPI) Kiosk Configuration, Deployment, Management and Access Subsystem 504, the primary function of the web-based CPI kiosk ordering/configuration/deployment/management server 506 is for: (1) supporting retailer (and e-retailer) and manufacturer registration operations; (2) updating and displaying the Kiosk Deployment Directory for the registered retailer or manufacturer; (3) enabling retailers to select and order physical and/or virtual kiosks for deployment, and manufacturers to select and order virtual kiosks for deployment by the manufacturer or others; (4) specifying the location of physical kiosk installation and deployment, and the domain of virtual kiosk installation and deployment; (5) selecting particular information services to be enabled on and delivered to ordered/deployed CPI kiosks in order to configure the same for its intended application; (6) selecting and customizing the kiosk GUI Design (as a further part of the kiosk configuration process); (7) registering the manufacturer's Aisle/Shelf Rights and Privileges on deployed CPI kiosks; (8) registering the retailer's (or manufacturer's) advertising agents as the case may be; (9) registering the retailer's (or manufacturer's) product promotional agents as the case may be; (10) monitoring the performance of registered retailer (or manufacturer) advertising agents as the case may be; and (11) monitoring the performance of registered retailer (or manufacturer) promotional agents as the case may be.

In the Internet-Based Consumer Product Advertisement Marketing, Programming, Management and Delivery Subsystem 502, the primary function of the Web-Based CPI Kiosk Advertisement Marketing/Sales/Management Server 507 is to enable advertisers (e.g. employed by a particular manufacturer or retailer or working as an advertising agent therefor) to perform a number of functions, namely: (1) register with the system 2'; (2) log onto the Kiosk Advertisement Marketing/Sales/Management Web Site maintained by the system administrator or its designated agent; (3) view catalogs of physical and/or virtual CPI kiosks deployed within retail shopping environments by retailers, at which a registered advertiser can consider purchasing ad slots on manufacturer/retailer authorized physical and/or virtual CPI kiosks (e.g. at a price set by the user activity characteristics of the kiosk periodically measured by the http and/or Applet server enabling the same); (4) purchase advertisement slots on manufacturer/retailer-authorized physical or virtual CPI kiosks deployed in physical or electronic retail shopping space; (5) create, deploy and manage advertising campaigns over one or more physical and/or virtual CPI kiosks deployed by retailers in retail space; and (6) monitor the performance of kiosk-based advertising campaigns during execution, as required by client demands and prevailing business considerations, using any Web-enabled client subsystem 13.

In the Web-Based Consumer Product Promotion Marketing, Programming, Management and Delivery Subsystem 503, the primary function of the Web-based CPI Kiosk Promotion Marketing/Sales/Management Server 508 is to enable promoters (e.g. employed by a particular retailer or manufacturer or working as an promotional agent therefor) to perform a number of functions, namely: (1) register with system 2'; (2) log onto the CPI Kiosk Promotion Marketing/Sales/Management Web Site (e.g. at http://www.brandkeypromote.com) maintained by the system administrator or its designated agent; (3) view catalogs of physical and/or virtual CPI kiosks deployed within retail shopping environments by retailers, at which a registered promoter can consider purchasing or otherwise acquiring promotion slots on manufacturer/retailer-authorized CPI kiosks (e.g. at a price set by the user activity characteristics of the kiosk periodically measured by the http and/or Applet server enabling the same); (4) purchase or otherwise acquire (product sales) promotion slots on manufacturer/retailer authorized physical or virtual CPI kiosks deployed in retail shopping space; (5) create, deploy and manage product promotion campaigns over one or more physical and/or virtual kiosks deployed by retailers (or manufacturers) in retail space; and (6) monitor the performance of kiosk-based promotion campaigns as required by client demands and prevailing business considerations, using any Web-enabled client subsystem.

In the illustrative embodiment, the primary function of each Consumer Product Advertising Web Server 509 is to enable the publication of Internet-based product advertisements, (e.g. QuickTime® videos from Adobe, Inc., Superstitial™ rich media advertisements from Unicast communications, Inc., http://www.unicast.com, etc.) for delivery to subnetworks of physical and virtual CPI kiosks in accordance with the principles of the present invention. As described in great detail hereinabove, these Web-based kiosk advertisements can be created by the registered advertiser using powerful authoring tools well know in the digital creation arts.

In the illustrative embodiment, the primary function of the Consumer Product Promotion Web Server 510 is to enable the publication of Internet-based product promotions (e.g. QuickTime® videos from Adobe, Inc., Superstitial™ rich media promotions from Unicast communications, Inc., http://www.unicast.com, etc.) for delivery to subnetworks of physical and virtual CPI kiosks in accordance with the principles of the present invention. As described in great detail hereinabove, these Web-based kiosk promotions can be created by the registered promoter using powerful promotion authoring tools made available from the Web-based CPI Kiosk Promotion Marketing/Sales/Management Server 510, to be described in greater detail hereinafter.

FIG. 11 illustrates the flow of CPI-type link data within the system shown in FIGS. 6A1 and 6A2, with the addition of information servers 505 through 510 described above. In all other respects, this schematic is similar to the one shown in FIG. 2A1.

FIG. 12 illustrates the flow of CPI-type link content data within the system shown in FIGS. 6A1 and 6A2, appropriately modified so that instead of only UPN/™/PD/URL links being transported from each registered manufacturer's enterprise (e.g. local UPN/™/PD/URL RDBMS), UPN-indexed (media-rich) information resource files (i.e. IRFs) are also transported from the manufacturer's enterprise (e.g. local UPN/™/PD/URL RDBMS 502) to a centralized UPN/™/PD/IRF RDBMS 9" for central storage, management and distribution, as described above in connection with the illustrative embodiment shown in FIG. 2A'. In the illustrative embodiment shown in FIG. 12, the central UPN/™/PD/IRF RDBMS 9'' is realized as a massive centralized data warehouse using data warehouse technology known in the art. In all other respects, this schematic representation is similar to the one shown in FIG. 2B.

Brief Overview of the Internet-Based Consumer Product Marketing, Merchandising and Education/Information System of the Second Illustrative Embodiment FIG. 13 is an alternative block schematic diagram of the Internet-based system shown in FIGS. 6A1 and 6A2, in which the primary system sub components are graphically indicated for the purpose of clearing explaining how the components of system 2' cooperate to realize the functionalities of each subsystem schematically depicted in FIG. 5.

The UPN/™/PD/URL RDBMS and Data Processing/Filtering Subsystem of the Second Illustrative Embodiment The primary function of the UPN/™/PD/URL RDBMS 9' is to manage UPN/™/PD/URL link data as well as all other types of data collected and managed during the information services supported by the subsystems 501, 502, 503 and 504, and catalogued in set of logical or template data tables (i.e. data structures), each having a set of information fields wherein one or more of these information fields are related to similar information fields in other template data tables by way of relational links, known in the relational database art. Preferably, RDBMS 9' is realized using a powerful robust RDBMS technology such as Oracle 8i RDBMS software from the Oracle Corporation, but it is understood that other commercial RDBMS products can be used with excellent results by virtue of the fact that each UPN/™/PD/URL link record contains a relatively small amount of information, while the actual information content associated with such links resides on Internet-enabled information servers located potentially in every corner of the world.

Figure 9:
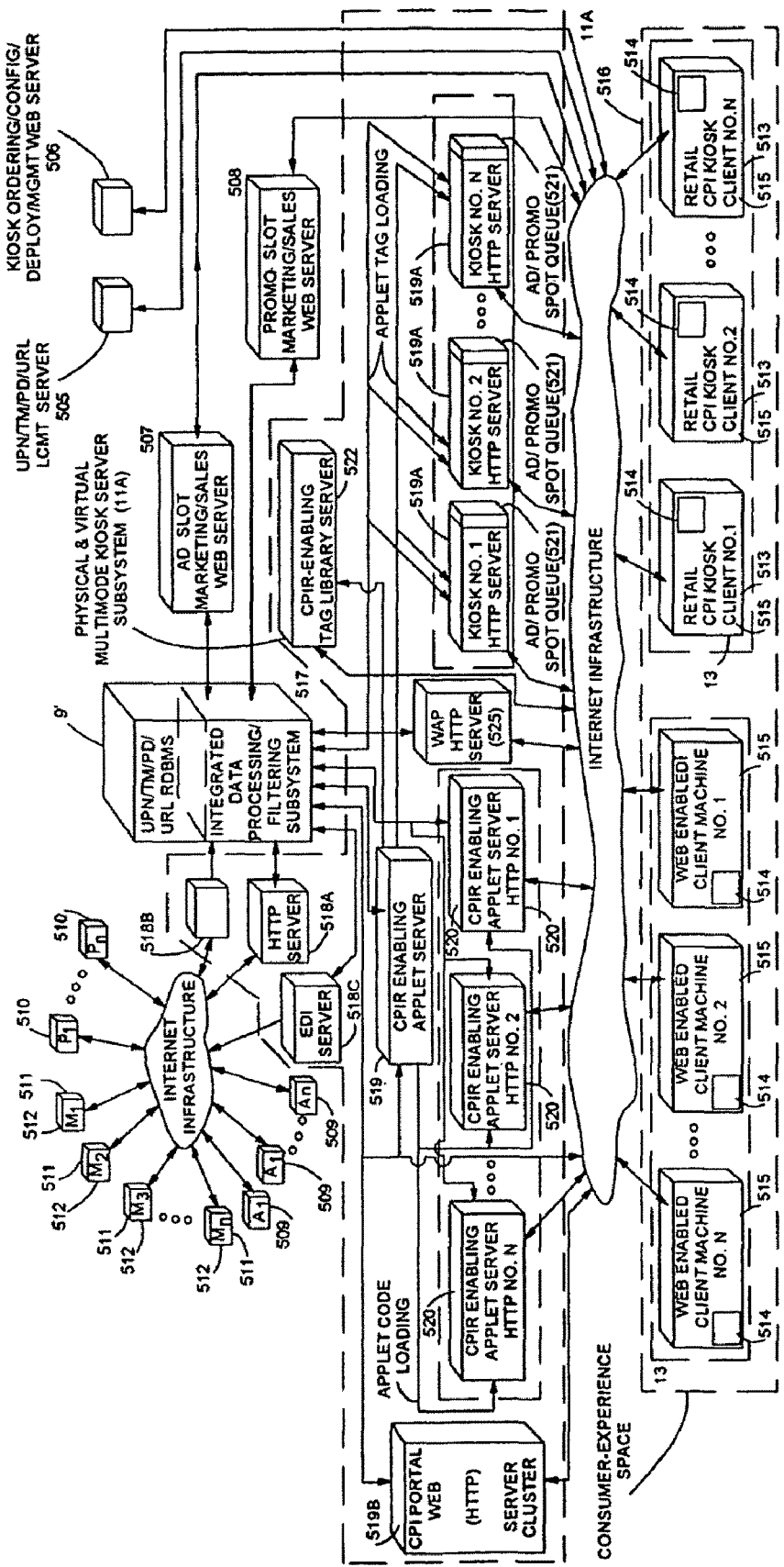
FIG. 9 is a block schematic diagram of the Internet-based system of the present invention comprising a plurality of manufacturer-operated client machines equipped with EDI-enabled UPN/™/PD/URL management RDBMS software for (1) collecting UPN/Trademark/Product-Descriptor/URL links from manufacturers and their agents (contributing to the brand-images of their products), (2) managing such brand-forming information links within a UPN/™/PD/URL RDBMS locally-maintained within each manufacturer's enterprise, and (3) transporting each such locally-managed UPN/™/PD/URL RDBMS to a centralized UPN/™/PD/

As shown in FIG. 9, a data processing/filtering subsystem 517 (e.g. comprising modules of data processing scripts) is integrated with the UPN/™/PD/URL RDBMS 9' as shown in FIG. 1. The primary function of data processing subsystem 517 is to process the data elements within UPN/™/PD/URL RDBMS 9' to perform the following product-related functions: (1) enabling each retail-based (physical or virtual) CPI kiosk 513, 514 to display only UPN/™/PD/URL links created by manufacturer's who (i) sell products in the retailer's store and (ii) have acquired rights and/or privileges (by the retailer) to display products on the retailer's store shelves about which the kiosk is installed in the retailer's space; and (2) generating "retailer-authorized" kiosk advertisement and promotion directories listing retailer-authorized CPI kiosks which registered product advertisers and promoters can use to provide their services, without violating any aisle/shelf rights/privileges that may have granted to particular manufacturers by retailers during their business relations.

In the preferred embodiment of the present invention, the data processing subsystem 517 is realized as a system of software modules (e.g. scripts) which cooperate with the UPN/™/PD/URL RDBMS 9' whenever (i) CPI requests are made from either a physical or virtual CPI kiosk in subsystem 504, (ii) kiosk advertising directories are requested from subsystem 507, and (iii) kiosk promotional directories are requested from subsystem 508.

Internet-Based Consumer Product Information (CPI) Link Creation, Management and Transport (LCMT) Subsystem 501

As shown in FIG. 9, Internet-Based Consumer Product Information (CPI) Link Creation, Management and Transport (LCMT) Subsystem 501 of the illustrative embodiment comprises a number of system components, namely: a web-based manufacturer registration and UPN/™/PD/URL link creation, management and transport (LCMT) server 505; UPN/™/PD/URL RDBMS 9' operably connected to the infrastructure of the Internet; a plurality of Web-enabled client computer subsystems 13 operably connected to the infrastructure of the Internet; a plurality of manufacturer-operated client subsystems 512 operably connected to the infrastructure of the Internet, running UPN/™/PD/URL link creation, collection, management and EDI-enabled transport (LCMT) software 511; and a plurality of http, ftp and/or EDI servers 518A, 518B and 518C, respectively, operably connected to the UPN/™/PD/URL RDBMS 9' and the infrastructure of the Internet.

The primary function of the web-based manufacturer registration and UPN/™/PD/URL link creation, management and transport server 505 is for (1) supporting manufacturer registration operations; (2) downloading UPN/™/PD/URL link creation, management and EDI-enabled transport (LCMT) software 511 described hereinabove to registered manufacturers; (3) installing and setting up such software within the manufacturer's enterprise; (4) selecting and customizing the GUI Design for the UPN/™/PD/URL link display menu 515 using the UPN/™/PD/URL LCMT software (e.g. such customization including Manufacturer Customization Options, Default CPI Categories for linked URLs, Custom CPI Categories for linked URLs); (5) On-Line Training for UPN/™/PD/URL LCMT Software 511; (6) Updating Manufacturer Registration Information; (7) Registering Manufacturers' Product Advertising Agents; and (8) Registering Manufacturers' Product Promotional Agents; and central UPN/™/PD/URL RDBMS 9'.

Each manufacturer-operated client subsystem 13, shown in FIG. 9, is equipped with UPN/™/PD/URL LCMT software 511 downloaded from information server 505. The UPN/™/PD/URL LCMT software performs at least two (3) functions. The first function is to enable a manufacturer's (i.e. vendor's) marketing, brand and/or product managers and their agents (contributing to the brand-images of their products) to create UPN/™/PD/URL links in connection with their consumer products. The second function it to enable the manufacturer' marketing, brand and/or product managers and their agents, to manage such brand-forming information links within a UPN/™/PD/URL RDBMS 512 locally-maintained within each manufacturer's enterprise. The third function is to enable the manufacturer' marketing, brand and/or product managers and their agents to transport such locally-managed UPN/™/PD/URL RDBMS to centralized UPN/™/PD/URL RDBMS 9' for central management, processing and distribution in accordance with the principles of the present invention.

The purpose of transporting the data content in each such locally-managed UPN/™/PD/URL RDBMS 512 to centralized UPN/™/PD/URL RDBMS 9' is to enable distribution of its UPN/™/PD/URL links to: (i) consumers and end-users within physical retail environments having access to a plurality of physical CPI serving kiosks 513 driven by a plurality of Web (http) servers 519 operably connected to the infrastructure of the Internet, as shown in FIG. 9; (ii) consumers and end-users within electronic retail environments having access to a plurality of virtual CPI serving kiosks driven by a plurality of CPIR-enabling Java Applet servers 520 operably connected to the infrastructure of the Internet; and (iii) consumers and end-users interfaced with a plurality of Web-enabled client machines at home, school, in the office or on the road having access to a plurality of UPN-driven consumer product information portals (e.g. BrandKey Request Central WWW Site at http://www.brandkeyrequestcentral.com) on the WWW, driven by a plurality of mirrored http information servers 519B (operably connected to the infrastructure of the Internet) as shown in FIG. 13. Similarly, each registered advertising agent might be supplied with such UPN/™/PD/URL LCMT software and participate in the creation, management, and transport of the manufacturer's UPN/™/PD/URL RDBMS.

The primary function of the http, ftp and/or EDI servers 518A, 518B and 518C, respectively, is to receive the structured files of locally-created/managed UPN/™/PD/URL RDBMS 512 that have been electronically transported by each registered manufacturer within the system, for purposes of updating the UPN/™/PD/URL RDBMS 9' centrally managed by the system 2'.

Consumer Product Information (CPI) Kiosk Configuration, Deployment, Management and Access Subsystem 504

In the illustrative embodiment, the primary functions of the web-based CPI kiosk ordering/configuration/deployment/management server are for: (1) supporting retailer (and e-retailer) and manufacturer registration operations; (2) updating and displaying the Kiosk Deployment Directory for the registered retailer or manufacturer; (3) enabling retailers to select and order physical and/or virtual kiosks for deployment, and manufacturers to select and order virtual kiosks for deployment by the manufacturer or others; (4) specifying the location of physical kiosk installation and deployment, and the domain of virtual kiosk installation and deployment; (5) selecting particular information services to be enabled on and delivered to ordered/deployed CPI kiosks in order to configure the same for its intended application; (6) selecting and customizing the kiosk GUI Design (as a further part of the kiosk configuration process); (7) registering the manufacturer's Aisle/Shelf Rights and Privileges on deployed CPI kiosks 513; (8) registering the retailer's (or manufacturer's) advertising agents as the case may be; (9) registering the retailer's (or manufacturer's) product promotional agents as the case may be; (10) monitoring the performance of registered retailer's (or manufacturer's) advertising agents as the case may be; and (11) monitoring the performance of registered retailer (or manufacturer) promotional agents as the case may be.

In the illustrative embodiment, the Consumer Product Information (CPI) Kiosk Configuration, Deployment, Management and Access Subsystem 504 is realized by a number of system components, namely: UPN/™/PD/URL RDBMS 9'; a plurality of mirrored Physical and Virtual Multi-Mode Kiosk Server Subsystems 11A operably connected to the infrastructure of the Internet and the UPN/™/PD/URL RDBMS 9'; a plurality of barcode-driven/touch-screen-enabled LCD-based physical CPI kiosks 513 installed with physical retail shopping space 516 and operably connected to the infrastructure of the Internet; and a plurality of Web-enabled client subsystems (e.g. PC computers, wireless palm computers, WAP-enabled cell phones, etc.) 13 operably connected to the infrastructure of the Internet as described hereinabove, for use by consumers to access UPN/™/PD/URL links within the central UPN/™/PD/URL RDBMS 9' from anywhere on Earth.

As shown in FIG. 9, each Physical and Virtual Multi-Mode Kiosk Server Subsystem 11A of the illustrative embodiment comprises a number of subcomponents, namely: a CPIR-enabling Applet/Servlet Generator/Server 521 operably connected to the UPN/™/PD/URL RDBMS 9'; a CPIR-Enabling Applet Tag (i.e. Product-Specific CPI Virtual Kiosk) Library (Catalog) Web Server 522 operably connected to the CPIR-enabling Applet/Servlet Generator/Server 519, and the infrastructure of the Internet; a plurality of Web-based (http) Multi-Mode (e.g. CPI) Kiosk Servers 519A and operably connected to UPN/™/PD/URL RDBMS 9' and the infrastructure of the Internet; a plurality of CPIR-enabling Applet servers 520 operably connected to the UPN/™/PD/URL RDBMS 9' CPIR-enabling Applet/Servlet Generator 521 and the infrastructure of the Internet; a plurality of Web-based kiosk servers 519A operably connected to UPN/™/PD/URL RDBMS 9' and the infrastructure of the Internet; a plurality of Web-based (http) CPI portal servers 519B operably connected to the UPN/™/PD/URL RDBMS 9'; and a GPS-time synchronized WAP-enabled information server 523 operably connected to the infrastructure of the Internet.

Each barcode-driven/touch-screen-enabled LCD-based physical CPI kiosk (513) may be realized as any of the physical CPI kiosks disclosed herein. Such CPI kiosks are installed with physical retail shopping space 516, and configured and operated in accordance with the principles of the present invention.

As shown in FIG. 9, each Web-based (http) CPI kiosk server 519A has a statically assigned IP address, and an assigned domain name. Preferably, each such CPI kiosk server 519A is assigned to a single barcode-driven/touch-screen-enabled LCD-based physical CPI kiosk 513, on which a retailer-oriented WWW site (at the assigned domain) is graphically displayed in the retailer's store 516. As shown in FIG. 9, the function of the advertisement/promotion spot queue 521 associated with each Web-based kiosk server 519A is together queuing up advertisement and promotion spots, ordered by registered advertisers, for either a random or ordered display on the particular physical CPI kiosk assigned to the Web-based kiosk server 519A.

As shown in FIG. 9, the CPIR-enabling Applet/Servlet Generator/Server 521 is operably connected to the UPN/™/PD/URL RDBMS 9' for automatically generating a CPIR-enabling Applet/Servlet of the present invention for each UPN/™/PD/URL link record in the UPN/™/PD/URL RDBMS 9'. In accordance with the principles of the present invention, (i) the compiled code associated with the CPIR-enabling Applet is loaded onto one of the plurality of CPIR-enabling Applet servers 520 shown in FIG. 9, and (ii) the corresponding CPIR-enabling Applet tag is loaded within the CPIR-Enabling Applet Tag (i.e. Product-Specific CPI Virtual Kiosk) Library Web Server 522 for viewing and downloading by retailers, advertisers, auctioneers, etc, as described in detail hereinabove. Each CPIR-enabling (e.g. JAVA) Applet server 520 has a statically assigned IP address, and an assigned domain name, and is assigned to numerous physical-type CPIR-enabling Applet-driven virtual CPI kiosks (i.e. GUIs) 514 deployed at retailer-oriented WWW sites served to kiosks in the retailer's store, or otherwise on the WWW.

Notably, each Web-based kiosk server 519A and each CPIR-enabling Applet server 520 in the system will be provided with either a MIN-based data filtering mechanism, UPN-based data filtering mechanism, and/or trademark (™) based data filtering mechanism supplied by the data processing/filtering subsystem 517 integrated with the UPN/™/PD/URL RDBMS 9', as shown in FIG. 9. This data filtering subsystem 517 serves at least three (3) important product functions in the retail-kiosk-based marketing, merchandising and education/information system of the present invention 2'.

The first product function of these filters is to ensure that only "retailer-authorized" UPN/™/PD/URL links are supplied to retail-based CPI kiosks (513, 514) driven by such kiosk servers, and that such retailer-authorization is achieved by restricting the display of product advertisements and promotions on retail-based CPI kiosks having manufacturer aisle/shelf rights/privileges registered therewith, thereby preserving the goodwill embodied within manufacturer-retailer relationships along the retail chain.

The second product function of these filters is to enable consumers to access and display on a retail-based CPI kiosk, only CPI related to products of manufacturers (i.e. vendors) who currently have products being sold in the retail store in which the retail-based CPI kiosk is installed, thereby assisting retailers in their effort to market and merchandise products offered by their manufacturers, and help educate consumers about such product offerings.

The third product function is to enable the automatic generation of kiosk advertisement and promotion directories which are specifically tailored to each registered product advertiser and promoter, wherein each such directory lists physical and/or virtual CPI kiosks on which the advertiser or promoter is authorized by retailers to display product advertisements or promotions while respecting the manufacturer's aisle/shelf rights/privileges granted in the listed CPI kiosks by kiosk-hosting retailers. As with the first and second product functions described above, the third product function operates to preserve the goodwill embodied within manufacturer-retailer relationships along the retail chain.

As shown in FIG. 13, each Web-based (http) portal information server 519B has a statically assigned IP address, and an assigned domain name. The primary function of the Web information server 519B is to serve up to the public, in different languages, barcode-drivable CPI portal WWW sites, at which the entire UPN/™/PD/URL RDBMS 9' is searchable by members of the public without the restriction of MIN filters, UPN filters and/or trademark (™) filters which are applied to retail-based CPI kiosks for the purpose of preserving the goodwill embodied within manufacturer-retailer relationships along the retail chain, as discussed hereinabove.

A GPS-time synchronized WAP-enabled information server 525 can be optionally used to deliver CPI links from the UPN/™/PD/URL RDBMS 9' to a GSU-enabled wireless Web-enabled palm computer 13 carried by a consumer within a physical retail shopping environment, when, for example, the palm computer is physically located within a particular portion of a physical retail shopping space.

To preserve the goodwill embodied within manufacturer-retailer relationships along the retail chain, it would not be desired by retailers for Web-based CPI portal servers 519B to serve UPN/™/PD/URL links to WAP-enabled mobile computing devices of consumers who wish to (i) rummage through a retailer's store, (ii) read UPN symbols on consumer products, and (iii) view comparison price information on scanned products in an effort to haggle down the retailer's price, while disregarding the value that the retailer adds to the purchase price through its store's shopping experience, knowledgeable sales personnel, etc. In such instances where only the consumer wants the lowest price, and would be willing to buy a product in a warehouse off a shipping pallet, but the retailer aims to provide a more rich consumer experience, albeit at an increased purchase price (i.e. for the added value), the retailer will not want consumers to bring barcode-driven mobile price-comparison palm computers 13 into their stores, although they most likely cannot stop them by law from doing so. To prevent the CPI links collected by the system hereof exacerbating this potential situation in physical retail shopping environments, it will be preferred that Web-enabled CPI portal servers 519B do not support the Wireless Applications Protocol (WAP).

However, in instances where WAP is supported and retailers permit such mobile devices 13 in their stores, it would be preferred for the consumer to carry a GSU-enabled/Web-enabled (bar code driven) palm computer 13, cell phone or other mobile appliance 13A into the retail store, so that when the portable device is located within a particular store, the GSU-enabled device 13A is automatically activated to deliver retailer-specific information to the consumer, enhancing such mobile commerce (M-commerce) applications. Details of GPS time-synchronized WAP-enabled information servers 525 and GSU-enabled mobile computers 13A are taught in published WIPO Patent Application No. WO 00/50974, incorporated herein by reference in its entirety.

Internet-Based Consumer Product Advertisement Marketing, Programming, Management and Delivery Subsystem 502

In the illustrative embodiment, the Consumer Product Advertisement Marketing, Programming, Management and Delivery Subsystem 502 comprises: a web-based product advertisement marketing/sales (http) server 507 operably connected to the infrastructure of the Internet; the UPN/™/PD/URL RDBMS 9' operably connected to the infrastructure of the Internet; and a plurality of Web-enabled client subsystems 13 operably connected to the infrastructure of the Internet as described hereinabove.

In the illustrative embodiment, the primary function of the web-based product advertisement marketing/sales/management (http) server 507 is to enable the following advertiser-oriented information services: (1) registering advertisers (e.g. agents of manufacturers and retailers) and the creating advertiser accounts; (2) logging into the subsystem as a registered advertiser; (3) displaying General Kiosk Advertising Directories and identifying CPI kiosks on which the advertiser is authorized to display advertisements on consumer products; (4) displaying Brand Kiosk Advertising Directories and identifying CPI kiosks on which the advertiser is authorized to display advertisements on a particular brand of consumer products; (5) registering Kiosk Advertising Campaigns to be displayed on a retailer-authorized (initially-unspecified) sub-network of CPI kiosks; (6) building Kiosk Advertising Campaigns by placing ad spot orders to be run on a specified subnetwork of CPI kiosks; (10) running and displaying Kiosk Advertising Campaigns on the retailer-authorized subnetwork of CPI kiosks; (11) modifying Kiosk Advertising Campaigns; and (12) monitoring the performance of Kiosk Advertising Campaigns; central UPN/™/PD/URL RDBMS 9'. Each of these product related functions are carried out by the product advertiser using a Web-enabled client subsystem 13 operably connected to the infrastructure of the Internet as described hereinabove. Using a Web-enabled client subsystem, the advertiser can access subsystem 507 and central UPN/™/PD/URL RDBMS 9' from anywhere on Earth.

Internet-Based Consumer Product Promotion Marketing, Programming, Management and Delivery Subsystem 503

In the illustrative embodiment, the Consumer Product Promotion Marketing, Programming, Management and Delivery Subsystem 503 comprises: a web-based product promotion marketing/sales/management (http) server 508 operably connected to the infrastructure of the Internet; the UPN/™/PD/URL RDBMS 9' operably connected to the infrastructure of the Internet; and a plurality of Web-enabled client subsystems 13 operably connected to the infrastructure of the Internet as described hereinabove.

In the illustrative embodiment, the primary functions of the web-based product Kiosk Promotion Marketing/Sales/Management (http) server 508 is for enabling the following promoter-oriented information services: (1) registering promoters and the creating promoter accounts; (2) logging into the subsystem by promoter; (3) displaying General Kiosk Promotion Directories and identifying CPI kiosks on which the promoter is authorized to display promotions on consumer products; (4) displaying Brand Kiosk Promotion Directories and identifying CPI kiosks on which the promoter is authorized to display advertisements on a particular brand of consumer products; (5) registering Kiosk Promotion Campaigns to be displayed on an (initially-unspecified) retailer-authorized subnetwork of CPI kiosks; (6) building Kiosk Promotion Campaigns by placing promo spot orders to be run on a specified subnetwork of CPI kiosks; (10) running and displaying kiosk promotion campaigns on the retailer-authorized subnetwork of CPI kiosks; (11) modifying kiosk promotion campaigns; and (12) monitoring the performance of kiosk promotion campaigns; and central UPN/™/PD/URL RDBMS 9'. Each of these product related functions are carried out by the product promoter using a Web-enabled client subsystem 13 operably connected to the infrastructure of the Internet as described hereinabove. Using a Web-enabled client subsystem, the promoter can access subsystem 503 and central UPN/™/PD/URL RDBMS 9' from anywhere on Earth.

Generalized Operation of the Integrated Consumer Product Electronic Marketing, Merchandising and Education System of the Second Illustrative Embodiment of the Present Invention In the integrated consumer product electronic marketing, merchandising and education/information system of the present invention 2' illustrated in FIGS. 5 through 9, different events can be programmed to happen whenever a consumer establishes contact with virtual "multi-mode" CPI kiosk of the present invention 513, 514, described in detail hereinabove. Two general cases will be considered below.

When a consumer establishes contact with a virtual "multi-mode" CPI kiosk hereof displayed in a virtual retail shopping environment, the consumer might be shown either: (1) a product advertisement ordered by the manufacturer of the product sold in the retailer's store, the advertising agent of the manufacturer, the retailer, or the retailer's advertising agent; or (2) a product promotion ordered by the retailer, the retailer's promotional agent, the manufacturer of the promoted product sold in the retailer's store, or the manufacturer's promotional agent. In either case, the consumer can automatically interrupt the product advertisement or promotion by (i) clicking on the product advertisement or promotion, or (ii) clicking on the "CPI Request" button on the virtual kiosk's GUI.

In FIG. 10A, there is shown an exemplary GUI screen 640 which is displayed on the multi-mode physical CPI kiosk 513 during its Advertisement Spot Display Mode of operation. In this mode of operation, purchased advertisement spots 641, which have been loaded in the physical CPI kiosk's advertisement/promotion spot queue, are automatically displayed in the information display frame 642 of the physical kiosk GUI 640 during the kiosk's quiescent moments of operation (i.e. when consumers are not making CPI requests with the kiosk).

In FIG. 10B, there is shown an exemplary GUI screen 644 which is displayed on the multi-mode physical CPI kiosk during its Promotion Spot Display Mode of operation. In this mode of operation, purchased promotion spots 645, which have been loaded into the physical CPI kiosk's advertisement/promotion spot queue, are automatically displayed in the information display frame 642 of the physical kiosk GUI during the kiosk's quiescent moments of operation (i.e. when consumer are not making CPI requests). At any instant in time, either an advertisement spot or promotion spot can be displayed within the information display frame of the kiosk GUI. In accordance with the principles of the present invention, the advertisement or promotion spot displayed on a particular retail multi-mode kiosk will be related to a product or product brand by a manufacturer who has been granted aisle/shelf rights/privileges by the retailer, thereby acquiring the right/privilege to display, or have displayed (by its agents), advertisements and/or promotions relating to the manufacturer's (i.e. vendor's) products.

Depending on the design of the physical CPI kiosk, various conditions at the kiosk can terminate the currently active Advertisement Spot Display Mode or the Promotion Spot Display Mode, and activate its CPI Display mode, namely: touching the touch-screen display screen within its information display frame, within which the advertisement or promotion is displayed; manually selecting search mode/function selection buttons 557 through 561 and 573 displayed in the horizontal control frame; or reading a bar code symbol label on a consumer product using the scanner integrated within the CPI kiosk 513; etc.

In FIG. 11, the system architecture is shown for an integrated product marketing, merchandising, and education/information system constructed in accordance with the principles of invention disclosed in the system shown in FIGS. 5 through 10C described above. Common system components shown in FIGS. 5 through 9 are referenced in FIG. 11 using like reference numerals.

The present invention has been described in great detail with reference to the above illustrative embodiments. It is understood, however, that numerous modifications will readily occur to those with ordinary skill in the art having had the benefit of reading the present disclosure.

The system shown in FIGS. 5 through 9 has four functionally integrated subsystems. However, in alternative embodiments of the present invention, it is contemplated that there are applications in which the advertising and promotion subsystems 503 and 504 may be eliminated from the system, while still providing a kiosk-based CPI system having great utility in many diverse applications. Also, subsystems 501 and 504 can be modified in various ways without departing from the principles of the present invention taught herein.

Notably, product advertisements and promotion orders loaded into the Advertisement/Promotion spot queues of CPI kiosks can be displayed in a preordered manner, rather than randomly, etc.

Having realized an UPN/™/PD/URL RDBMS in accordance with the principles described above, numerous value-added applications can be built upon and around this RDBMS. For example, portable memory-type bar code scanners can be used to read UPC bar codes on products to create shopping lists of goods to be purchased or considered for purchased, as well as personalized stores containing descriptions of goods from which consumers can request more CPI and thereafter decide to purchase using EC-enabled transaction techniques described or well known in the art.

The system and method of the present invention has been shown to combine the use of UPNs, trademarks, product descriptions, and company names when making a consumer product information request of the system. It is understood, however, that the present invention can be practiced using any one of these items of information, alone or in combination with each other, in order to place a product information request with the system hereof.

Also, while the system of the illustrative embodiment has been shown used to collect, transport and distribute information related to consumer products, it is understood that the system can be used to link ™s, PDs and URLs of HTML (and other Internet) documents with consumer services assigned uniform service numbers (USN) which may be based on the UPC or EAN numbering system, or some other suitable system which may be constructed and implemented in the future. In such alternative embodiments, the RDBMS 9' would contain information pertaining to uniform service numbers (USN) that have been linked to the service marks ($^{SM}$s), service descriptors (SDs) and URLs of HTML or like documents on the Internet by the manufacturer or its agents (e.g. vendors), in essentially the same manner as conducted for consumer products. Such USN/$^{SM}$/SD/URL link creation, management and transport (LCMT) operations can be carried out in a similar to that described in connection with UPN/™/PD/URL link creation, management and transport along the retail supply and demand chain. In this alternative embodiment of the present invention, system 2' would remain substantially the same except the term "product" would be replace by "service" and the term "manufacturer" will be replaced by the term "service provider", "vendor" or the like. In yet a embodiment of the present invention, UPNs associated with particular "products" and USNs associated with particular "services" can be linked to ™/PD/URL links and $^{SM}$/SD/URL links, respectively, to provide a hybrid-type consumer product and service marketing, promotion, and education/information system.

In connection with the consumer service information (CSI) embodiments of the present invention, it is understood that at present, few (if any) services have been assigned a UPC (or EAN) number in the manner that nearly all consumer products have been assigned in the contemporary period. In spite of this fact, however, the present invention contemplates the need and utility of widespread assignment of UPC, EAN or similar numbers by service providers to particular services (as well as the imprinting of UPC, EAN, UPC/EAN or similar symbols on printed service brochures and advertisements). Notably, assigning uniform service numbers (USNs) to particular services, and labeling printed and graphical brochures and advertisements with such universal numbers, will provide a number of new opportunities hitherto unavailable.

In particular, service-related information could be easily found (i.e. located and accessed) on Web sites using the system and method of the present invention, and thereafter the service easily procured through an electronic data transaction. In accordance with the present invention, this can be achieved by uniquely identifying and assigning particular services by a Universal Service Code (USC), which has many if not all of the attributes of a conventional UPC, as well as others pertaining to services. While not necessary, a single digit may be optionally added to the USC in order to demark that services, rather than products, are being identified. An example of such USC labeling would be printing an assigned UPC label (number) on: admission tickets to a theatrical, dramatic or musical performance and/or its playbill; admission tickets to a movie; admission tickets to a concert and/or its concert program; admission tickets to a sporting event and/or its sports program; admission tickets to an art, science or history museum; admission tickets to the zoo or botanical gardens; and the like. The UPC label would be encoded to identify a particular event at which an entertainment, educational or professional service is provided. The UPC label printed on the tangible medium associated with the promotion of or access to the particular service would then be registered with the system hereof, along with the name of the provider of the service, and a list of URLs that identify the Web locations at which particular kinds of information related to the particular service can be found.

Internet-Based Brand Mamagement and Marketing Communication Instrumentation Network of the Present Invention Employing Remotely Programmable Server-Side Driven Brand-Building Multi-Mode Virtual Kiosks The second above-described illustrative embodiment of the present invention can be further modified and refined to provide a third illustrative embodiment of the present invention in the form of an Internet-based Brand Management and Marketing Communication Instrumentation Network illustrated in FIGS. 12A through 13E, which is capable of deploying, installing and remotely-programming the various display modes of networks of server-side driven, brand-building Multi-Mode Virtual Kiosks. This third system embodiment of the present invention will now be described in great detail hereinbelow with reference to FIGS. 12A through 13E.

The Brand Management and Marketing Communication Network shown in FIGS. 12A through 13E is to satisfy four basic needs of brand management teams in today's Internet marketplace:

1. To build strong brands online with consistent messaging and images across multiple touch points on the Web 2. To build collaboration among partners in an inherently divisive environment 3. To communicate with consumers anywhere on the Internet and build brand loyalty 4. To guard against brand erosion in price-comparison environments Using the Internet-based Brand Marketing Communication Instrumentation Network shown in FIGS. 12A through 13E, Brand Management Teams can communicate brand information and messages directly to the consumer through Brandkey's Multi-Mode Virtual Kiosks that consumers can access whenever—and wherever—they happen to be on the Web.

These Multi-Mode Virtual Kiosks, illustrated in FIGS. 13A through 13E, allow brand managers to quickly communicate a multi-dimensional picture of a brand to the consumer through three programmable display modes:

(1) Advertising Display Mode shown in FIG. 13A;

(2) Promotional Display Mode shown in FIGS. 13B and 13C; and (3) Brand information Network Display Mode shown in FIGS. 13D and 13E.

During the Advertisement Display Mode, the Virtual Kiosk displays advertising spots programmed by the brand management team or their agents to build brand awareness.

In the Promotional Display Mode, the Virtual Kiosk displays promo spots programmed by Brand Management Team and their agents to foster consumer purchase intent.

In the final Brand Information Network Display Mode, the Virtual Kiosk displays a menu of brand-building information resource links which is designed to develop rich message associations that build the consumer's image of the brand that is consistent with brand marketing objectives.

Consumers can access Multi-Mode Virtual Kiosks of the present invention through:

1) Desktop Computers
2) WiFi-enabled Portable Devices
3) Physical Retail Kiosks
4) ATMs
5) Interactive Television Sets
6) PDAs and Cell Phones At each of these Consumer Touchpoints, Brand Management Teams have the option of delivering their Brands' Multi- Mode Virtual Kiosks through a number of different Launch Environments. Such Launch Environments include:

Brandkey Systems™ Virtual Kiosk Launch Buttons
HTML-Encoded Documents
HTML-Encoded Images
HTML-Encoded Desktop Icons These Virtual Kiosk launch environments allow Brand Management Teams to extend their brand's reach to a wider range of access points on the Web.

The Network of the present invention enables brand management teams of any size and arrangement to rise above the clutter in the Internet marketplace and communicate the essence and character of their brands directly to the consumer. In seconds, consumers can obtain a multi-dimensional experience of a branded product or service without the influence of other brands.

With Multi-Mode Virtual Kiosks so simple and easy to access, consumers can be more effectively educated about brands than ever before online and gain a full experience of a brand so that they develop strong preferences for them. Consumer brand images are now aligned with the team's intended brand marketing objectives. And consumers no longer need to wander off to other websites in search of brand-related information. Online brand marketers can now create and deliver high-impact brand marketing campaigns. Retailers can build e-commerce sites which communicate its vendors' intended brand images while preserving their own. Retailers can more efficiently use the virtual shelf-space on their Websites. By more efficiently using Brand Building Information Resources, marketing costs decrease, as Brand Value and Equity increase, thereby improving Profits. By creating new levels of Brand Value and Experience, the durability of all serviced Brands can be extended. By providing such benefits, the Brandkey Systems™ Network helps build more distinctive, valuable, and stronger Brands in the marketplace.

In the third illustrative embodiment of the present, the Internet-based Brand Marketing Communication Instrumentation Network of the present invention is realized as an industrial-strength, carrier-class Internet-based multi-media communications network of object-oriented system design, schematically depicted in FIG. 12A, and implemented on a Java-based object-oriented integrated development environment (IDE) such as WebObjects 5.2 by Apple Computer Inc, Websphere IDE by IBM, or Weblogic IDE by BEA. A Network implementation using the WebObjects IDE is illustrated in FIGS. 12B and 12C using Web-based and Java-client technology, respectively. The entire Network is designed according to object-oriented systems engineering (OOSE) methods using UML-based modeling tools such as ROSE by Rational Software, Inc. or Together by Borland Software, using the industry-standard Rational Unified Process (RUP) well known in the art. A three-tier server architecture with double-firewall would provide a preferred deployment platform on the Internet.

In general, the Internet-based Brand Marketing Communication Instrumentation Network is capable of deploying server-side driven brand-building Multi-Mode Virtual Kiosks at any point along the World Wide Web, and remotely programming the display modes thereof so as to deliver advertising and promotional campaigns and brand knowledge building informational networks (of links) to consumers whenever and wherever they may be on the WWW. The Stakeholders associated with this object-oriented system are Brand Managers, their Advertising and Promotional Agents, the Brand Entities which the represent, and their primary interests are to build Brand Equity in the minds and hearts of consumers, while protecting Brands by maintaining the highest possible system integrity and security. The minimal guarantees sought by this Network are to provide brand management teams, large and small, and of any possible arrangement, with the ability to simply and rapidly program and deliver brand-building information content through the multiple display modes of server-side driven Multi-Mode Virtual Kiosks launchable from numerous types of environments at virtually any touchpoint on the World Wide Web—using only simple mouse-clicks and data entry operations and without the assistance of Java programmers. By ensuring the delivery of valuable brand-building information resources to consumers through Multi-Mode Virtual Kiosks, the strength of Brand Entities in the lives of consumers should be increased.

The Network of the present invention provides an advanced ensemble of revolutionary Internet-based Brand-Marketing Instruments (i.e. tools) which enable Brand Management Teams (including chief brand officers, marketing officers, brand managers, and their advertising and promotional agents, brand consultants, etc) to provide consumers with rich, multimedia advertisements and promotions about their specific Products and Services at specific Internet-enabled point-of-sale consumer touch-points. These marketing instruments also to help brand management teams to manage the Brand Knowledge that Consumers develop about a company's Products and Services in order to shape and reinforce the desired Brand Image that Consumers develop in their minds before, during and after product and service purchases.

As illustrated in network diagram of FIG. 12A, the Network (i.e. System) of the present invention is divided into six separate Subsystems, identified by the following intent-to-use (ITU) trademarks: Brandkey Systems™ Subsystem; Brandkey Create™ Subsystem; Brandkey Deliver Subsystem; Brandkey Advertise™ Subsystem; Brandkey Promote™ Subsystem; and Brandkey Admin™ Subsystem.

Brandkey Deliver™ Marketing Instruments provide Brand Management Teams the ability to rapidly configure, deploy, and install Brandkey Systems™ Multi-Mode Virtual Kiosks on the Internet.

Brandkey Advertise™ Marketing Instruments enable Brand Managers and their Agents to program the Advertising Spot Display Mode of their Virtual Kiosks in a simple and convenient manner. These operations are carried out by creating, executing and managing Advertising Campaigns designed to run on networks of Multi-Mode Virtual Kiosks.

Using Brandkey Promote™ Marketing Instruments, Brand Managers and their Agents can program the Promotional Spot Display Mode of their Virtual Kiosks. These programming operations are carried out by creating, executing and managing Promotional Campaigns designed to run on networks of Multi-Mode Virtual Kiosks.

Brandkey Create™ Marketing Instruments enable Brand Managers and their Agents to program the Brand Information Network Display Mode of their Virtual Kiosks using simple mouse-clicks and data-entry operations. Programming operations are carried out by creating and deploying interactive models of Product and Service Brands represented in the form of richly-associated Brand-Building Information Networks. These Information Networks create and reinforce the intended Brand Image of Products and Services within the minds of Consumers.

Brand-Building Information Networks can be constructed for Product-type Brands by linking the Uniform Resource Locators (URLs) of Brand Building Information Resources, to Product Data Strings consisting of the Universal Product Number (UPN), Trademark (™) and Product Descriptor (PD) of branded products. For Service-type Brands, these Information Networks can be created by linking the Uniform Resource Locators (URLs) to Service Data Strings consisting of the Universal Service Number (USN), Servicemark (SM) and Service Descriptor (SD) of branded services.

Brandkey Systems™ Administration Instruments enable Users to perform basic management and administration functions relating to Client Accounts, Brands, and User Rights and Privileges.

Using the Brandkey Systems™ Virtual Kiosks, consumers can now learn about brands in a more effective and enjoyable manner, and develop strong preferences for them.

As will be described in detail below, each of these Subsystems has one or more service suites, and each suite supports one or more Control Panels which may be realized as either Web-based clients or Java clients. The purpose of these Control Panels is to perform specific operations that support the revolutionary ensemble of brand marketing communication instruments of the present invention, in a manner quite independent of the other Subsystems. The back-end relational database management subsystem (RDBMS) used by the Network is the common item that integrated the entire Network together.

The Brandkey Admin Subsystem

In the illustrative embodiment, the Brandkey Admin Subsystem is reserved for use by Brandkey Systems Employees, and preferably is realized as a standalone WebObjects Application on an Application Server. This Subsystem will contain all the back-end functionality network service providers will use to maintain the network and the accounts that make up the Brandkey System Network. The Admin Subsystem shall be divided into six Service Suites; the BKS Administrator Management Suite, the Marketing Management Suite, the Account Management Suite, the Revenue Management Suite and the Technical Management Suite.

All Brandkey Employee administration will occur in the BKS Administrator Management Suite. There will be six (6) levels of Brandkey Employees; SuperUsers, Account Supervisors, Marketing Managers, Account Managers, Revenue Managers and Technical Managers. SuperUsers have full access throughout the system. Account Supervisors report to SuperUsers and are responsible for certain assigned Accounts. Account Manager. Account Managers, Revenue Managers and Technical Managers report to Account Supervisors and are responsible for certain aspects of assigned Accounts.

The primary marketing functions for Prospective Client Accounts occur in the Marketing Management Suite. Only SuperUsers, Account Supervisors and Marketing Managers have access to this Suite.

The primary management functions for Brandkey Accounts occurs in the Account Management Suite. Only SuperUsers, Account Supervisors and Account Managers have access to this Suite.

The primary revenue management functions for Brandkey Accounts occur in the Revenue Management Suite. Only SuperUsers, Account Supervisors and Revenue Managers have access to this Suite.

The primary technical and user-support management function for Brandkey Accounts occur in the Technical Management Suite. Only SuperUsers, Account Supervisors and Technical Managers have access to this Suite.

The following describes briefly the functions provided in each of the five core Subsystems of the Brand Marketing Communication Instrumentation Network of the present invention.

The Brandkey Systems Subsystem

The Brandkey Systems™ Subsystem is the central location where Brand Managers and Client Account Administrators can manage their Client Accounts and Brands, set User Access Rights, and configure Advertising and Promotional access to their Virtual Kiosks.

The Brandkey Systems™ Subsystem is an extension of the overall Brandkey Systems Network from the front page of its Web-based GUI. There are Administrative instruments as well as Demonstration and Tutorial instruments designed to instruct and illuminate the User in the workings of the Brandkey Systems Network as a whole.

The Brandkey Systems™ Subsystem is divided into the following Suites; the Demonstration Suite, the Tutorial Suite, the Registration Suite, and the User/Account Administration Suite.

The Demonstration Suite contains Flash and other types of Demonstration materials for the various parts of the Brandkey Systems Network. These demonstrations are designed to give the User a bird's eye (10,000 foot) view of the System and its capabilities.

The Tutorial Suite contains Flash Tutorials for every part of the Brandkey Systems Network. These tutorials are designed to give the User an in-depth understanding of the functionality of the every aspect of the Brandkey System Network and how to best utilize its revolutionary Brand Marketing Communications Instruments.

The Registration Suite contains the Registration Control Panel which new Users use to register with the Brandkey Systems Network. Generally these Registrants will be Brand Managers, Advertising or Promotional Agents, etc., or those people with certain high-level responsibilities for Brands. The Registration Process asks the Registrant for their Personal Information, then their Brand Entity Information, then their relationship with the Owner of the Brand. Once this information is filled in, it is recorded to the database and sent to the Brandkey Systems Administrators to verify. If the Registrant is a Consumer, they will be given immediate access to the System. However, they will only have access to the Virtual Kiosk Installation Suite in the Brandkey Deliver™ Subsystem.

Once a User's Registration has been approved, they will gain access to the User/Account Administration Suite. This Suite is accessible only to those Users who are the Administrators of their Client Account. By default the Registrant is initially set as the default Administrator of the Client Account. This can be changed with a request to the Client Account's Brandkey Administrator.

In the User/Account Administration Suite, there are three Control Panels for the User to select; the Control Panel for Administering Users, the Control Panel for Administering Accounts, and the Control Panel for Administering Ad/Promo Privileges.

The Control Panel for Administering Users allows the Administrator to edit the personal information for any User associated with their Client Account and to mange that User's Access Rights for the Network. The Administrator can also add new Users and configure their Access Rights for the Network.

The Control Panel for Administering Accounts allows Administrators to manage their Client Account Information. They may update their Company Information, their own personal information and access rights; they may also edit the list of Brand Entities associated with their Client Account or add new Brand Entities to their Client Account. Along with these Brand Entities the Administrator is allowed to manage or add new Trademarks or Servicemarks associated with those Brand Entities. Finally in this Control panel, the Administrator is also able to Certify or Decertify any Advertising and Promotional Agents associated with their Client Account. When an Advertising or Promotional Agent signs up with the Brandkey Systems Network, they are asked which Brands they work for. Once that information is received from the Agent, they are put into the queue of pending Agents for certification by the Administrator of those Brands. If the Administrator certifies those Agents, then they are added to the Certified Agents list. If the Administrator does not certify those Agents, then they are deleted from the Database for that relationship. Likewise, if a Certified Agent is then decertified, their relationship with that Client Account is deleted from the Database.

The third Control Panel is the Control Panel for Administering Ad/Promo Privileges for installed Virtual Kiosks. Each Multi-Mode Virtual Kiosk can support Advertisements and/or Promotions. It is up to the Virtual Kiosk owner to decide which Vendors, Service Providers, etc. have access to which Virtual Kiosks containing their Products, Services, or Brands. The Administrator will select a Virtual Kiosk from the list and see which Vendors, Service provider, etc. have Products, Services, and Brands associated with that Virtual Kiosk. They may then assign Shared privileges or Exclusive privileges for that Client to place Advertising or Promotional spots on that Virtual Kiosk. If the Administrator chooses a Shared privilege for a Client on a Virtual Kiosk, this means that the Administrator may add other Clients to share the Advertising space on that Virtual Kiosk. However, if the Administrator chooses an Exclusive privilege for a Client on a Virtual Kiosk, then that Virtual Kiosk is blocked for any other Client to place Advertising or Promotional spots on it. If a Virtual Kiosk had Shared privileges, then a Client gains Exclusive privileges, then that Exclusive privilege trumps any Shared privilege previously configured for the Virtual Kiosk.

By using these Control Panels and Suites, the Administrator and other Users can safely navigate the Brandkey Systems Network and set up accurate representations of their Brand Account and access rights and ad/Promo spot placement privileges for their Virtual Kiosks.

The Brandkey Create Subsystem

The Brandkey Create™ Subsystem employs the latest advances in cognitive science and learning theory to enable Brand Managers and their team members to create and deploy multi-level interactive audio-visual models of product, service and corporate brands represented in the form of Brand Information Networks supported by brand-building information resources on the Internet (e.g. WWW, ftp sites, etc).

These Brand Information Networks are constructed upon a network of Brand-Building Information Links located at the Nodes of the Brand Information Network. Each node in the Network can be encoded with brand-identifying graphics and audio clips selected by the Brand Manager's team and build and reinforce the Brand Image intended by the Brand Managers.

By strengthening the intended Brand Image associated with their Brand Entity, Brand Managers can effectively combat the forces of brand-related Confusion, Erosion, and Dilution created by marketplace clutter.

The results of delivering Brand Information Networks to Consumers at Internet-based touchpoints before, during and after purchases are:

Consumers learn about and remember what is relevant and important about the particular Brand Entities represented by the delivered Brand Information Network;

Brand Managers build stronger, more powerful Brands in the minds and hearts of Consumers; and Stronger, more powerful Brands increase the level of influence Brand Managers have along their distribution channels.

The Brandkey Create™ Marketing Instruments enable Brand Managers to manage their list of Products and Services and to create the networks of richly associated Brand-Building Resources used on the Multi-Mode Virtual Kiosks to build stronger, more powerful Brands in the minds and hearts of Consumers.

The Brandkey Create™ Subsystem consists of two separate Suites; the Brand Information Network Management Suite and the Brand Building Web Resources Hosting Suite. Generally, Vendor Brand Managers will have access to the Brand Information Network Management Suite while Advertisers will have access to the Brand Building Information Resources Web Hosting Suite The Brand Information Management Suite contains the Marketing Instruments that allow Brand Management Teams to create, configure and manage Brand Information Networks for their Products and Services.

When the Brand Information Network Management Control Panel is launched, the system will allow the Brand Manager or Team Member to use the Control Panel to create, configure, and modify Brand Information Networks.

Brandkey Deliver Subsystem

The Brandkey Deliver™ Subsystem is the component of the Brandkey Systems Network where the User is allowed to Create, Customize, Deploy, and Install Brand Building Multi-Mode Virtual Kiosks across various Consumer Touchpoints through a number of different Launch Environments. Generally, the Brand Managers or full-service Agents will be the ones who will use this Subsystem.

Once the Brand Information Networks are programmed in the Brandkey Create™ Subsystem, they need to be associated with Multi-Mode Virtual Kiosks. This will be accomplished in the Brandkey Deliver™ Subsystem.

The Brandkey Deliver™ Subsystem is divided into two Suites; the Virtual Kiosk Generation Suite and the Virtual Kiosk Installation Suite. As the titles represent, the former Suite allows Users to Create, Customize and Deploy Brand Building Multi-Mode Virtual Kiosks while the latter Suite allows Users to Install Brand Building Multi-Mode Virtual Kiosk tags at different Consumer Touchpoints.

Once the User has set the configuration for the Virtual Kiosks, they can create the Virtual Kiosks. The creation process for Product-Specific and Service-Specific Virtual Kiosks is different from the rest of the Virtual Kiosks to the degree that Users can create multiple Product-Specific and Service-Specific Virtual Kiosks at one time, whereas they can only create one of all the other types of Virtual Kiosks at a time.

To create a Multi-Mode Virtual Kiosk, the User first must select the display mode that the Virtual Kiosk will run. There are three possible display modes; Tri-Mode, Dual-Mode, and Uni-Mode. Tri-Mode allows the displaying of Advertising Spots, Promotional Spots and the Brand Information Network. Dual-Mode allows the displaying of Advertising-Spots and the Brand Information Network. Uni-Mode allows the display of only the Brand Information Network. Once the running mode of the Virtual Kiosk is selected, the User must select the Product(s), Service(s), or Brand(s) that will be available in the Virtual Kiosk. Once those have been selected, the User is asked to give the Virtual Kiosk a significant name. The name of the Virtual Kiosk is collected in order to give Users a chance to give their Virtual Kiosks a meaningful identification. With the name taken care of, the User can then customize the Virtual Kiosk. The Brandkey Systems Network allows for detailed customization of the Virtual Kiosks. Users can change their Logo at the top of the Virtual Kiosk, the geometric shape, surface texture, surface color, button style set, and button set color for the Virtual Kiosk being created. During the customization process the User is able to view a sample of what the Virtual Kiosk may look like with the selected customizations employed. Customizing the Virtual Kiosk is the last step in the Virtual Kiosk creation process. With this done, the Virtual Kiosk is ready for either further modification or deployment.

Users are able to modify any created Virtual Kiosk whenever they wish. After selecting the Virtual Kiosk they wish to modify, the User will be able to modify the mode in which the Virtual Kiosk is set to operate. They may also delete the Virtual Kiosk if they wish to. If the Virtual Kiosk is of type; Vendor, Service-Provider, Retailer, Industry, or Corporate, then the User will also be able to edit the list of Products, Services, or Brands that are associated with the Virtual Kiosk. Users may add new Products, Services, or Brands and remove any that are currently associated.

After creating the Virtual Kiosk, if the User is satisfied with it, they can deploy it. Deploying a Virtual Kiosk is the process the User goes through to select the Launch Environment and set the Virtual Kiosk up to be downloaded and installed in the Virtual Kiosk Installation Suite.

There are four launch environments for the User to choose from; HTML-Encoded Brandkey™ Button, HTML-Encoded Document, HTML-Encoded Image, and an HTML-Encoded Desktop Icon. Each of the launch environments have a different setup procedure the User must walk through to set them up.

To set up the HTML-Encoded Brandkey™ Button, the User simply selects the Virtual Kiosks they wish to deploy and the System does the rest.

To set up the HTML-Encoded Document, the User must first select only one Virtual Kiosk. Once the Virtual Kiosk has been selected, the User must go through the process of creating the Document and encoded the HTML tag for the Virtual Kiosk into it. Once that has been done, the System will prepare the Virtual Kiosk for Deployment.

To set up the HTML-Encoded Image, the User must first select only one Virtual Kiosk. Once the Virtual Kiosk has been selected, the User must go through the process of creating the composite image for the Virtual Kiosk tag. Once that has been done, the System will prepare the Virtual Kiosk for Deployment.

To set up the HTML-Encoded Desktop Icon, the User must first select only one Virtual Kiosk. Once the Virtual Kiosk has been selected, the User must go through the process of setting up the Desktop Icon. Once that has been done, the System will prepare the Virtual Kiosk for Deployment.

Once the Virtual Kiosk has been deployed, the last step to allow Users to install the tags for that Virtual Kiosk is to activate it. Users are also able to deactivate any Virtual Kiosks that have been previously activated, even if they have been installed on the Internet. If the User deactivates any installed Virtual Kiosks, then the next time that Virtual Kiosk is launched, the end-user will get a message saying the selected Virtual Kiosk is no longer available.

With all the Virtual Kiosks created and deployed, the next step is to get them installed on the Internet. The Virtual Kiosk Installation Suite handles this process. Like the Virtual Kiosk Generation Suite, the Virtual Kiosk Installation Suite is also divided up into six Control Panels, one for each type of Virtual Kiosk. Depending on who you are, you will have access to only certain Installation Control Panels, unless you are a Consumer, in that case you will have access to all the Installation Control Panels.

Each Virtual Kiosk Installation Control Panel works in the same manner, just customized for the specific type of Virtual Kiosks to which they cater. The User first is allowed to select the Virtual Kiosks they wish to download and install. If the User is a Consumer, they may select from a list of all the virtual Kiosks whose owners have designated as being available for Consumers. If the User is a Vendor or Service Provider, they are only allowed to install those Virtual Kiosks belonging to their account. If the User is a Retailer or Industrialist, then they are allowed to install only those Virtual Kiosks whose owners have specified that these Retailers and Industrialists have permission to install their Virtual Kiosks.

Using the Alphabetic and Numeric search bar at the top of the table, the User may search for the Virtual Kiosks of Vendors, Service Providers, etc. beginning with that letter or number. The User also has the ability to search for specific Vendors, Service Providers, etc. by clicking the Search button. This will take them to the Search from where they can search for specific Vendors, Service Providers, Retailers, etc. depending on the Control Panel they are in. From the Search form they will be able to select Vendor, etc. whose listing of Virtual Kiosks they wish to view.

Once the User has selected the Virtual Kiosks to download and install they will be asked where the Virtual Kiosk will be installed. This information is required by the System in order for it to provide the most accurate data to the Brand Managers about where their Virtual Kiosks are being installed. This enables Brand Managers and their Agents to customize the Advertising and Promotions campaigns in the most useful manner.

After the User has entered the installation location information they are able to download the Virtual Kiosk tags along with the accordant instructional files and needed images. The User may download up to four sets of Virtual Kiosks depending on the different launch environments for the Virtual Kiosks selected.

The download file for the Virtual Kiosks contain the full instructions on how to install the Virtual Kiosk tags.

It is then up to the User to place the tags in the appropriate websites or disseminate them via email to propagate the Virtual Kiosks through the Internet. The Multi-Mode Virtual Kiosks will be downloadable from the Installation Suite in this Subsystem. Once they are downloaded and installed in the appropriate place, they shall be functional for Consumers and other general users to launch.

To launch the Multi-Mode Virtual Kiosk from any launch environment, the user shall click on the Tag that will launch the Multi-Mode Virtual Kiosk. The Tag shall contain information used by the Brandkey Systems Network when the request is made for a Multi-Mode Virtual Kiosk to determine the type of the Multi-Mode Virtual Kiosk, the style of the requested Multi-Mode Virtual Kiosk, the layout of the requested Multi-Mode Virtual Kiosk and the Brand Entity(s) that is to be displayed.

When a user clicks on the Multi-Mode Virtual Kiosk Tag a request shall be sent to the Brandkey Systems Network for the appropriate type of Multi-Mode Virtual Kiosk. When the request comes into the Brandkey Systems Network, the Network shall respond to the request by launching a new stripped-down browser window on the desktop of the user. This window shall be displayed over the current location of the user, thereby saving that location for the user to return to later on with ease if they so wish.

This new window containing the Multi-Mode Virtual Kiosk shall be a completely stripped-down browser. Inside the window the Brandkey Systems Network shall display graphics having the basic look and feel of one of three formats. The Brandkey Systems Network shall find and play any relevant advertisements in the Advertisement-Display window of the Multi-Mode Virtual Kiosk. The Multi-Mode Virtual Kiosk shall have a set of buttons to skip the current Advertisement and to replay the current Advertisement. The Multi-Mode Virtual Kiosk shall also have a set of buttons to control the volume for the Advertisement that is currently being played. The Multi-Mode Virtual Kiosk shall also display the time that has lapsed for the current Advertisement. The Brandkey Systems Network shall play Advertisements in the Multi-Mode Virtual Kiosks using the JavaMediaFramework (JMF), from Sun Microsystems, Inc., in an Applet on the Virtual Kiosk. The JavaMediaFramework can take multiple video and audio formats and play them in a customized applet that we program. The list of Advertisements shall be processed on the server, possibly using SMIL technology and then passed to the Virtual Kiosk Applet to play in the prescribed order. Details regarding JMF API can be found at http://java.sun.com/products/java-media/jmf/, incorporated herein by reference.

Once the Advertisements have been played, the Multi-Mode Virtual Kiosk shall check to see if there are any Promotions that are associated with this Virtual Kiosk. If there are Promotions that need to be displayed then the Kiosk shall resize itself to show the Promotions Window. The Promotions shall be displayed along with their corresponding videos. The Multi-Mode Virtual Kiosk shall have a set of buttons to skip the current Promotion and to replay the current Promotion. The Multi-Mode Virtual Kiosk shall also have a set of buttons to control the volume for the Promotional video that is currently being played. The Multi-Mode Virtual Kiosk shall also display the time that has lapsed for the current Promotion. The Brandkey Systems Network shall play the Promotions in the Multi-Mode Virtual Kiosks using the JavaMediaFramework in an Applet on the Virtual Kiosk. The JavaMediaFramework can take multiple video and audio formats and play them in a customized applet that we program. The list of Promotions shall be processed on the server, possibly using SMIL technology and then passed to the Virtual Kiosk Applet to play in the prescribed order.

Once the Advertisement and Promotions have completed then the Multi-Mode Virtual Kiosk shall display the related brand knowledge network as described by the Brand Manager in Brandkey Create. One of the three schemas shall be displayed that were specified in Brandkey Create; Pre-Post Purchase Schema, Simplex Schema and Complex Schema. When the user clicks on a specific node in any of the schemas, the system shall display the link from that node within the display window in the frame above the Brand Information Network display window. The system shall provide the user with the ability to enlarge this window causing the entire browser window to enlarge in proportion. The system shall also resize the Brand Information Network in proportion with the link display window. The system shall maintain a nice look-and-feel to the Brand Information Network display during the resizing. A suggested method for achieving this is using Scaling Vector Graphics. All links from any node in the Brand Information Network shall be displayed in this link display screen, thereby allowing the user to remain inside the Brandkey Virtual Kiosk Environment. There shall be a Search button to allow the User to search for Products/Services/Brands depending on the type of Virtual Kiosk they are in.

Once the Advertisements and Promotions (if any) have completed, the system shall then resize the existing window to show the Search Screen, if the Virtual Kiosk is a Vendor-Specific, Service-Provider-Specific, Retailer-Specific, Industry-Specific, or Corporate-Specific Virtual Kiosks. Product-Specific and Service-Specific Virtual Kiosks do not have a Search function.

In the Brand Information Network display window, the system shall first display a search screen that provides the user with the ability to search for products/brands for the particular Vendor who is sponsoring the Virtual Kiosk. In this search screen the user shall be able to search for products/brands based on UPN/USN, $^{TM/SM}$, PD/SD or Product/Service Category. When the user presses the "search" button, the system shall perform a search and display the results list of all products/services/brands that matched the search criteria. Since each Virtual Kiosk shall be associated with a specific language, the search shall only bring back the results of products/brands that have Brand Information Networks with Brandkey Data Links in that language. The user shall click on the UPN/USN in order to have the Brand Information Network displayed for that product/brand.

The system shall also provide a button on the Search Screen to launch a virtual keyboard. When the user presses this button, the system shall launch a virtual keyboard in a small stripped-down browser window on top of the current search window. When the user clicks on any of the keyboard buttons on this screen, the system shall display the corresponding letters or numbers in the search text box on the search window.

When the user selects the product/brand from the Search Results list the system shall first the Advertisements and Promotions associated with the selected Product/Service/Brand Entity. The Advertisements and Promotions shall be displayed in the same manner as the Advertisements and Promotions that were displayed when the Multi-Mode Virtual Kiosk was launched. Once the Advertisement and Promotions have completed then the Multi-Mode Virtual Kiosk shall display the related brand knowledge network as described by the Brand Manager in Brandkey Create. One of the three schemas shall be displayed that were specified in Brandkey Create; Pre-Post Purchase Schema, Simplex Schema and Complex Schema. When the user clicks on a specific node in any of the schemas, the system shall display the link from that node within the display window in the frame above the Brand Information Network display window. The system shall provide the user with the ability to enlarge this window causing the entire browser window to enlarge in proportion. The system shall also resize the Brand Information Network in proportion with the link display window. The system shall maintain a nice look-and-feel to the Brand Information Network display during the resizing. A suggested method for achieving this is using Scaling Vector Graphics (SVG). All links from any node in the Brand Information Network shall be displayed in this link display screen, thereby allowing the user to remain inside the Brandkey Virtual Kiosk Environment.

The system shall maintain a counter for each Virtual Kiosk. The counter shall be updated whenever a user activates a Virtual Kiosk at a consumer touch-point and also whenever a user clicks on a link from the Brand Information Network.

Users shall be able to vote for certain links, rating whether or not they found the link useful. The system shall display a series of radio button numbered 1 through 5 next to the link. The user shall select a radio button based on the usefulness of the link (1 being least useful and 5 being the most useful) and then click on the "submit" button to register their vote. The system shall tally the votes internally to get a "Usefulness Quotient" that is displayed to users of the Brandkey Create subsystem.

Brandkey Advertise Subsystem

The Brandkey Advertise™ Subsystem is the central location where all Advertising Spots are placed on installed Multi-Mode Virtual Kiosks on the Internet.

In order for the Advertisement Display Mode of any Virtual Kiosk to be fully enabled, the Advertisements to be played on those Virtual Kiosks need to be configured.

The Brandkey Advertise™ Subsystem provides Users with a central area where they can see where their available Virtual Kiosks have been installed. Users can create Directories of their Virtual Kiosks by Virtual Kiosk type and even Brand. This enables them to locate Virtual Kiosks and create Advertising Campaigns in a more efficient manner.

These Advertising Campaigns are made up of a sub-network of Multi-Mode Virtual Kiosks that the User selects. Users can then place Advertisements on any combination of Virtual Kiosks and order those Advertisements any way they wish for each individual Virtual Kiosk.

Using the Brandkey Advertise™ Subsystem, Users can also monitor, modify, run and stop any of their Advertising Campaigns. These features allow the User to determine which Campaigns are working well for them and what combination of Advertisements and Virtual Kiosks are the most effective and which do not work at all.

The Brandkey Advertise™ Subsystem consists of one Suite; the Virtual Kiosk Advertising Campaign Management Suite. This Suite contains one Control Panel; the Control Panel for Managing Advertising Campaigns.

The three main services offered in the Control Panel for Managing Advertising Campaigns are; Directory Management, Campaign Management, and Ad-Spot Management.

In Directory Management, Users are allowed to create and manage the Virtual Kiosk Advertising Directories they use to populate their Advertising Campaigns with Multi-Mode Virtual Kiosks.

To create an Advertising Directory the User must first select the type of Directory they wish to create. There are two types of Directories that the User can create; the General Type Advertising Directory and the Brand-Specific Advertising Directory.

If the User selects the General Type Advertising Directory then the next step for them is to select the types of Virtual Kiosks they wish to include in this Directory. They may select all the Virtual Kiosks that are available to them. Available Virtual Kiosks means any Virtual Kiosks on which their Product, Services, or Brands are displayed and on which they have permission to place Advertising Spots. Only those types of Virtual Kiosks that are available to the User are displayed.

Once the User has selected the Virtual Kiosk types, they are asked to name the Directory. This gives the User an opportunity to give the Directory a name that will be relevant to them. The System is then ready to generate the Virtual Kiosk Directory for the User. When the User clicks the Generate Directory button, the System will pull together all the information requested by the User into a table of the available Virtual Kiosks and display it to the User. The User will also have the opportunity to download a PDF version of the Directory if they want. The Virtual Kiosk Advertising Directory is now created and ready for use.

The only difference between the General Type Virtual Kiosk Advertising Directory and the Brand-Specific Virtual Kiosk Advertising Directory is that at the start of the creation process, the User is asked to search for and select the Brand Entities they wish to filter for in the Directory. Only those available Virtual Kiosks displaying the selected Brand Entities will be listed in the Directory.

When modifying any Virtual Kiosk Advertising Directory, the User will be able to select different types of Virtual Kiosks to be included in the Directory and different Brand Entities to be filtered for in the Directory.

Once the Virtual Kiosk Advertising Directories have been created, the User can then register the Advertising Campaigns.

After filling out the basic information needed for the Campaign such as; its name, registration number, start date, and end date, the User must select a Virtual Kiosk Directory from where to pull the Virtual Kiosks to include in this Campaign. The User must first select Virtual Kiosk Directory type, General or Brand-Specific. Then the User is presented with the list of Directories for the selected type. The User must select one Directory from the list and the System will pull in all the Virtual Kiosks from that Directory to include in this Campaign.

When modifying an Advertising Campaign, the User will first select the Campaign to modify, and then they will get a chance to modify the list of Virtual Kiosks included in the Campaign. They may remove Virtual Kiosks from the list or include Virtual Kiosks from the list in the Campaign.

All Campaigns that have ever been run or are presently running are stored with Brandkey Systems Network. The User may select any Advertising Campaign that has previously been run to run it again if they wish. They may also select any Advertising Campaign that is currently running to stop it before the due date. They may wish to do this if they feel that the Campaign is not reaching the audience they wanted it to reach, or is not as effective as they thought it would be. This gives the User a better level of control over the Advertising Campaign they put together and propagate through the Multi-Mode Virtual Kiosks.

In order to tell how effective a Campaign is, the User would monitor the Campaign. When monitoring the Campaign, the Subsystem presents the user with a wide variety of data such as; number of Advertisements placed, number of Advertisements run, number of Advertisement-Spot interruptions, and number of Brand Information Networks accessed, etc. This information will give the User a clear picture of the activity behind the Virtual Kiosk and the Advertising Campaign.

The third and arguably the central instrument in this Control Panel is to place Advertising Spot Orders on the Virtual Kiosks in Campaigns. To place these ad-spot orders, the User must first select the Advertising Campaign on whose Virtual Kiosks to place the Advertising Spots.

When the User has selected the Campaign, the list of available Advertisements is displayed for the User to select which Advertisements they want to place on the Campaign. This list of Advertisements is pulled from the list of nodes in the all the Brand Information Networks associated with the selected Virtual Kiosks. The User is also given the opportunity to view the actual Advertisement by clicking on the Advertisement URL in the table.

Once the User has selected the Advertisements to place on the Campaign, the System requires them to configure the Advertisements for each of the Virtual Kiosks they wish to place it on. The User is allowed to select the Virtual Kiosks on which the Advertisement will play, the data on which the Advertisement will become available, and the frequency at which the Advertisement will play when the Virtual Kiosk is left running. Once each Advertisement has been configured, the User will be allowed to set the order in which the Advertisements will play on each of the Virtual Kiosks. Even if there are several Virtual Kiosks which play the exact same list of Advertisements, they may still play them in different orders, thus allowing for more granular control.

The Order will be placed once the Advertisement order has been set by the User.

When modifying Advertising Spot Orders, the User may modify all aspects of the Order. In this case they move backwards through the section, starting with the Advertisement ordering and going back to the Virtual Kiosk Directory that was selected.

Once an Advertising Spot Order has been placed, then those Advertisements are placed on installed Virtual Kiosks and the full functionality of the Advertisement Display Mode of the Virtual Kiosks is realized.

Brandkey Promote Subsystem

The Brandkey Promote™ Subsystem is the central location where all Promotional Spots are placed on installed Multi-Mode Virtual Kiosks on the Internet.

In order for the Promotion Display Mode of any Virtual Kiosk to be fully enabled, the Promotions to be played on those Virtual Kiosks need to be configured.

The Brandkey Promote™ Subsystem provides Users with a central area where they can see where their available Virtual Kiosks have been installed. Users can create Directories of their Virtual Kiosks by Virtual Kiosk type and even Brand. This enables them to locate Virtual Kiosks and create Promotional Campaigns in a more efficient manner.

These Promotional Campaigns are made up of a sub-network of Multi-Mode Virtual Kiosks that the User selects. Users can then place Promotions on any combination of Virtual Kiosks and order those Promotions any way they wish for each individual Virtual Kiosk.

Using the Brandkey Promote™ Subsystem, Users can also monitor, modify, run and stop any of their Promotional Campaigns. These features allow the User to determine which Campaigns are working well for them and what combination of Promotions and Virtual Kiosks are the most effective and which do not work at all.

The Brandkey Promote™ Subsystem consists of one Suite; the Virtual Kiosk Promotional Campaign Management Suite. This Suite contains one Control Panel; the Control Panel for Managing Promotional Campaigns.

The three main services offered in the Control Panel for Managing Promotional Campaigns are; Directory Management, Campaign Management, and Promo-Spot Management.

In Directory Management, Users are allowed to create and manage the Virtual Kiosk Promotional Directories they use to populate their Promotional Campaigns with Multi-Mode Virtual Kiosks.

To create a Promotional Directory the User must first select the type of Directory they wish to create. There are two types of Directories that the User can create; the General Type Promotional Directory and the Brand-Specific Promotional Directory.

If the User selects the General Type Promotional Directory then the next step for them is to select the types of Virtual Kiosks they wish to include in this Directory. They may select all the Virtual Kiosks that are available to them. Available Virtual Kiosks means any Virtual Kiosks on which their Product, Services, or Brands are displayed and on which they have permission to place Promotional Spots. Only those types of Virtual Kiosks that are available to the User are displayed.

Once the User has selected the Virtual Kiosk types, they are asked to name the Directory. This gives the User an opportunity to give the Directory a name that will be relevant to them.

The System is then ready to generate the Virtual Kiosk Directory for the User. When the User clicks the Generate Directory button, the System will pull together all the information requested by the User into a table of the available Virtual Kiosks and display it to the User. The User will also have the opportunity to download a PDF version of the Directory if they want. The Virtual Kiosk Promotional Directory is now created and ready for use.

The only difference between the General Type Virtual Kiosk Promotional Directory and the Brand-Specific Virtual Kiosk Promotional Directory is that at the start of the creation process, the User is asked to search for and select the Brand Entities they wish to filter for in the Directory. Only those available Virtual Kiosks displaying the selected Brand Entities will be listed in the Directory.

When modifying any Virtual Kiosk Promotional Directory, the User will be able to select different types of Virtual Kiosks to be included in the Directory and different Brand Entities to be filtered for in the Directory.

Once the Virtual Kiosk Promotional Directories have been created, the User can then register the Promotional Campaigns.

After filling out the basic information needed for the Campaign such as; its name, registration number, start date, and end date, the User must select a Virtual Kiosk Directory from where to pull the Virtual Kiosks to include in this Campaign. The User must first select Virtual Kiosk Directory type, General or Brand-Specific. Then the User is presented with the list of Directories for the selected type. The User must select one Directory from the list and the System will pull in all the Virtual Kiosks from that Directory to include in this Campaign.

When modifying a Promotional Campaign, the User will first select the Campaign to modify, and then they will get a chance to modify the list of Virtual Kiosks included in the Campaign. They may remove Virtual Kiosks from the list or include Virtual Kiosks from the list in the Campaign.

All Campaigns that have ever been run or are presently running are stored with Brandkey Systems Network. The User may select any Promotional Campaign that has previously been run to run it again if they wish. They may also select any Promotional Campaign that is currently running to stop it before the due date. They may wish to do this if they feel that the Campaign is not reaching the audience they wanted it to reach, or is not as effective as they thought it would be. This gives the User a better level of control over the Promotional Campaign they put together and propagate through the Multi-Mode Virtual Kiosks.

In order to tell how effective a Campaign is, the User would monitor the Campaign. When monitoring the Campaign, the System presents the user with a wide variety of data such as; number of Promotions placed, number of Promotions run, number of Promotion-Spot interruptions, and number of Brand Information Networks accessed, etc. This information will give the User a clear picture of the activity behind the Virtual Kiosk and the Promotional Campaign.

The third and arguably the central instrument in this Control Panel is to place Promotional Spot Orders on the Virtual Kiosks in Campaigns. To place these promo-spot orders, the User must first select the Promotional Campaign on whose Virtual Kiosks to place the Promotional Spots.

When the User has selected the Campaign, the list of available Promotions is displayed for the User to select which Promotions they want to place on the Campaign. This list of Promotions is pulled from the list of nodes in the all the Brand Information Networks associated with the selected Virtual Kiosks. The User is also given the opportunity to view the actual Promotion by clicking on the Promotion URL in the table.

Once the User has selected the Promotions to place on the Campaign, the System requires them to configure the Promotions for each of the Virtual Kiosks they wish to place it on. The User is allowed to select the Virtual Kiosks on which the Promotion will play, the data on which the Promotion will become available, and the frequency at which the Promotion will play when the Virtual Kiosk is left running. Once each Promotion has been configured, the User will be allowed to set the order in which the Promotions will play on each of the Virtual Kiosks. Even if there are several Virtual Kiosks which play the exact same list of Promotions, they may still play them in different orders, thus allowing for more granular control.

The Order will be placed once the Promotion order has been set by the User.

When modifying Promotional Spot Orders, the User may modify all aspects of the Order. In this case they move backwards through the section, starting with the Promotion ordering and going back to the Virtual Kiosk Directory that was selected.

Once a Promotional Spot Order has been placed, then those Promotions are placed on installed Virtual Kiosks and the full functionality of the Promotion Display Mode of the Virtual Kiosks is realized.

Internet-Based Brand Management and Marketing Communication Instrumentation Network of the Present Invention Employing Remotely Programmable Server-Side Driven Brand-Building Multi-Mode Virtual Kiosks The Internet-based Brand Management and Marketing Communication Instrumentation Network illustrated in FIGS. 12A through 13E can be realized in many different ways within the scope and spirit of the present invention. Also, the Brand Management and Marketing Communication Network supports the creation and management of server-side driven, brand-building Multi-Mode Virtual Kiosks designed to provide effective solutions to real brand marketing communication problems in the industry.

The present invention enables the creation of a global marketplace in which all brand marketers of products and services, large and small, have equal access to an inexpensive, simple-to-use, yet extremely powerful set of Web-based marketing instruments that allow them to communicate directly and freely with consumers anywhere along the World Wide Web.

The present invention creates new value in the marketplace for Consumers, Brands and their Agents by providing an innovative way of and means for widespread distribution of Brand-Building Multi-Mode Virtual Kiosks, in which their Multiple Display Modes are (i) remotely programmable through an industrial-strength carrier-class Internet-based Brand Marketing Communication Instrumentation Network, and (ii) are capable of displaying Rich-Media Advertising Spots, Promotional Spots, and Brand Information Networks composed of virtually any form information media on the Internet simply indexed using brand-related information keys (e.g. Universal Product Numbers, Trademarks, Product Descriptors, Universal Service Numbers, Servicemarks, Brand Names, etc.)—so that Brand Managers are provided complete control over their brand marketing communications on the Internet, while improving collaboration among brand management team members within and outside of the Brand's enterprise.

These and all other such modifications and variations are deemed to be within the scope and spirit of the present invention as defined by the accompanying Claims to Invention.

What is claimed is:

1. An Internet-based product brand marketing communication network configured to allow members of a product brand management team to communicate directly with consumers browsing HMTL-encoded pages at an electronic commerce (EC) enabled Web-site along the World Wide Web (WWW), said Internet-based product brand marketing communication network comprising:

an e-commerce (EC) enabled information server supporting said EC-enabled Web-site which includes a plurality of HTML-encoded pages containing at least one of images and text descriptions of a plurality of consumer products;

a first Web-based subsystem configured to allow members of a product brand management team associated with one or more consumer products, and authorized parties, to create and manage a consumer product information (CPI) link structure for each said consumer product, wherein said CPI link structure includes the following items:

(i) a unique product identifier assigned to said consumer product;

(ii) a set of URLs for a plurality of brand information resources located on the WWW;

a second Web-based subsystem configured to allow members of said product brand management team, and said authorized parties, to create and deploy one or more Web-based Multi-Mode Virtual Kiosks (MMVKs) for one or more of said consumer products and being accessible by consumers using a Web browser;

wherein each said MMVK comprises (i) a computer-executable server-side component stored on a first Internet-enabled information server operably connected to the Internet, and (ii) a MMVK tag that references said computer-executable server-side component and is embedded within an HTML-encoded page of said EC-enabled Web-site; and wherein each said MMVK has a graphical user interface (GUI) that is characterized by a plurality of independently programmable display modes selected from the group consisting of (i) an advertising display mode for displaying one or more advertising spots, (ii) a promotional display mode for displaying one or more promotional spots, and (iii) a brand information network (BIN) menu display mode for displaying a set of brand information resources;

a plurality of Web-based information servers operably connected to the Internet, for storing and configured to serve said one or more advertising spots, said one or more promotional spots and said set of brand information resources to said Web browser, for display to consumers through said plurality of independently programmable display modes of each said MMVK;

wherein said first Web-based subsystem is further configured to allow members of said product brand management team and said authorized parties to independently program said set of brand information resources displayable during said BIN menu display mode of each said MMVK; and a third Web-based subsystem is configured to allow members of the product brand management team and said authorized parties to independently program the advertising and promotional display modes of each MMVK with one or more advertising and promotional spots;

wherein the Web browser of a consumer is configured to process said MMVK tag embedded within said HTML-encoded page;

wherein said first Internet-enabled information server is configured to automatically execute the computer-executable server-side component corresponding to the MMVK tag;

wherein said first Internet-enabled information server is configured to generate and serve the corresponding MMVK to the Web browser; and wherein said MMVK is configured to automatically play through said display modes, in a programmed sequential manner, allowing the consumer to review and interact with the advertising spots, promotional spots, and/or brand information resources displayed within the GUI of said MMVK, at said EC-enabled Web-site where said MMVK tag has been embedded.

2. The Internet-based product brand marketing communication network of claim 1, which further comprises a facility programmed to automatically measure the interaction between consumers and each said MMVK, and generate metrics reports relating to said interaction.

3. The Internet-based product brand marketing communication network of claim 1, wherein, for each MMVK created and deployed for a consumer product, the computer-executable server-side component associated with said MMVK comprises said unique product identifier assigned to the consumer product.

4. The Internet-based product brand marketing communication network of claim 3, wherein, for each MMVK created and deployed for one said consumer product, the computer-executable server-side component associated with the MMVK comprises a consumer product information requesting (CPIR) servlet loaded onto said first Internet-enabled information server.

5. The Internet-based product brand marketing communication network of claim 1, wherein said CPI link structure further comprises, for each said consumer product,
(iii) a Trademark (™) assigned to said consumer product;
(iv) a Product Descriptor (PD) associated with said consumer product; and
(v) a set of display attributes associated with each brand information resource in said CPI link structure.

6. The Internet-based product brand marketing communication network of claim 1, wherein said set of brand information resources are selected from the group consisting of product videos, audio files, product images, product specifications, product advertisements, and product promotions.

7. The Internet-based product brand marketing communication network of claim 5, wherein said set of display attributes are selected from the group consisting of text for said URLs, graphical icons displayed next to said URLs, and sound files associated with said URLs.

8. The Internet-based product brand marketing communication network of claim 1, wherein said Web browser of the consumer is configured to automatically respond to the consumer clicking on a graphical component at which said MMVK tag is embedded in said HTML-encoded page.

9. The Internet-based product brand marketing communication network of claim 5, wherein a supply-chain information management system is configured to import said unique product identifier, said ™ and said PD associated with each said CPI link structure, into a database supported on said Internet-based product brand marketing communication network.

10. The Internet-based product brand marketing communication network of claim 1, wherein said first Web-based subsystem includes a relational database management system (RDBMS) for storing and managing at least one said CPI link structure for each said consumer product.

11. The Internet-based product brand marketing communication network of claim 1, wherein said unique product identifier is a Universal Product Number (UPN).

12. The Internet-based product brand marketing communication network of claim 11, wherein said UPN is selected from the group consisting of a UPC number and a UPC/EAN number.

13. An Internet-based product brand marketing communication network configured to allow members of a product brand management team to communicate directly with consumers browsing HMTL-encoded pages at an electronic commerce (EC) enabled Web-site along the World Wide Web (WWW), said Internet-based product brand marketing communication network comprising:

an e-commerce (EC) enabled information server supporting said EC-enabled Web-site which includes a plurality of HTML-encoded pages containing at least one of the images and text descriptions of a plurality of consumer products;

a first Web-based subsystem configured to allow members of a brand management team associated with one or more consumer products, and authorized parties, to create and manage a consumer product information (CPI) link structure for each said consumer product, wherein said CPI link structure includes the following items:
(i) a unique product identifier assigned to the consumer product; and
(ii) a set of URLs for a plurality of brand information resources located on the WWW;

a second Web-based subsystem configured to allow members of said product brand management team, and said authorized parties, to create and deploy one or more Web-based Multi-Mode Virtual Kiosks (MMVKs) for one or more of said consumer products and being accessible by consumers using a Web browser;

wherein each said MMVK comprises (i) a computer-executable server-side component stored on a first Internet-enabled information server operably connected to the Internet, and (ii) a MMVK tag that references said computer-executable server-side component and is embedded within an HTML-encoded page of said EC-enabled Web-site; and wherein each said MMVK has a graphical user interface (GUI) characterized by a plurality of independently programmable display modes selected from the group consisting of (i) an advertising display mode for displaying one or more advertising spots, (ii) a promotional display mode for displaying one or more promotional spots, and (iii) a brand information network (BIN) menu display mode for displaying a set of brand information resources;

a plurality of Web-based information servers operably connected to the Internet, for storing and configured to serve said one or more advertising spots, said one or more promotional spots and said set of brand information resources to said Web browser, for display to consumers through said plurality of independently programmable display modes of each said MMVK;

wherein said second Web-based subsystem is further configured to allow members of the product brand management team and authorized parties to independently program said set of brand information resources displayable during said BIN menu display mode of each said MMVK; and a third Web-based subsystem configured to allow members of said product brand management team and said authorized parties to independently program the advertising and promotional display modes of each MMVK with one or more advertising and promotional spots; and a facility programmed to measure the interaction between consumers and said MMVK, and generate metric reports relating to said interaction;

wherein the Web browser of a consumer is configured to process said MMVK tag embedded within at least one said HTML-encoded page;

wherein said first Internet-enabled information server is configured to automatically execute the computer-executable server-side component corresponding to said MMVK tag;

wherein said first Internet-enabled information server is configured to generate and serve the corresponding MMVK to the Web browser, allowing the consumer to review and interact with the advertising spots, promotional spots, and brand information resources displayed within the GUI of said MMVK, at said EC-enabled Web-site where said MMVK tag has been embedded.

14. The Internet-based product brand marketing communication network of claim 13, wherein, for each MMVK created and deployed for a consumer product, the computer-executable server-side component associated with said MMVK comprises said unique product identifier assigned to the consumer product.

15. The Internet-based product brand marketing communication network of claim 14, wherein, for each MMVK created and deployed for a particular consumer product, the computer-executable server-side component associated with the MMVK comprises a consumer product information requesting (CPIR) servlet loaded onto said first Internet-enabled information server.

16. The Internet-based product brand marketing communication network of claim 13, wherein said CPI link structure further comprises, for each consumer product, (iii) a Trademark (™) assigned to said consumer product;
(iv) a Product Descriptor (PD) associated with said consumer product; and
(v) a set of display attributes associated with each brand information resource in said CPI link structure.

17. The Internet-based product brand marketing communication network of claim 13, wherein said set of brand information resources are selected from the group consisting of product videos, audio files, product images, product specifications, product advertisements, and product promotions.

18. The Internet-based product brand marketing communication network of claim 16, wherein said set of display attributes are selected from the group consisting of text for said URLs, graphical icons displayed next to said URLs, and sound files associated with said URLs.

19. The Internet-based product brand marketing communication network of claim 13, wherein said Web browser of the consumer is configured to automatically respond to the consumer clicking on a graphical component at which said MMVK tag is embedded in said HTML-encoded page.

20. The Internet-based product brand marketing communication network of claim 16, wherein a supply-chain information management system is configured to import said unique product identifier, said ™ and said PD associated with each said CPI link structure, into a database supported on said Internet-based product brand marketing communication network.

21. The Internet-based product brand marketing communication network of claim 13, wherein said first Web-based subsystem includes a relational database management system (RDBMS) for storing and managing at least one said CPI link structure for each said consumer product.

22. The Internet-based product brand marketing communication network of claim 13, wherein said unique product identifier is a Universal Product Number (UPN).

23. The Internet-based product brand marketing communication network of claim 22, wherein said UPN is selected from the group consisting of a UPC number and a UPC/EAN number.

* * * * *